US012038149B2

(12) United States Patent
Van Straten

(10) Patent No.: US 12,038,149 B2
(45) Date of Patent: Jul. 16, 2024

(54) HEAT SOURCE FOR VEHICLE ILLUMINATION ASSEMBLY AND METHOD

(71) Applicant: Van Straten Enterprises, Inc., Chassell, MI (US)

(72) Inventor: George A. Van Straten, Chassell, MI (US)

(73) Assignee: Van Straten Enterprises, Inc., Chassell, MI (US)

( * ) Notice: Subject to any disclaimer, the term of this patent is extended or adjusted under 35 U.S.C. 154(b) by 0 days.

(21) Appl. No.: 17/685,729

(22) Filed: Mar. 3, 2022

(65) Prior Publication Data

US 2022/0186906 A1 Jun. 16, 2022

Related U.S. Application Data

(63) Continuation of application No. 16/033,913, filed on Jul. 12, 2018, now Pat. No. 11,287,102.

(51) Int. Cl.

| | |
|---|---|
| ***F21S 45/60*** | (2018.01) |
| ***F21S 41/141*** | (2018.01) |
| ***F21S 41/143*** | (2018.01) |
| ***F21S 45/33*** | (2018.01) |

(52) U.S. Cl.

CPC ............ *F21S 45/60* (2018.01); *F21S 41/141* (2018.01); *F21S 41/143* (2018.01); *F21S 45/33* (2018.01)

(58) Field of Classification Search

CPC .......... F21S 45/60; F21S 45/33; F21S 41/143; F21S 41/141; H05B 3/0014; H05B 3/84; H05B 3/40; H05B 3/06

See application file for complete search history.

(56) References Cited

U.S. PATENT DOCUMENTS

| | | | | |
|---|---|---|---|---|
| 4,728,775 | A | 3/1988 | Van Straten | |
| 6,422,729 | B1 | 7/2002 | Rohrbach et al. | |
| 7,335,855 | B2 | 2/2008 | Luhe | |
| 8,459,848 | B2 | 6/2013 | Marley | |
| 9,234,656 | B2 * | 1/2016 | Blondin | G02B 27/0006 |
| 9,377,214 | B2 | 6/2016 | Krystad | |
| 2006/0245202 | A1 | 11/2006 | Moreth | |
| 2013/0114279 | A1 * | 5/2013 | Marley | F21S 41/153 362/516 |
| 2013/0249375 | A1 | 9/2013 | Panagotacos | |
| 2014/0334170 | A1 | 11/2014 | Zhong | |

(Continued)

FOREIGN PATENT DOCUMENTS

| | | |
|---|---|---|
| CN | 203346290 | 12/2013 |
| WO | WO PCT/US2018/041887 | 2/2019 |

*Primary Examiner* — Brian W Jennison

(74) *Attorney, Agent, or Firm* — Keith D. Grzelak; Wells St. John P.S.

(57) ABSTRACT

A heater is provided for a vehicle illumination assembly. The heater includes a heat transfer body, a heat source, and a mounting base. The heat transfer body has a top surface and a bottom surface. The top surface has a higher emissivity than the bottom surface. The heat source is affixed in heat transfer relation with the heat transfer body. The mounting base is configured to affix the heat transfer body within a housing of a vehicle illumination assembly to provide the top surface of the heat transfer body in radiant heat transfer relation with a light transmissible portion of the vehicle illumination assembly. A method is also provided.

10 Claims, 47 Drawing Sheets

(56) References Cited

U.S. PATENT DOCUMENTS

| | | | | |
|---|---|---|---|---|
| 2015/0034621 | A1* | 2/2015 | Timmermann | ......... B60R 11/04<br>219/203 |
| 2016/0046262 | A1 | 2/2016 | Van Straten | |
| 2018/0106448 | A1 | 4/2018 | Shiraishi | |

* cited by examiner

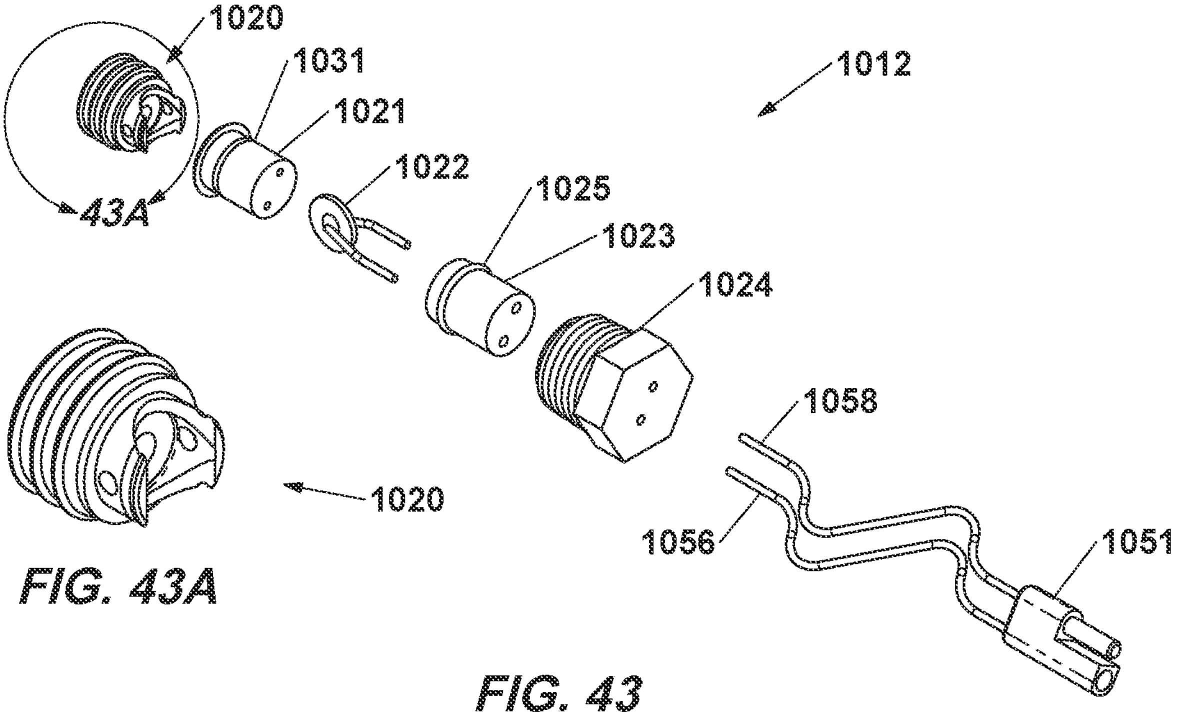
FIG. 43A
FIG. 43
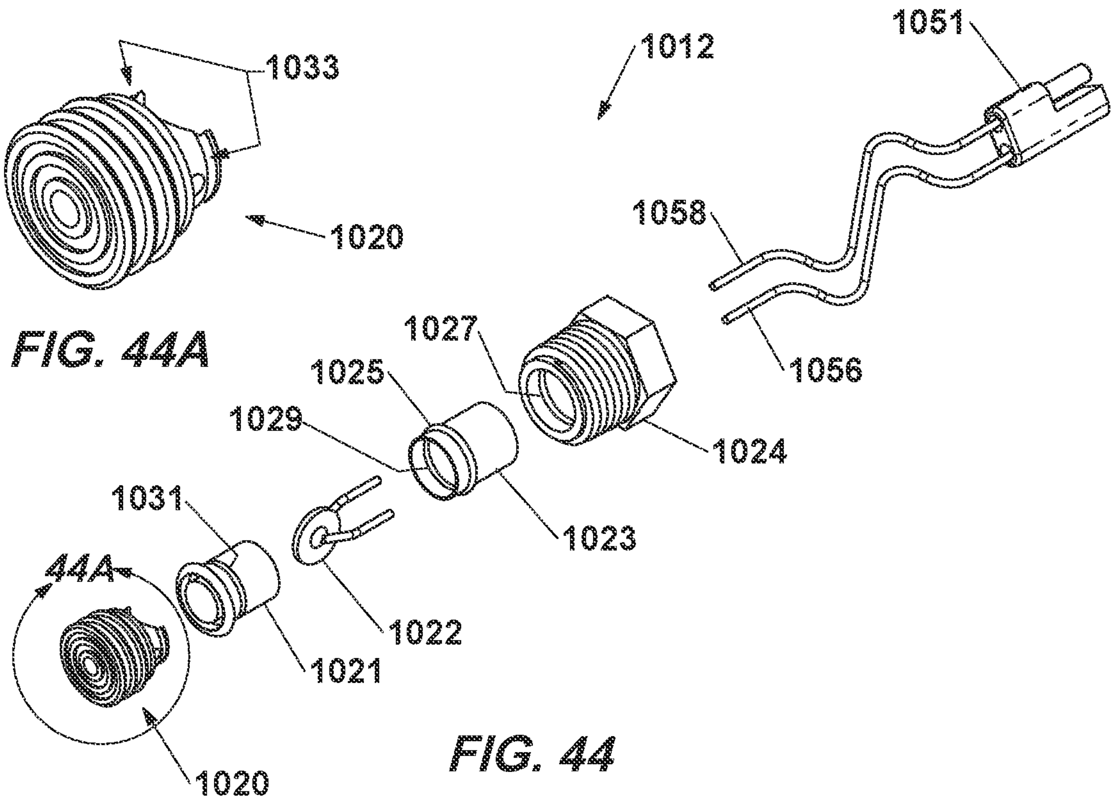
FIG. 44A
FIG. 44

90A
91A
1804
1808
1810
1811
1812
1815
1817
1818
1819
1820
1822
1823
(not shown)
1824
1830
1832
1834
1856
1858
1873

2418
2430
2465
2432
2482
2483

2460
2461
2463
126A
2482
2484
2486
2420
2488

2450
2429
2420
2427
2484
2488
2423
2458
2456
2422
2412
2410
2419

2429
2457
2453
2454
2455
2450

2450
2451

2450
2429
2450
2451

2450
2429
2457
2453
2455

HEAT SOURCE FOR VEHICLE ILLUMINATION ASSEMBLY AND METHOD

RELATED PATENT DATA

This continuation patent application claims priority to U.S. patent application Ser. No. 16/033,913, filed Jul. 12, 2018, and which is incorporated herein by reference; this patent application also claims priority to U.S. Provisional Patent Application Ser. No. 62/655,557, which was filed Apr. 10, 2018, entitled, "Heat Source for Vehicle Illumination Assembly and Method" and which is hereby incorporated by reference; this patent application also claims priority to U.S. Provisional Patent Application Ser. No. 62/597,028, which was filed Dec. 11, 2017, entitled, "Heat Source for Vehicle Illumination Assembly and Method" and which is hereby incorporated by reference; and lastly, this patent application also claims priority to U.S. Provisional Patent Application Ser. No. 62/531,441, which was filed Jul. 12, 2017, entitled "Heat Source for Vehicle Illumination Assembly and Method" and which is hereby incorporated by reference.

TECHNICAL FIELD

This disclosure pertains to heated housings having light, optical, and/or electromagnetic radiation transmission portions, or lenses for housing one or more of sensors, light sources, or radiation transmission sources and/or barriers for migrating moisture from the housing. More particularly, this disclosure relates to improved apparatus and methods for melting snow and ice and removing condensation from covers or lenses of lights, sensor housings, electromagnetic radiation emitter and detector housings having opaque or optically clear housings and/or lighting systems for mobile and stationary applications.

BACKGROUND OF THE DISCLOSURE

Techniques are known for heating a light transmission portion, or lens of a vehicle illumination system and for moisture permeable membranes provided in light housings. One technique involves providing a heating wire on a back surface of a cover element provided over a vehicle light. However, such a system does not necessarily provide thermal protection for overheating. The recent adoption of light emitting diode (LED) lighting systems, which generate very little heat compared to the historical and long-accepted use of incandescent filament bulb light sources, greatly increases the problem of snow and ice accumulating on the outer lens of such a lighting system, as well as condensate (liquid and frozen solid form) accumulating on the inner lens. Other systems use aluminum and metal heat sinks with Positive Temperature Coefficient (PTC) heaters to deliver heat to a lens of a lighting system in an effort to remove light-occluding precipitation from the front side or back side of the lens. However, modern LED vehicle illumination assemblies can have complex computer-generated reflectors, housings, and lens geometries that have relatively large and uniquely-shaped 3-dimensional lenses and internal volumes relative to many prior incandescent light source designs. Heat transfer largely by convection of the contained atmospheric gas within LED light housings can be slow or insufficient to deliver heat to the light transmissive portion, or lens to adequately and/or efficiently prevent or remove condensation, both frozen and liquid, that is otherwise occluding the lens. When the occlusion of any light transmissive vehicle lens does occur, a variety of potential and ongoing safety compromises and concerns may readily arise with any vehicle. This can significantly increase the likelihood of serious accidents, which can endanger the well-being and lives of countless numbers of people. Furthermore, this can create an increased risk to vehicles and property of all kinds. Accordingly, further improvements are needed to better prevent removal of ice, snow and condensation and effectively enable removal of ice, snow and condensation from lenses of lights and vehicle illumination systems. This is especially important because of the recent and rapid adoption of LED light sources among nearly all types of vehicles which tend to not generate much heat during light production compared to traditional incandescent lights.

SUMMARY OF THE INVENTION

A heat source for either a vehicle illumination assembly or a sensor housing is provided with improved radiant and convective heat transfer that delivers heat to a light-transmissive portion of a vehicle illumination assembly, housing lens, or sensor housing covering to remove snow, frost, and/or condensation without overheating the lens and/or housing and can optionally migrate moisture from the housing. By heating the lens, accumulation of snow, ice, or vapor is mitigated or eliminated from a surface of the lens, thereby enabling light to transmit through the lens and mitigating light occlusion. Applications include lamps, bulbs, and/or sensors on conveyance devices, including vehicles, boats, planes, and trains, as well as sedentary structures, such as lamp posts, street lights, railroad crossing markers and lights, and airport ground and runway lighting systems.

According to one aspect, a heater is provided for a vehicle illumination assembly. The heater includes a heat transfer body, a heat source, and a mounting base. The heat transfer body has a top surface and a bottom surface. The top surface has a higher emissivity than the bottom surface. The heat source is affixed in heat transfer relation with the heat transfer body. The mounting base is configured to affix the heat transfer body within a housing of a vehicle illumination assembly to provide the top surface of the heat transfer body in radiant heat transfer relation with a light transmissible portion of the vehicle illumination assembly.

According to another aspect, a heater is provided for a vehicle illumination assembly having a heat source and a radiant heat transfer body. The radiant heat transfer body is affixed in heat transfer relation with the heat transfer body and has a top surface with at least one of a concave portion and a convex portion configured to respectively focus and spread radiant energy dissipation from the top surface.

According to yet another aspect, a heat source is provided for a vehicle illumination assembly having a positive temperature coefficient (PTC) heater, a radiant heat dissipating body, and a mounting base. The radiant heat dissipating body has at least one central thermally conductive contact portion configured to mate in thermally conductive relation with the PTC heater and a thin-walled body having a pair of opposed surfaces. The PTC heater is configured to communicate in thermally conductive relation with one of the pair of opposed surfaces. The mounting base communicates with a contact portion of the heat dissipating body and is configured to affix the heat source within a vehicle illumination assembly.

According to even another aspect, a method is provided for heating a light transmissive portion of a vehicle illumination assembly. The method includes: providing a ceramic heat dissipating body in thermally conductive relation with a PTC heater and a power supply; energizing the PTC heater with the power supply to heat the ceramic heat dissipating body; and transmitting heat through radiation from the ceramic radiating heat dissipating body to the light transmissive portion.

According to yet even another aspect, a vehicle electronics system is provided having an electronics device, a package, a radiant heat transfer body, and a heat source. The package has at least one wall configured to encapsulate the electronics device within a cavity and a light transmissible portion. The radiant heat transfer body and a heat source are provided in the package and configured to mitigate condensate occlusion from the light transmissible portion.

According to an even further aspect, an environmentally controlled vehicle electronics package is provided having a container, a radiant heat transfer body, and a heat source. The container has a wall forming an enclosure configured to encase an electronic component and a light transmissible portion. The radiant heat transfer body and the heat source are provided in the package. The heat source communicates with the body and is configured to mitigate condensate occlusion from the light transmissible portion

BRIEF DESCRIPTION OF THE DRAWINGS

Preferred embodiments of the disclosure are described below with reference to the following accompanying drawings.

FIGS. 42A-1 are respective front, side and sectional views taken along lines 42A-42A, 42B-42B, 42C-42C, 42D-42D, 42E-42E, 42F-42F, 42G-42G, 42H-42H, and 42I-42I for each of the three heat sources of FIG. 41.

FIG. 43 is an exploded rear perspective view from above of the third heat source of FIG. 40 with Detail A of encircled region A showing in enlarged view a ceramic head of the heat source.

FIG. 43A is a detailed perspective view of the ceramic head of FIG. 43.

FIG. 44 is an exploded front perspective view from above of the third heat source of FIG. 40 with Detail B of encircled region B showing in enlarged view a ceramic head of the heat source.

FIG. 44A is a detailed perspective view of the ceramic head of FIG. 44.

FIG. 72 is a rear perspective view from above of a combination heat source and moisture permeable membrane plug for use in a light housing or light assembly.

FIG. 101A is a cross sectional view of the heated vehicle tail light assembly taken along line 101A-101A of FIG. 101;

FIG. 101B is a cross sectional view of the heated vehicle tail light assembly taken along line 101B-101B of FIG. 101;

FIG. 102 is a right-side view of the heated vehicle tail light assembly of FIG. 101;

FIG. 103 is an exploded perspective view of the heated vehicle tail light assembly of FIG. 100;

FIG. 104 is a perspective view of one of the two threaded PTC heat source assemblies of FIG. 103 each including an electric PTC heater and conductor wires;

FIG. 105 is a front elevational view of the assembled heat source of FIG. 104;

FIG. 105A is a cross-sectional view of the assembled heat source of FIG. 105 taken along line 105A-105A;

FIG. 106 is front view of even another exemplary heated vehicle LED tail light assembly;

FIG. 106A is a vertical centerline-sectional view of the LED tail light assembly of FIG. 106 taken at line 106A-106A;

FIG. 106B is an enlarged partial sectional view of the heated tail light assembly of FIG. 106A taken from encircled region 1068;

FIG. 107 is a right-side view of the LED tail light assembly of FIG. 106;

FIG. 108 is a partially exploded perspective view of the heated tail light assembly of FIGS. 106 and 107 with the light transmissible lens removed to show interior details of the heated tail light assembly;

Figure 108:
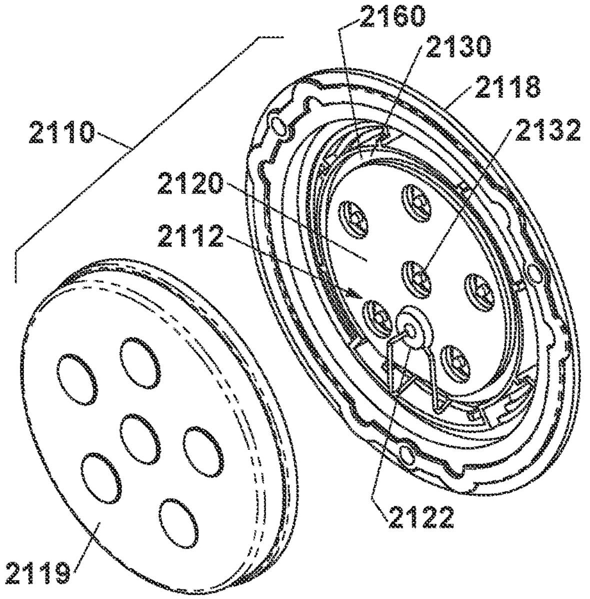
Figures 109, 109A:
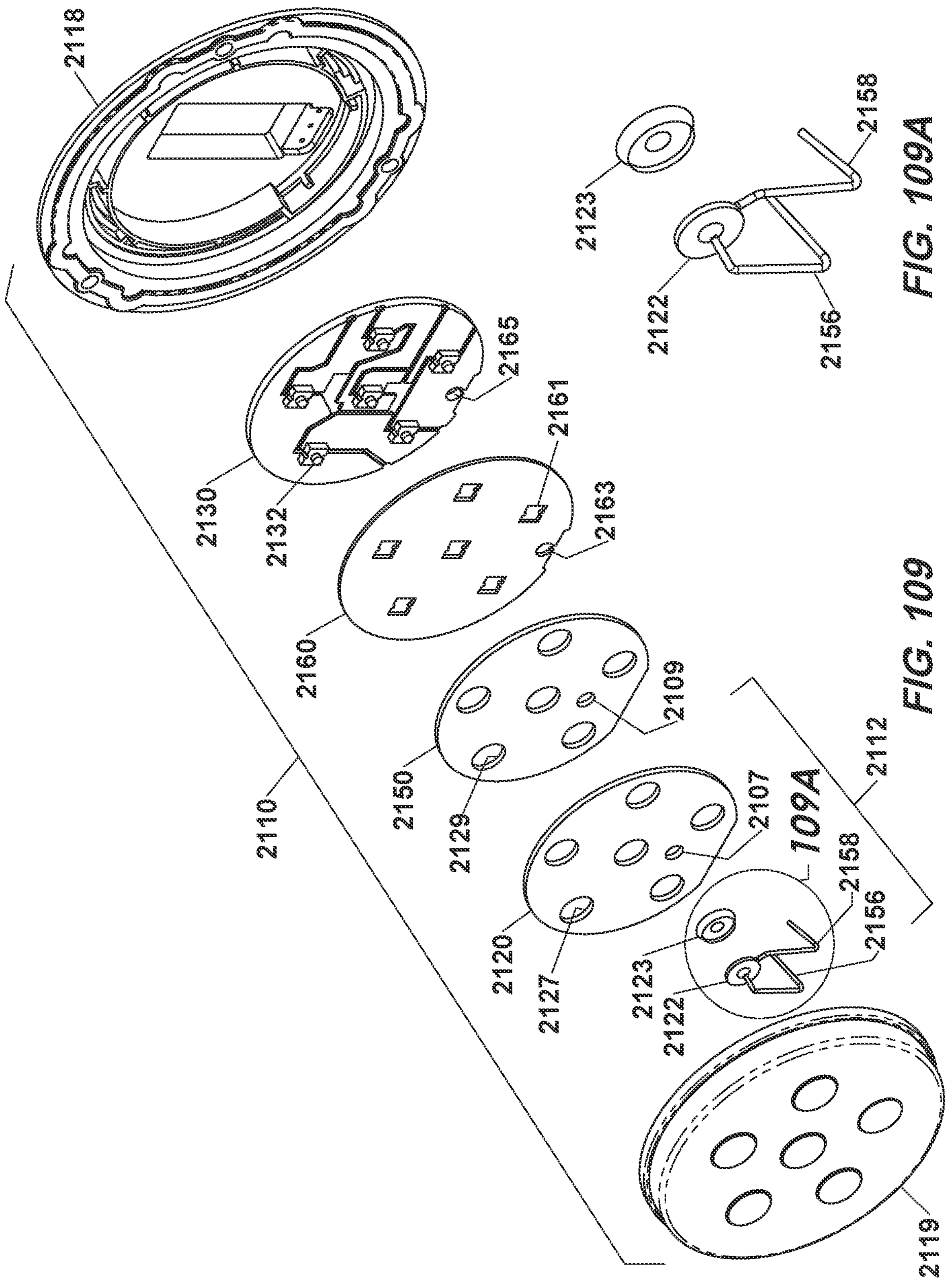
Figure 110:
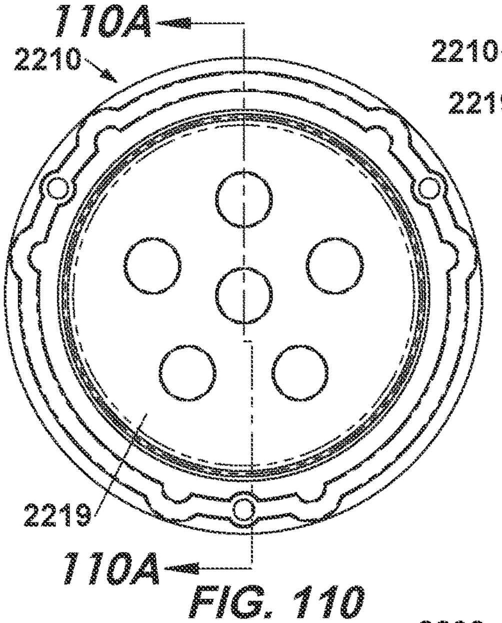
Figure 111:
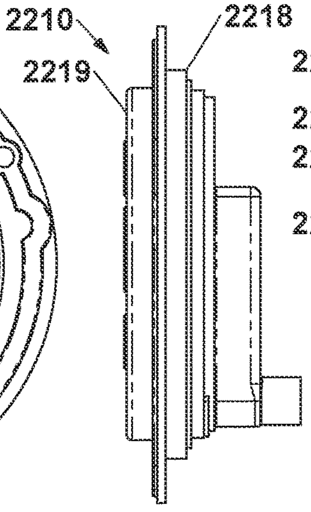
Figure 110C:
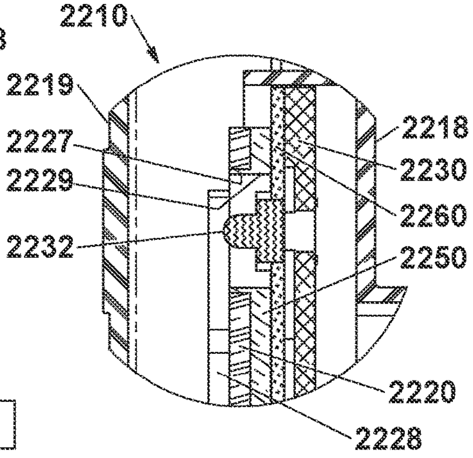
Figure 112:
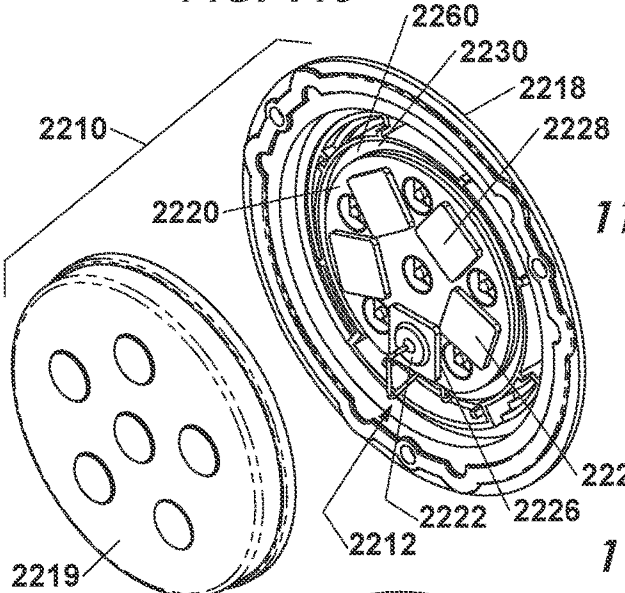
Figure 110B:
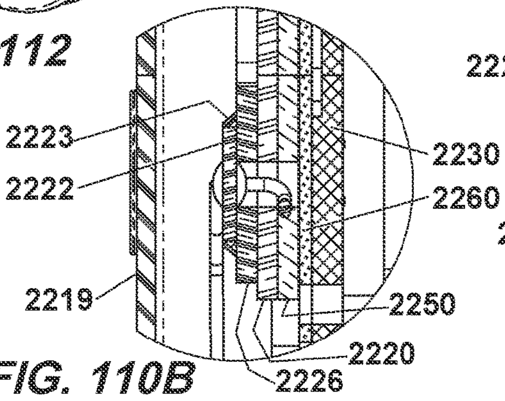
Figure 110A:
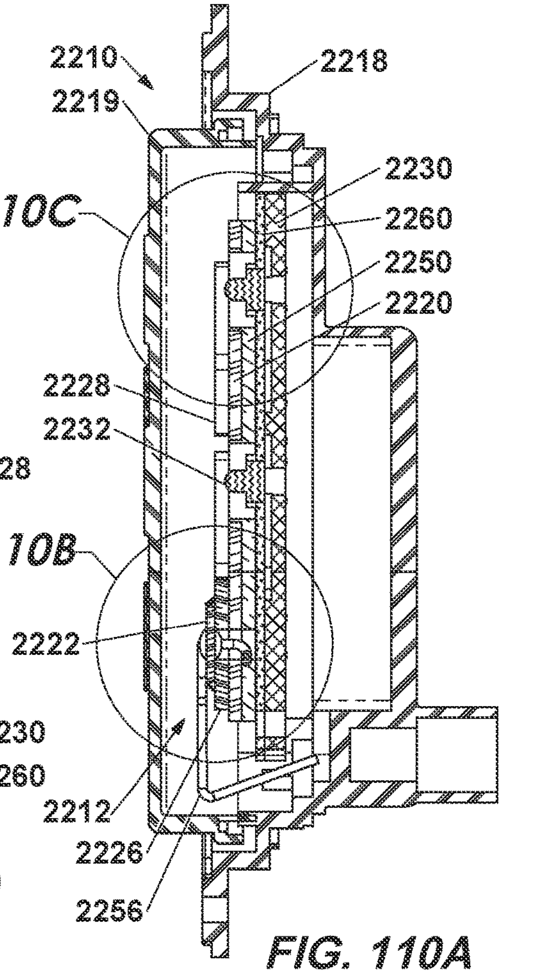
Figures 113, 113A, 113B:
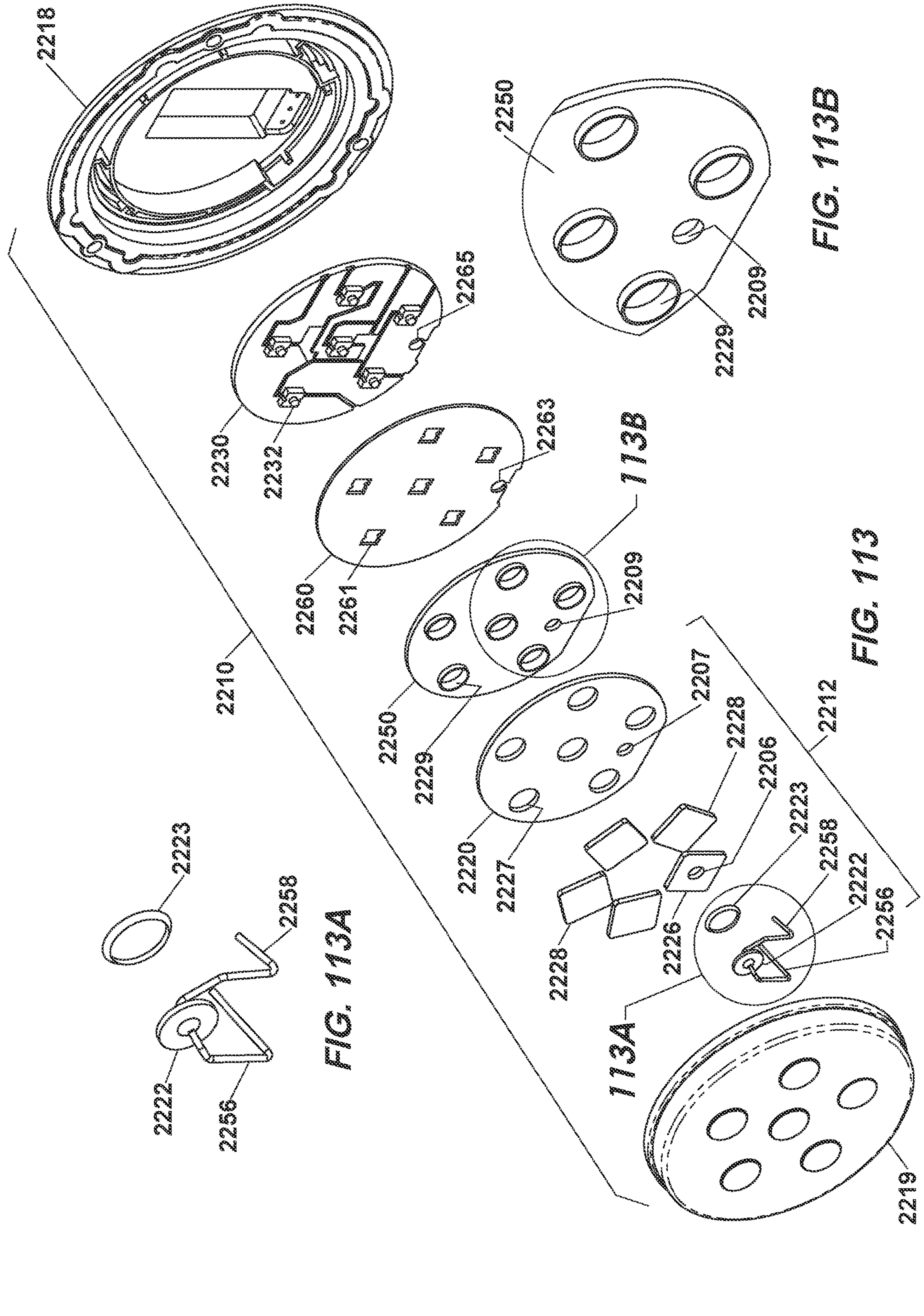
Figure 114:
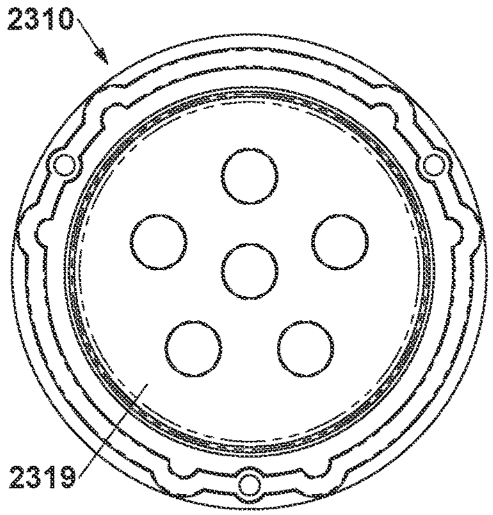
Figure 115:
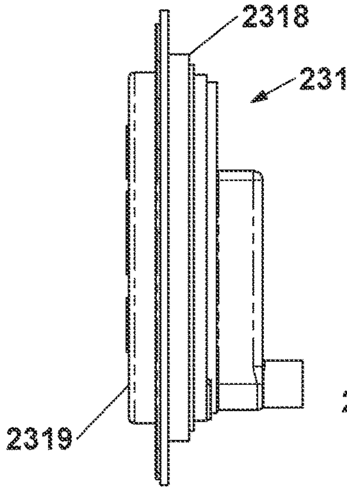
Figure 116A:
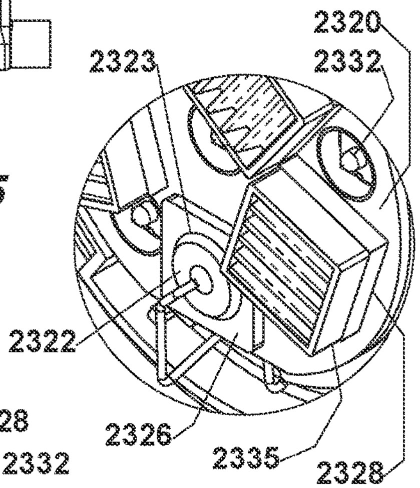
Figure 116:
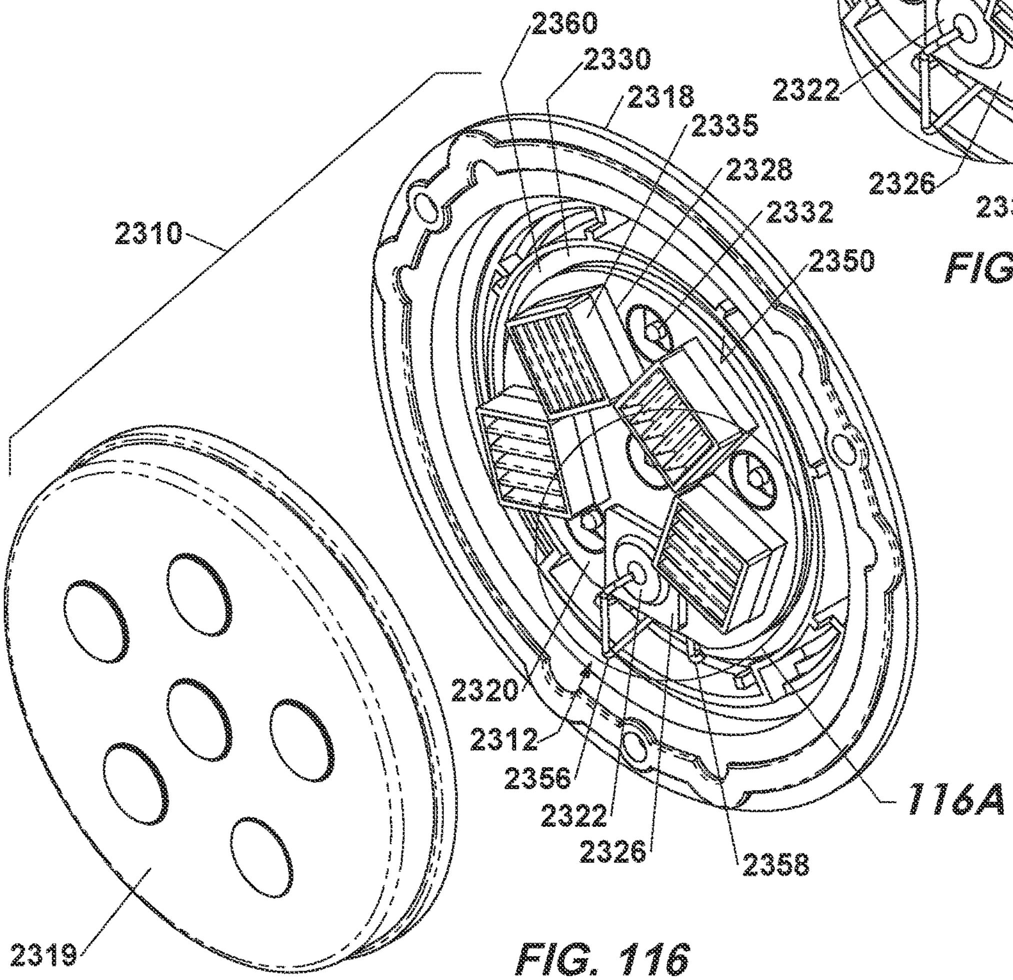
Figures 117, 118, 119, 119A, 120, 121:
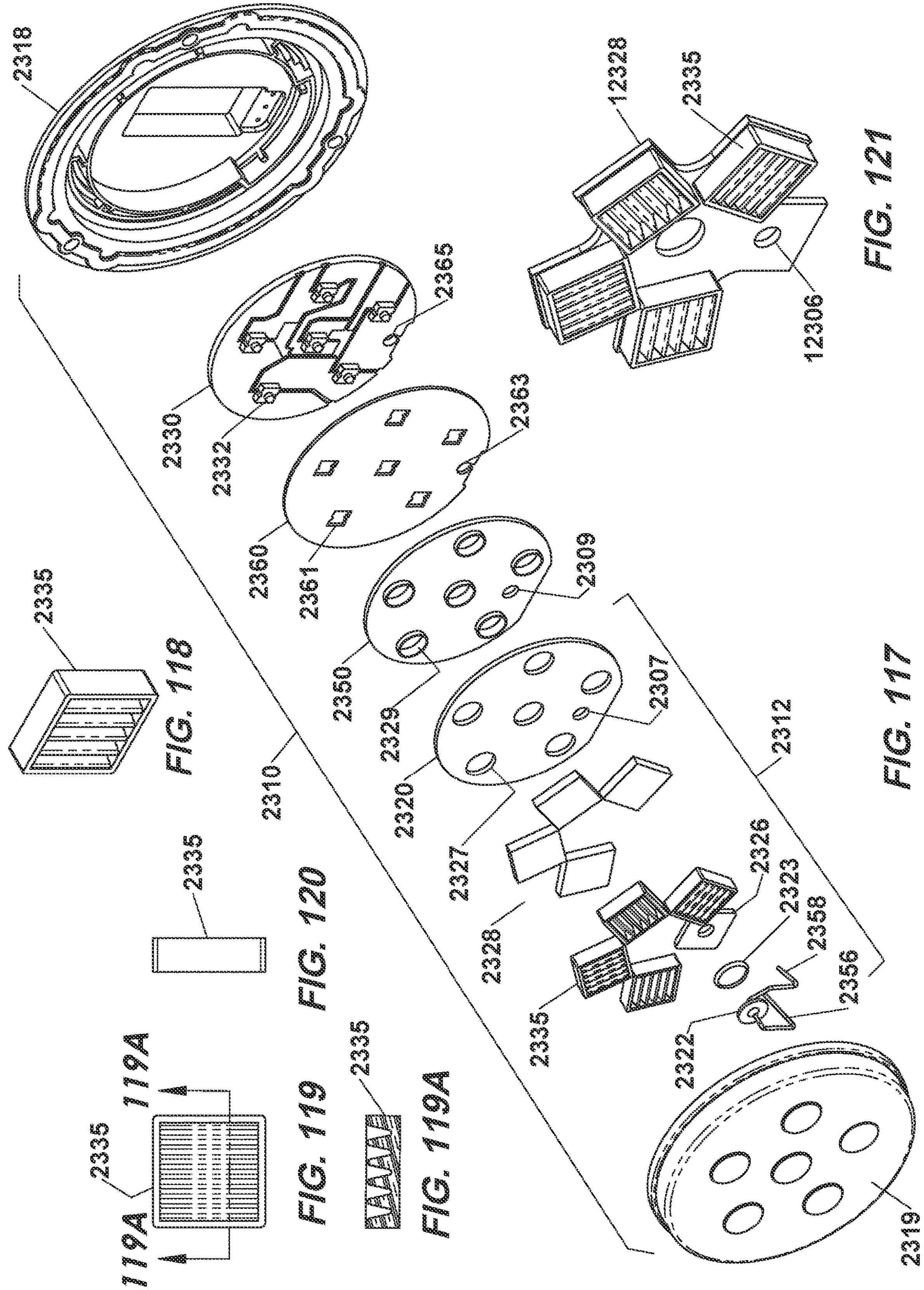
Figure 122:
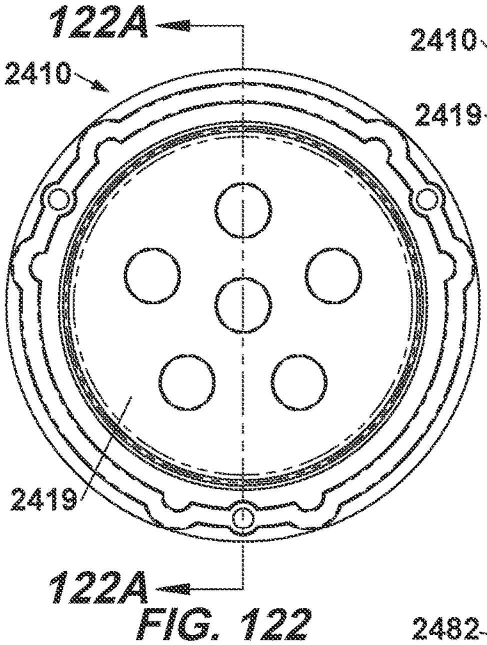
Figure 123:
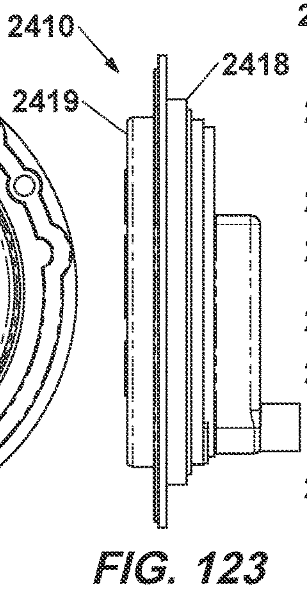
Figure 122B:
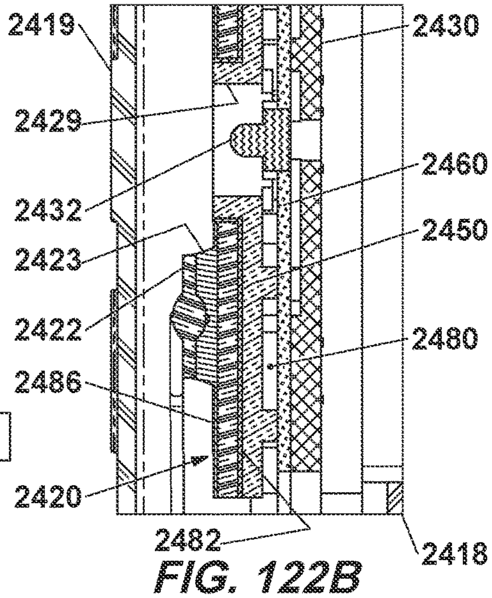
Figure 122C:
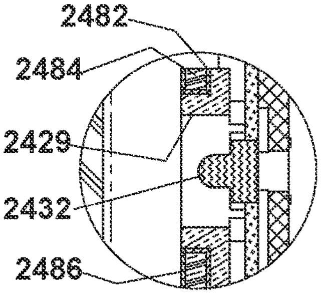
Figure 124A:
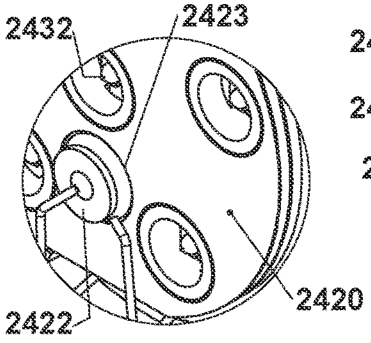
Figure 124:
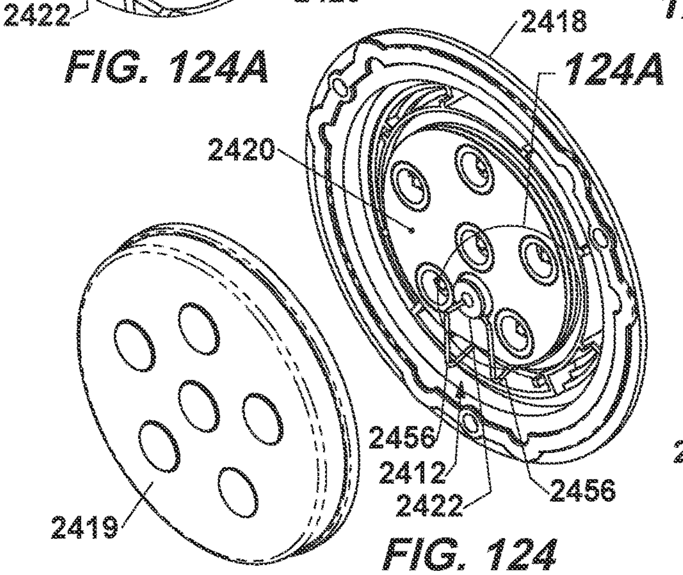
Figure 122A:
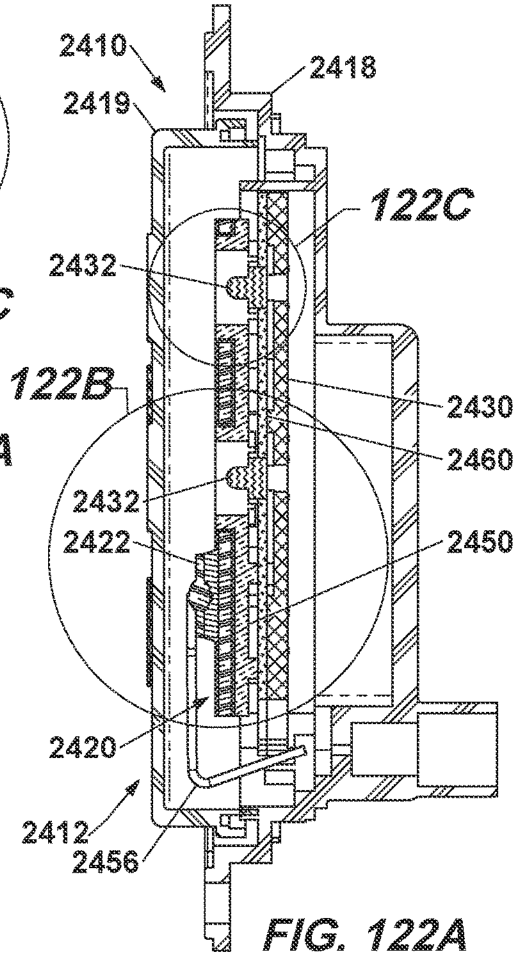
Figures 125, 126, 126A, 127, 128, 129, 130:
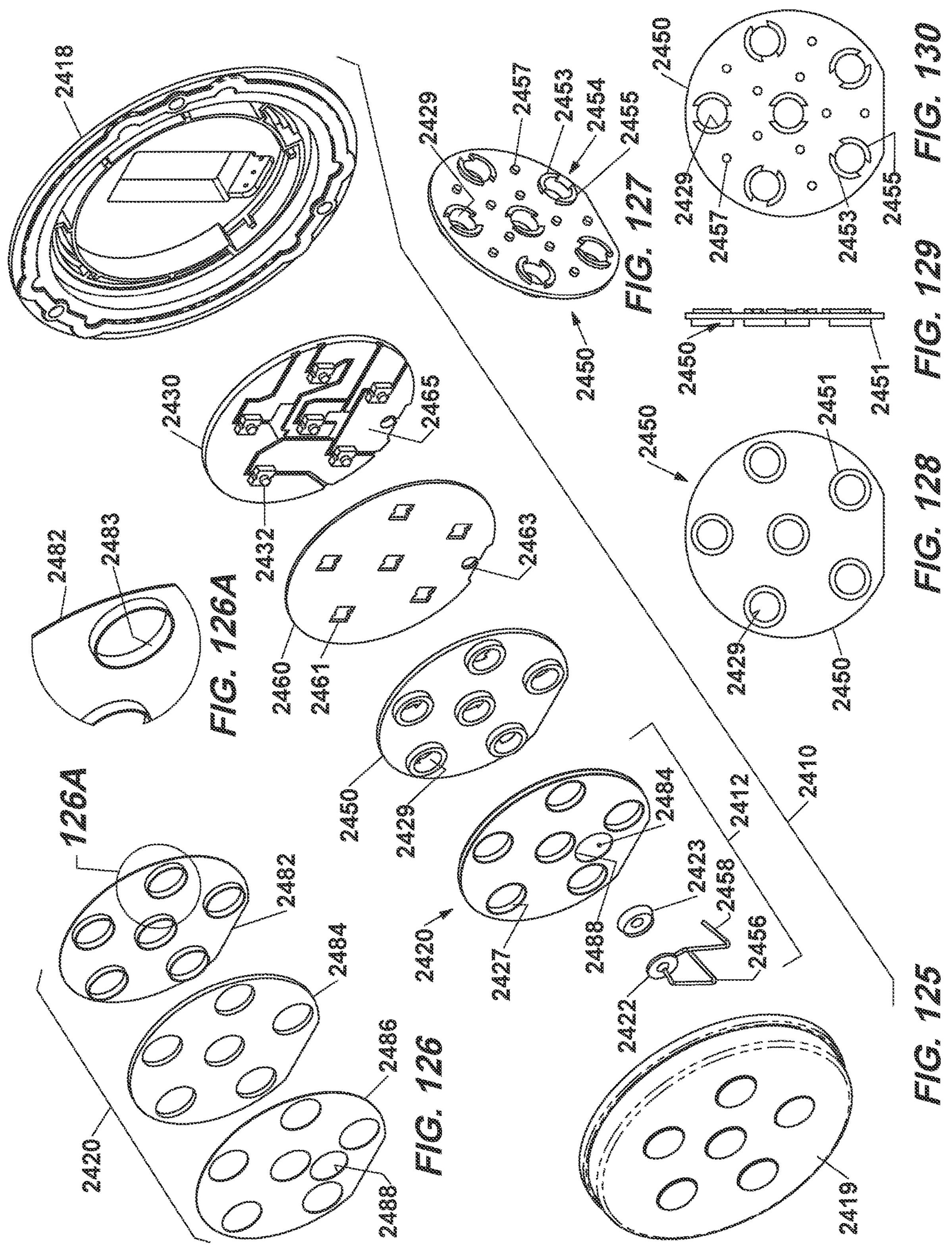
Figure 131:
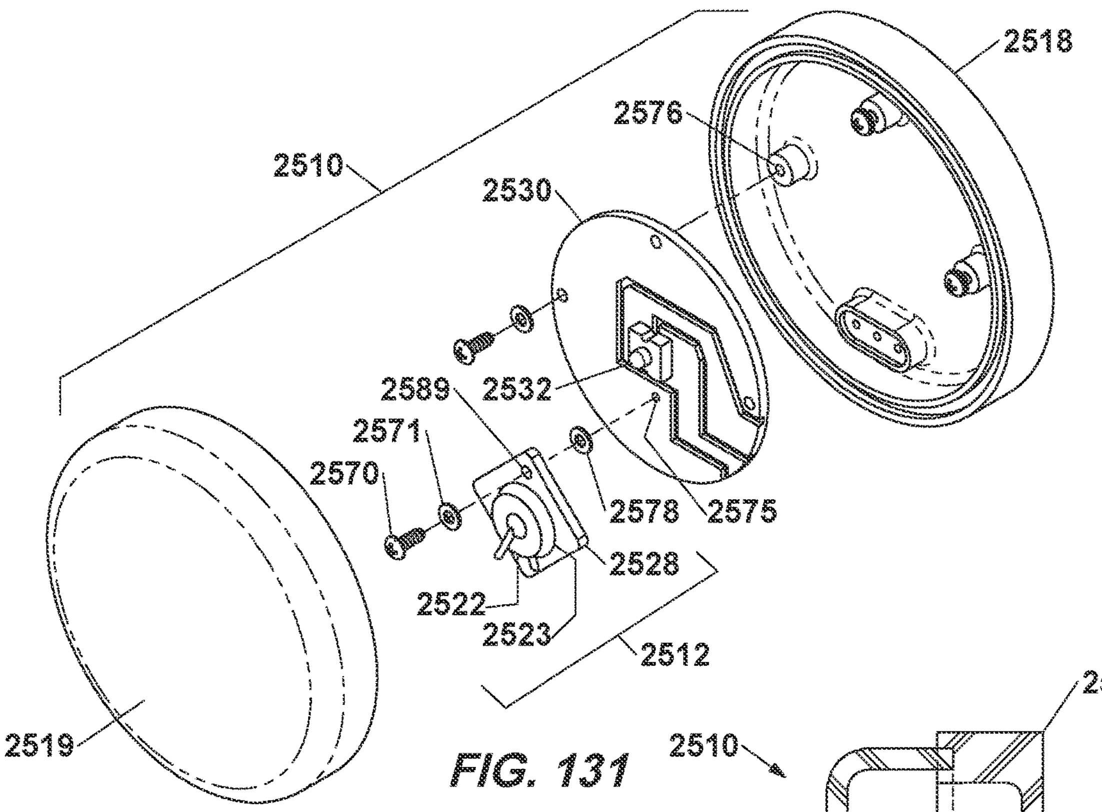
Figure 132:
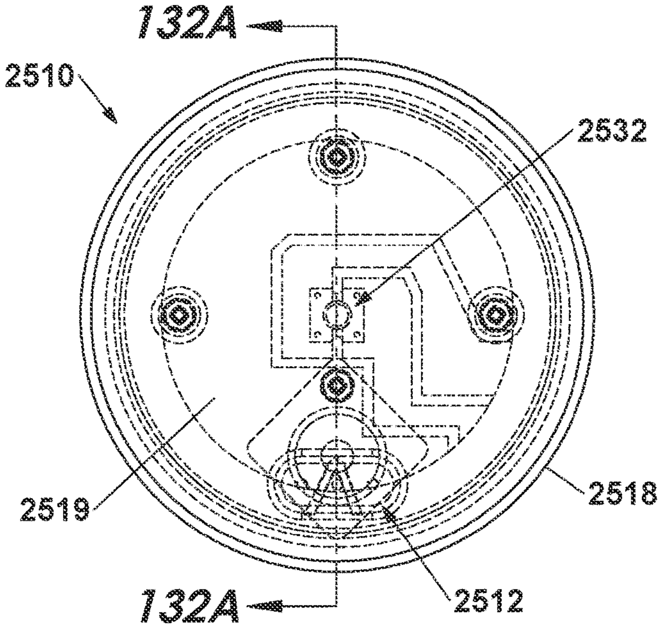
Figure 132A:
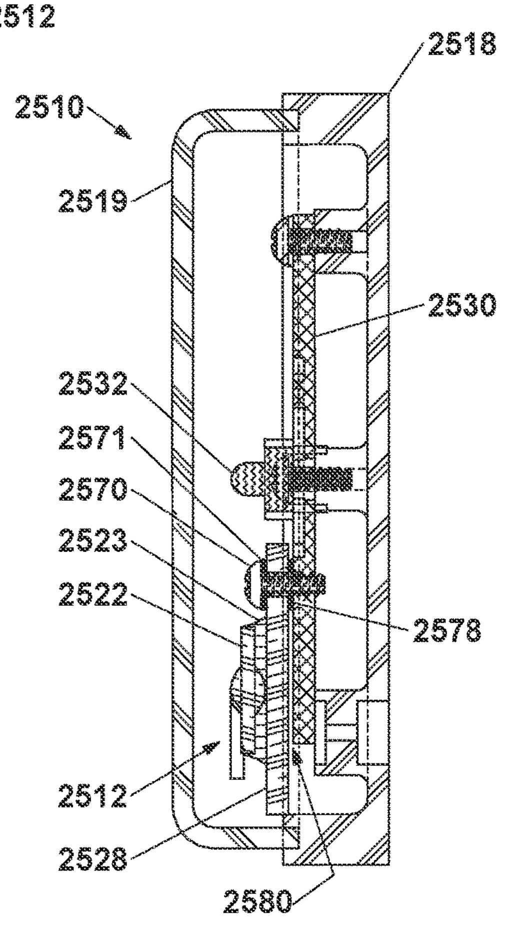
Figure 133:
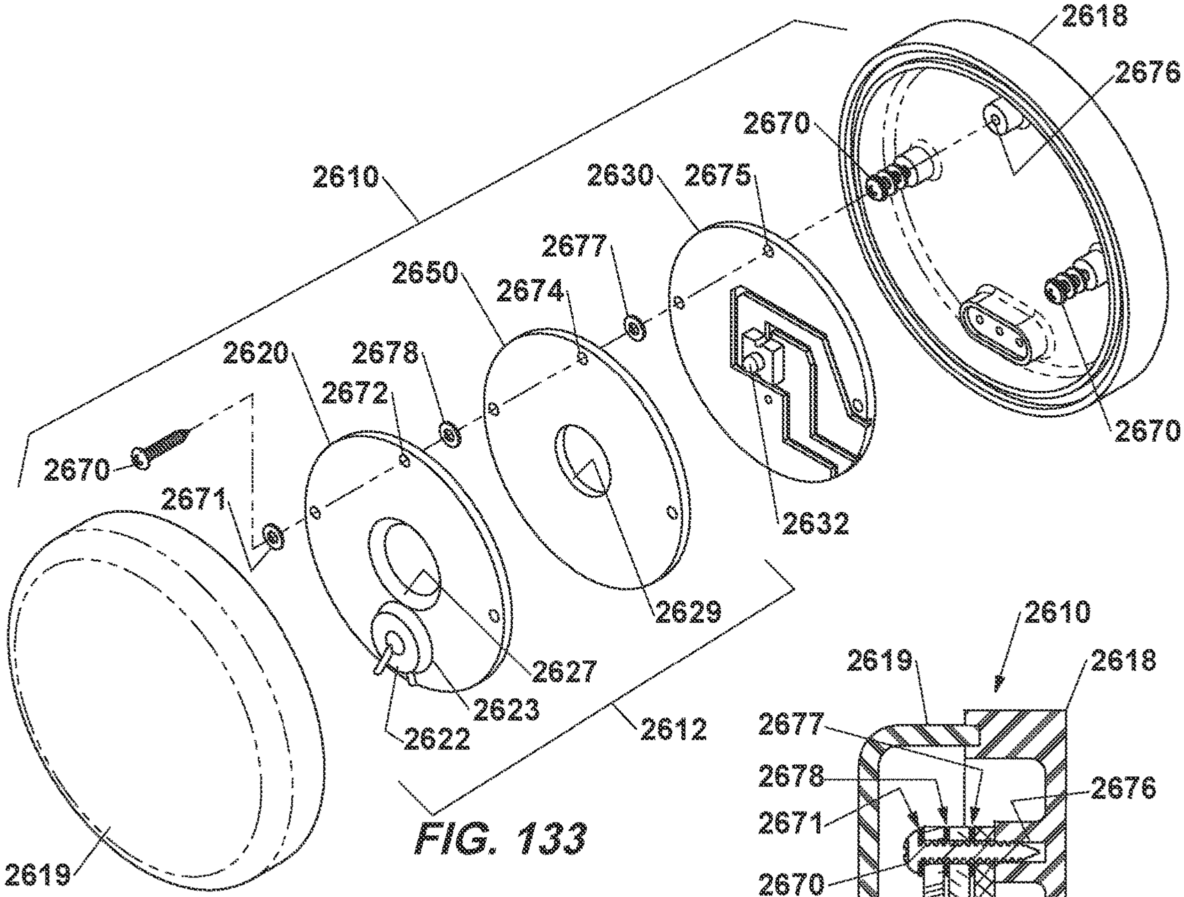
Figure 134:
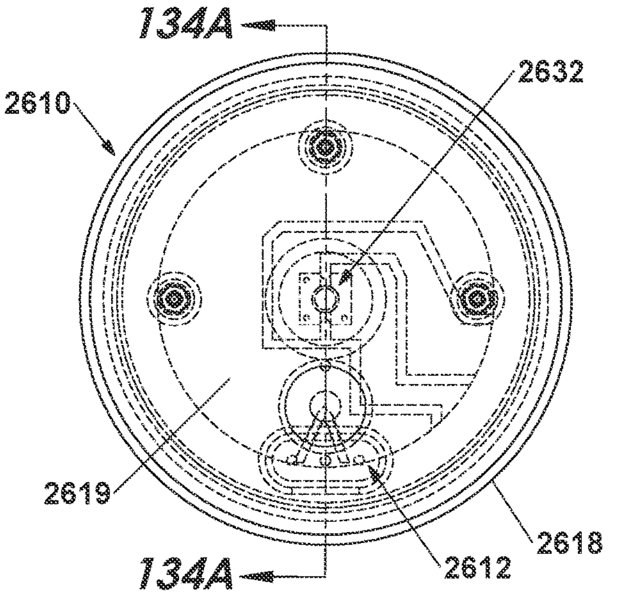
Figure 134A:
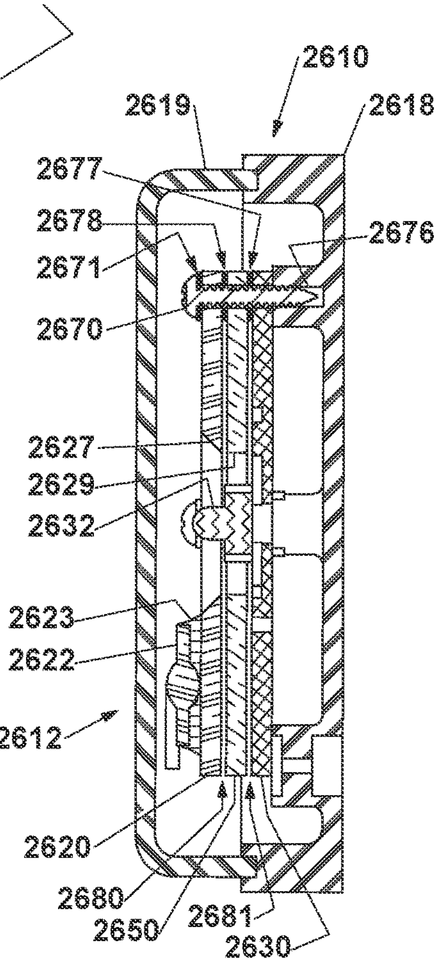
Figure 135:
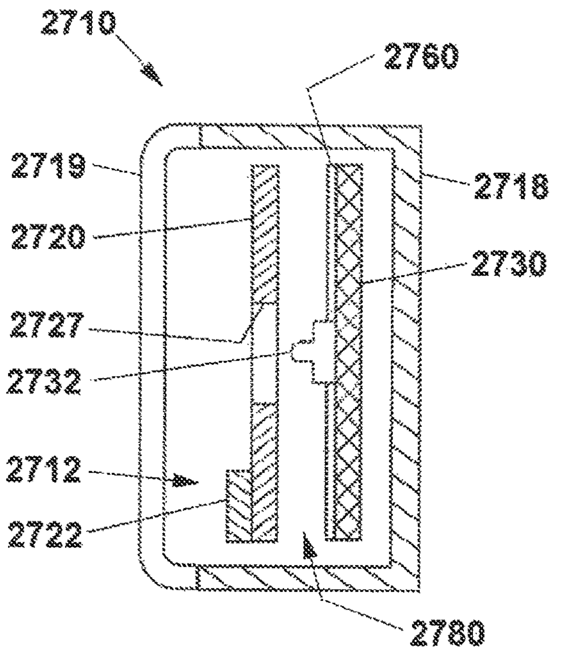
Figure 136:
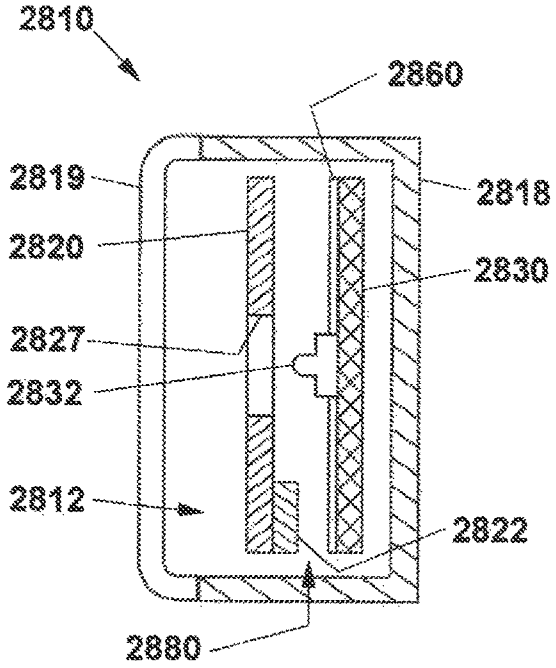
Figure 137:
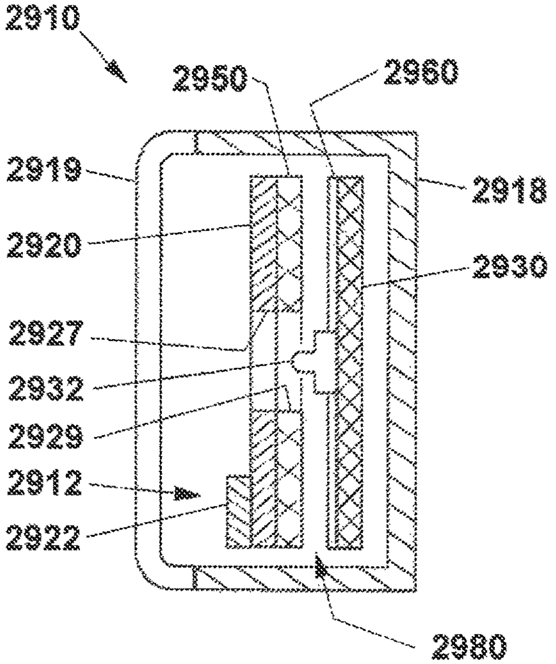
Figure 138:
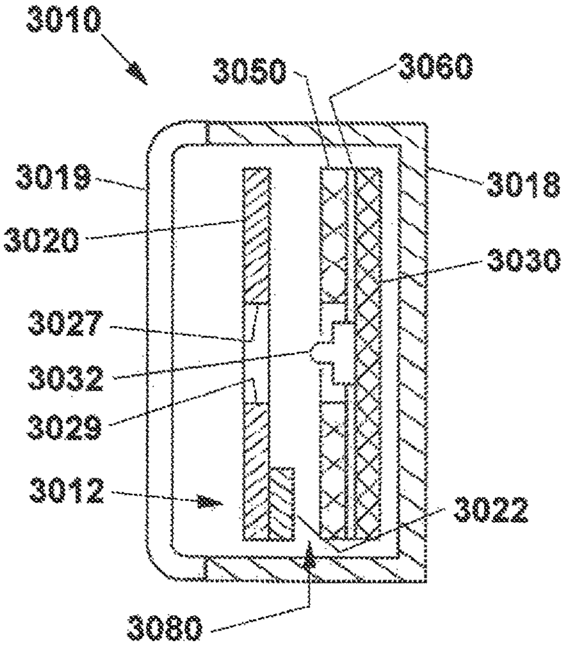
Figure 139:
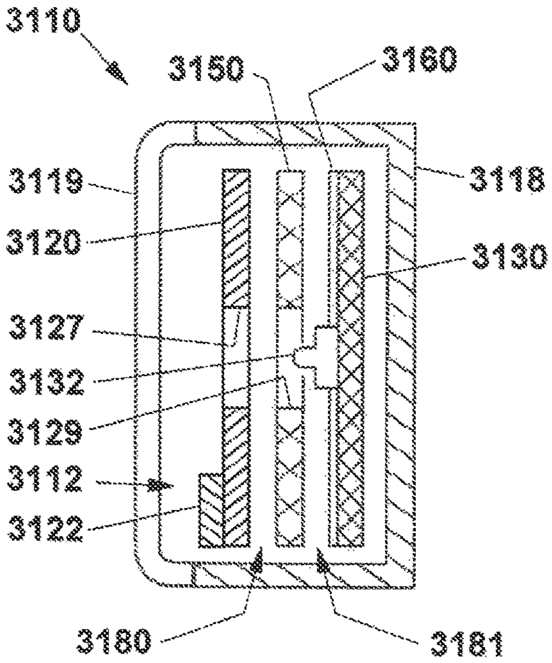
Figure 140:
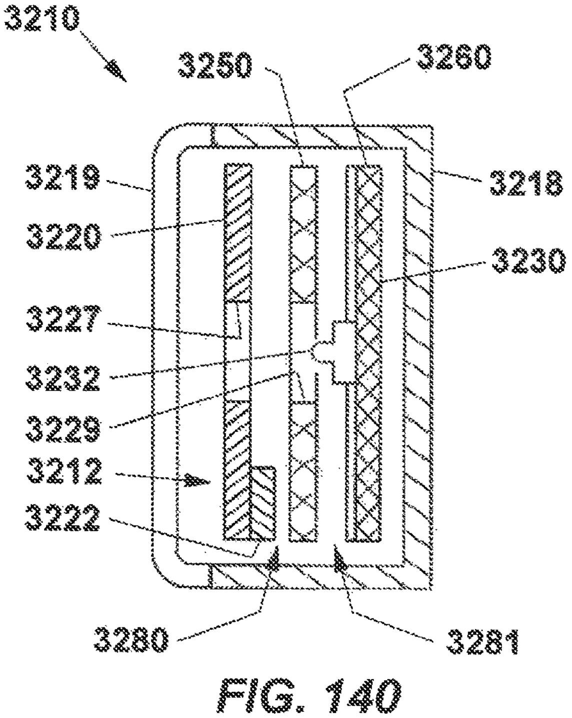
Figure 141:
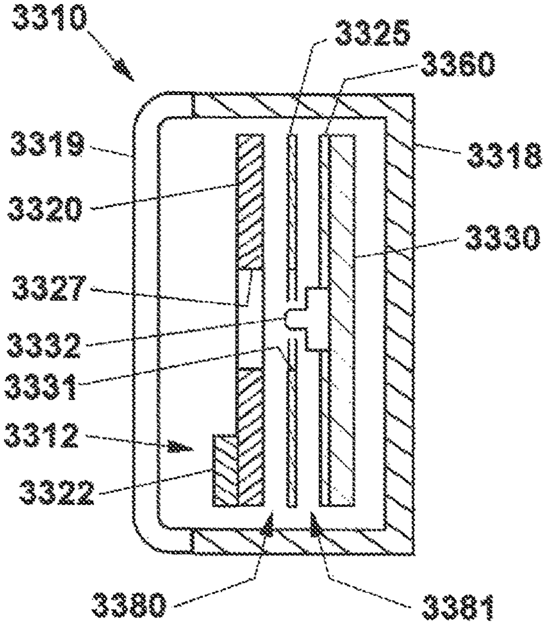
Figure 142:
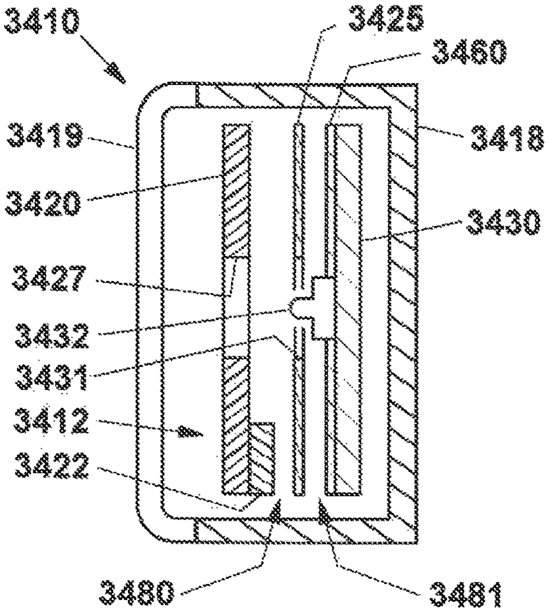
Figure 143:
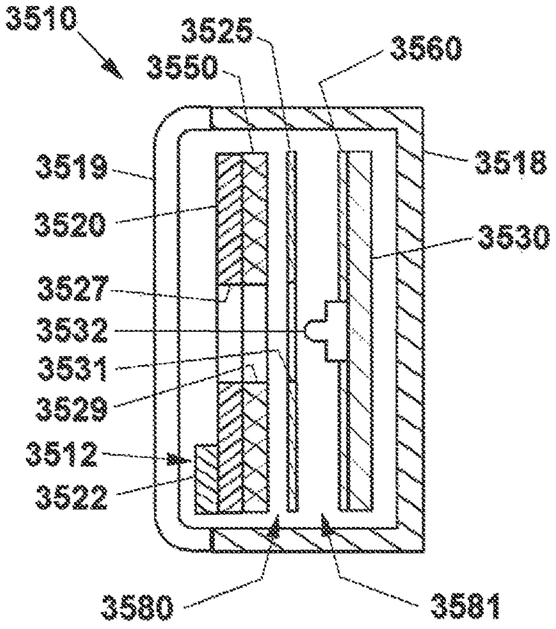
Figure 144:
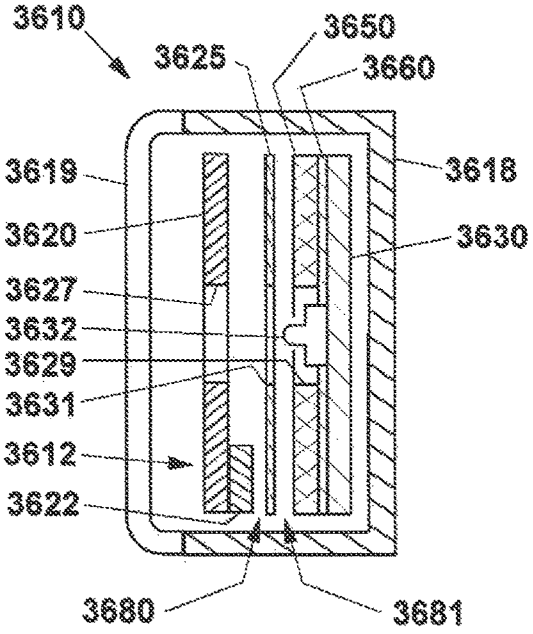
Figure 145:
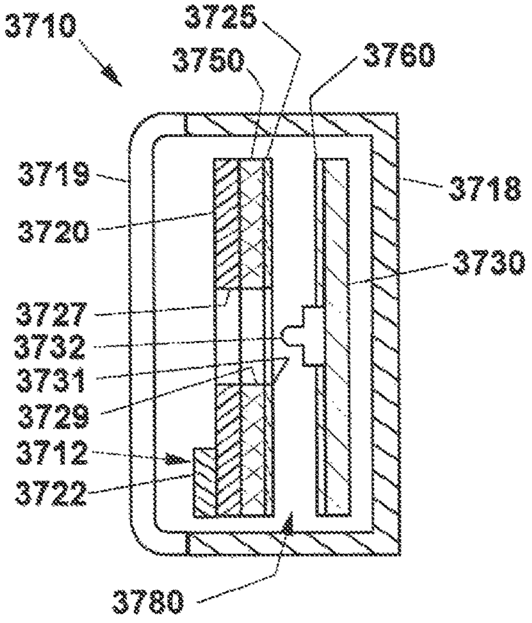
Figure 146:
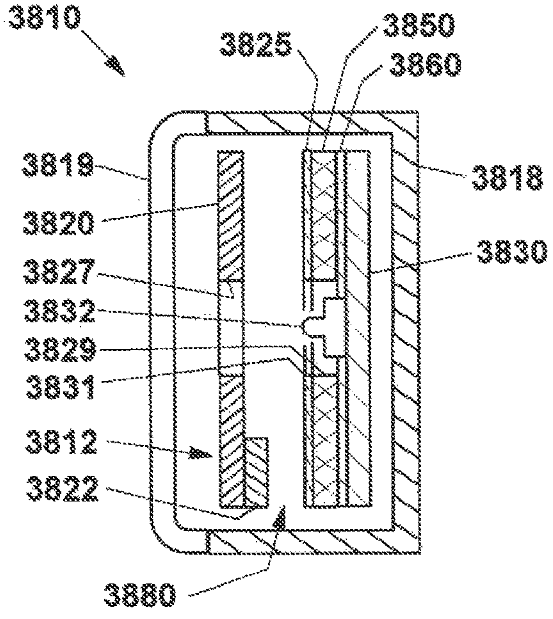
Figure 147:
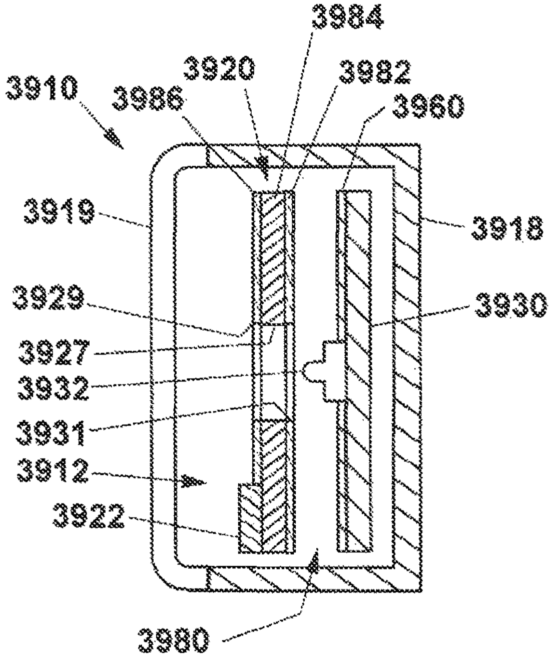
Figure 148:
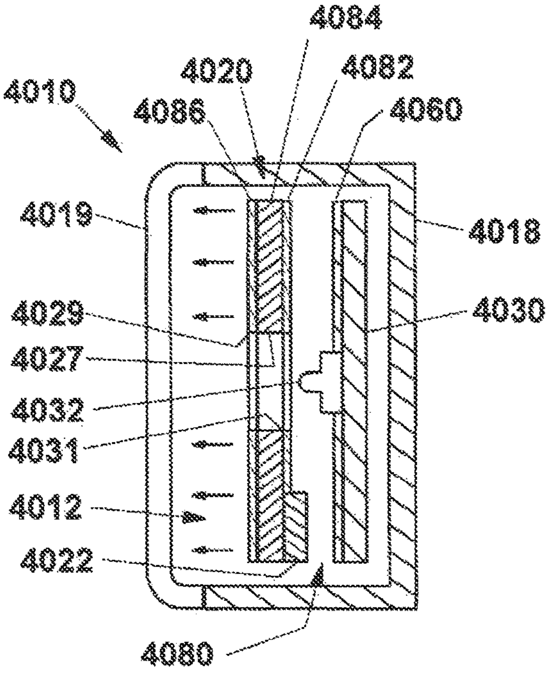
Figure 149:
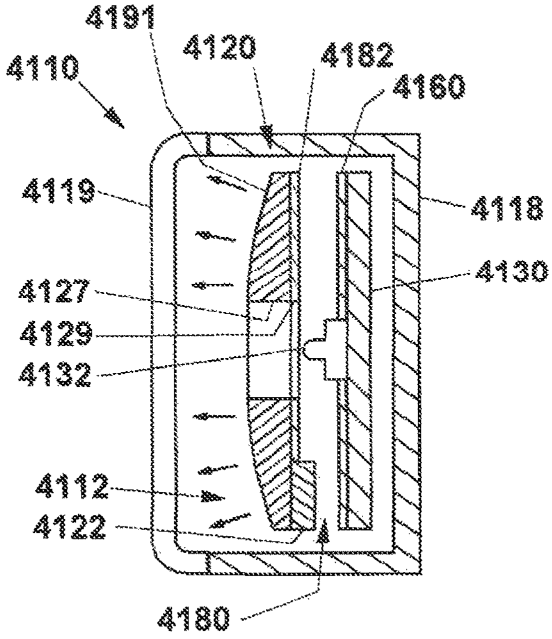
Figure 150:
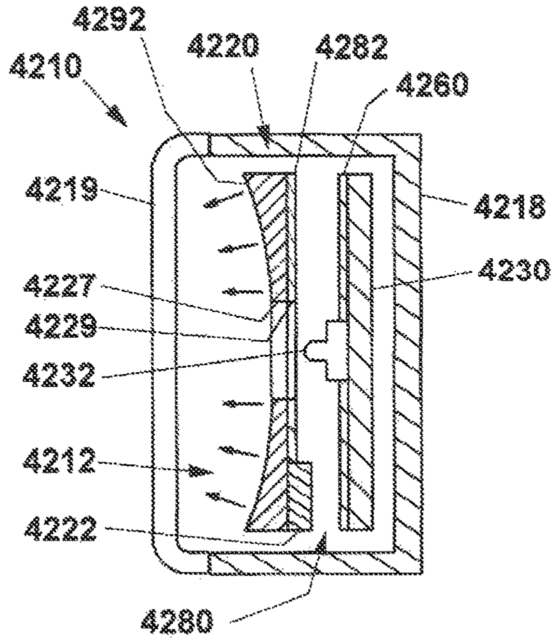

FIG. 109 is an exploded perspective view of the heated tail light assembly of FIG. 108;

FIG. 109A is a close-up perspective view of the electric PTC heater and conductor wires assembly of FIG. 109;

FIG. 110 is a front view of yet even another exemplary vehicle LED tail light assembly;

FIG. 110A is a vertical centerline-sectional view of the heated tail light assembly of FIG. 110 taken along line 110A-110A;

FIG. 1108 is an enlarged partial sectional view of the heated tail light assembly taken from encircled region 1108 of FIG. 110A;

FIG. 110C is an enlarged partial sectional view of the heated tail light assembly taken from encircle region 110C of FIG. 110A;

FIG. 111 is a right-side view of the heated tail light assembly of FIG. 110;

FIG. 112 is a partially exploded perspective view of the heated tail light assembly of FIGS. 110 and 111 with the light transmissible lens removed to show the interior details of the heated tail light assembly;

FIG. 113 is an exploded perspective view of the heated tail light assembly of FIG. 112;

FIG. 113A is an enlarged perspective view of the PTC heat assembly of FIG. 113;

FIG. 113B is an enlarged partial perspective view of the thermal insulation member of the heated tail light assembly of FIG. 113;

FIG. 114 is a front view of yet even another exemplary heated vehicle LED tail light assembly;

FIG. 115 is a right-side view of the heated tail light assembly of FIG. 114;

FIG. 116 is a partially exploded perspective view of the LED tail light assembly of FIGS. 114 and 115 with the light transmissible lens removed to show the interior details of the heated tail light assembly;

FIG. 116A is an enlarged perspective view of the heater assembly from the encircled region 116A of FIG. 116;

FIG. 117 is an exploded perspective view of the heated tail light assembly of FIG. 116;

FIG. 118 is a close-up perspective view of one of the louvered ceramic heat dissipating devices from the heated tail light assembly of FIGS. 116, 116A, and 121;

FIG. 119 is a front-end view of the louvered heat dissipating device of FIG. 118;

FIG. 119A is a cross-sectional view the louvered heat dissipating device of FIG. 119 taken along line 119A-119A;

FIG. 120 is a right-side view of the louvered heat dissipating device of FIG. 119;

FIG. 121 is a perspective view of an optional configuration array of louvered heat dissipating devices that is used in the exemplary heated vehicle LED tail light assembly of FIGS. 114-120;

FIG. 122 is a front view of an even further exemplary heated vehicle LED tail light assembly;

FIG. 122A is a vertical centerline-sectional view of the heated tail light assembly of FIG. 122 taken along line 122A-122A;

FIG. 122B is an enlarged detailed partial vertical centerline-sectional view of the heated tail light assembly taken from encircled region 122B of FIG. 122A;

FIG. 122C is an enlarged detailed partial vertical centerline-sectional view of the heated tail light assembly taken from encircled region 122C of FIG. 122A;

FIG. 123 is a right-side view of the heated tail light assembly of FIG. 122;

FIG. 124 is a partial exploded perspective view of the heated tail light assembly of FIGS. 122 and 123 with the light transmissible lens removed to show interior details of the heated tail light assembly;

FIG. 124A is an enlarged partial perspective view of the PTC heater, electrical conductors, and LED port openings in the heated tail light assembly of FIG. 124;

FIG. 125 is an exploded perspective view of the heated tail light assembly of FIG. 124;

FIG. 126 is a further-exploded perspective view of the heat transmitting plate assembly of the heated tail light assembly of FIG. 125;

FIG. 126A is an enlarged partial perspective view of a thermal insulation layer of the heat transmitting plate assembly of FIG. 126;

FIG. 127 is a rear perspective view of the thermal insulation layer of the heated tail light assembly of FIG. 125;

FIG. 128 is a front plan view of the thermal insulation layer of FIG. 127;

FIG. 129 is a side plan view of the thermal insulation layer of FIG. 128;

FIG. 130 is a rear plan view of the thermal insulation layer of FIG. 127;

FIG. 131 is an exploded perspective view of a yet even further exemplary heated vehicle LED clearance, or side marker light assembly including a heat source assembly;

FIG. 132 is a front plan view including hidden lines of the heated LED clearance, or side marker light assembly of FIG. 131;

FIG. 132A is a vertical centerline-sectional view of the heated clearance, or side marker light assembly of FIG. 132 taken along line 132A-132A;

FIG. 133 is an exploded perspective view of another exemplary vehicle LED clearance, or side marker light assembly including a heat source assembly;

FIG. 134 is a front plan view including hidden lines of the heated clearance, or side marker light assembly of FIG. 133;

FIG. 134A is a sectional view of the heated clearance, or side marker light assembly of FIG. 134 taken along line 134A-134A;

FIG. 135 is a simplified centerline-sectional view of a first exemplary heated LED light assembly including a housing with a light transmissible portion and a first heat generation and delivery source;

FIG. 136 is another simplified centerline-sectional view of a second exemplary heated LED light assembly including a housing with a light transmissible portion and a first heat generation and delivery source similar to that depicted in FIG. 135;

FIG. 137 is yet another simplified centerline-sectional view of a second exemplary heated LED light assembly including a housing with a light transmissible portion and a first heat generation and delivery source similar to that depicted in FIG. 135;

FIG. 138 is even another simplified centerline-sectional view of a second exemplary heated LED light assembly including a housing with a light transmissible portion and a first heat generation and delivery source similar to that depicted in FIG. 135;

FIG. 139 is yet even another simplified centerline-sectional view of a second exemplary heated LED light assembly including a housing with a light transmissible portion and a first heat generation and delivery source similar to that depicted in FIG. 135;

FIG. 140 is an even further simplified centerline-sectional view of a second exemplary heated LED light assembly including a housing with a light transmissible portion and a first heat generation and delivery source similar to that depicted in FIG. 135;

FIG. 141 is yet even another simplified centerline-sectional view of a second exemplary heated LED light assembly including a housing with a light transmissible portion and a first heat generation and delivery source similar to that depicted in FIG. 135;

FIG. 142 is a further simplified centerline-sectional view of a second exemplary heated LED light assembly including a housing with a light transmissible portion and a first heat generation and delivery source similar to that depicted in FIG. 135;

FIG. 143 is yet even another simplified centerline-sectional view of a second exemplary heated LED light assembly including a housing with a light transmissible portion and a first heat generation and delivery source similar to that depicted in FIG. 135;

FIG. 144 is even another simplified centerline-sectional view of a second exemplary heated LED light assembly including a housing with a light transmissible portion and a first heat generation and delivery source similar to that depicted in FIG. 135;

FIG. 145 is yet another simplified centerline-sectional view of a second exemplary heated LED light assembly including a housing with a light transmissible portion and a first heat generation and delivery source similar to that depicted in FIG. 135;

FIG. 146 is yet even another simplified centerline-sectional view of a second exemplary heated LED light assembly including a housing with a light transmissible portion and a first heat generation and delivery source similar to that depicted in FIG. 135;

FIG. 147 is a further simplified centerline-sectional view of a second exemplary heated LED light assembly including a housing with a light transmissible portion and a first heat generation and delivery source similar to that depicted in FIG. 135;

FIG. 148 is yet a further simplified centerline-sectional view of a second exemplary heated LED light assembly including a housing with a light transmissible portion and a first heat generation and delivery source similar to that depicted in FIG. 135;

FIG. 149 is yet even a further simplified centerline-sectional view of a second exemplary heated LED light assembly including a housing with a light transmissible portion and a first heat generation and delivery source similar to that depicted in FIG. 135; and FIG. 150 is even another simplified centerline-sectional view of a second exemplary heated LED light assembly including a housing with a light transmissible portion and a first heat generation and delivery source similar to that depicted in FIG. 135.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

LED (light emitting diode) vehicle illumination assemblies, or light enclosures for on-road or off-road typically do not have independent heat sources separate from the light source. LED heat source life expectancy can also be detrimentally affected by overheating. A series of temperature controlled heat sources for vehicle illumination assemblies are shown below in FIGS. 1-150. These lights are independently controlled environments that power a heat source having a Positive Temperature Coefficient (PTC) heater and a ceramic radiant heat dissipating body configured to deliver heat via an optimized combination of radiation and convection to the light transmissive portion, or lens in a manner that imparts a constant temperature on the surface of the lens. Such configuration mitigates ice, fog and/or condensation build up on the inside or outside of the lens, mitigating or eliminating light occlusion even in the coldest climates or in high humidity environments where moisture can condense on the lens. An adaptable heating system is used to perform this task. PTC (Positive Temperature Coefficient) heating elements provide a mechanism where the heater is internally self-regulating, practically eliminating the need for an external power control or thermostat. The heating element filament will increase or decrease the resistive property (increasing the resistance decreases the current flow and heat and decreasing the resistance increases the current flow and heat) depending on it's own internal temperature in combination with it's own surrounding temperature. This enables the PTC heating element to self-regulate current flow through the device and in particular, heat output of the device within a pre-determined and usefully accurate range. Additionally, use of the PTC heating elements offers the useful advantage of inherent or built-in control of heat output and consumption of electrical current for more efficient power consumption than for regular, or prior design heating elements. Furthermore, new radiant heat transfer structures and components are implemented with the PTC heater. The prior design heating elements just turn on to the maximum heat, until an external thermostat turns it off by means of an additional control system or electronic circuitry. PTC heaters can be designed or otherwise pre-selected to operate within a desired range of temperatures and output heat characteristics for a given application offering inherent simplicity over previous methods. The PTC heater and ceramic radiant heat dissipating body is placed within the enclosure, allowing for increased radiative heat transfer to occur in combination with convective heat transfer (hot air rises and cold air will cycle down), and ensuring greater heat transfer to the lens. In one embodiment, the PTC heating element is electrically adapted or connected right into the existing light power circuitry, making installation of a heated light as simple as unplugging one and plugging in or adapting the other in its place.

Provision of increased radiative heat transfer over prior efforts via use of a ceramic radiant heat dissipative body provides enhanced ability to eliminate condensation from within and outside of a vehicle lens, both frozen and liquid (vapor). Radiant heat transfer and convective heat transfer are largely independent and unrelated mechanisms and both are optimized by the present designs. Radiant emissions (heat transfer) can occur in a vacuum whereas convective heat transfer cannot occur in a vacuum. This is because radiant heat transfer is purely black body radiation in accordance with the Stefan-Boltzmann law: $j^*=\epsilon\sigma T^4$, where: $j^*$ is the radiant flux, or irradiance (Watts/meter$^2$), $\epsilon(<1)$ is the emissivity, $\sigma$ is the Stefan-Boltzmann constant, and T is the absolute temperature of the body. Good emissivity typically means that the surface looks black, especially at the peak spectrum of the radiator, which depends on the temperature. Effective heat convection typically involves superior heat conductors (typically metal) with granular surface to achieve larger surface area in contact with the surrounding gas, or larger surface areas. The balancing between conductive heat transfer and radiant heat transfer is typically slight—very little to trade off because radiant heat dissipation is an order of magnitude larger than convective heat dissipation in air at one atmosphere pressure. This matter is different when dealing with higher density gas.

Figure 1:
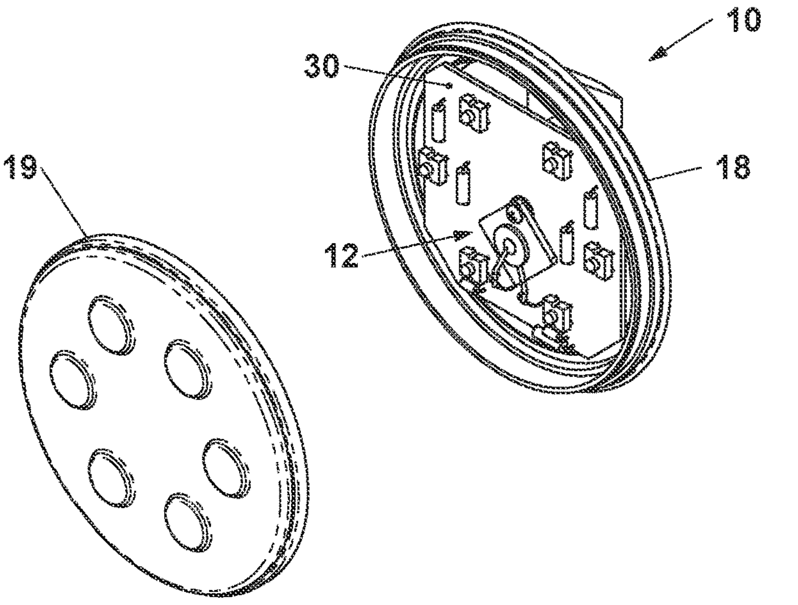
FIG. 1 is a perspective view of a tail light assembly with the lens removed showing a heat source with a ceramic radiant heat dissipative body and a PTC heater.

FIG. 1 illustrates one construction for a vehicle illumination system, or vehicle tail light 10 having a heat source 12 with a ceramic radiant heat dissipating body 20 (see FIG. 2) and a custom PTC (positive temperature coefficient) heater unit 22 (see FIG. 2), respectively, designed to keep the ambient temperature within the vehicle light 10 (such as a head light, tail light or marker light) at approximately 140 Degrees F. (60 Degrees C.). Heat source 12 is affixed to an LED printed circuit board 30 that is further affixed into a housing 18 and behind a lens 19. This heat source 12 allows for the heat transfer to a lens, or light transmissive portion 19 to be hot enough to mitigate or eliminate condensation, either frozen or liquid, from occluding light transmission through the lens 19. Although depicted on a vehicle tail light, it is understood that heat source 12 can be implemented on any other type of vehicle light, such as headlights, side marker lights, stop lights, non-powered safety reflectors, and stationary non-vehicle light fixtures.

Figure 2:
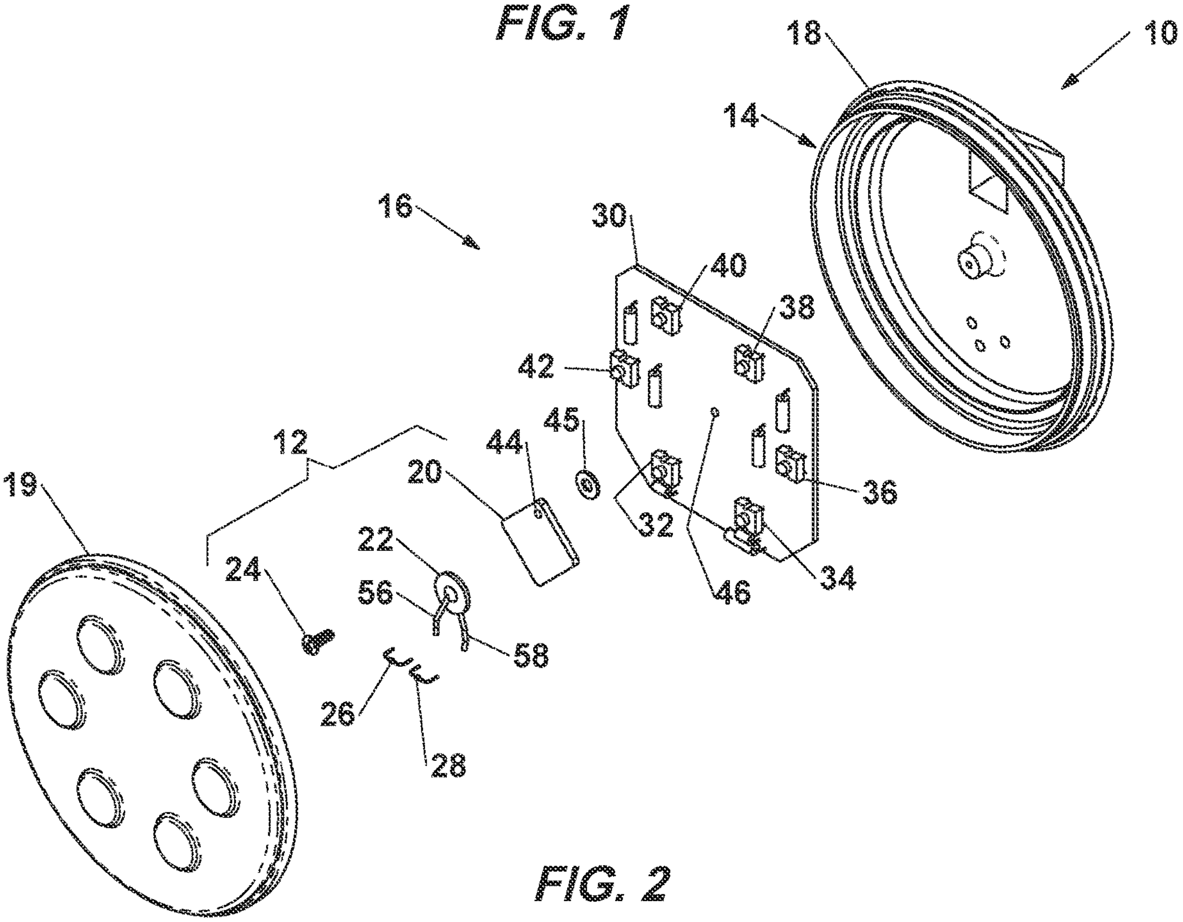
FIG. 2 is an exploded perspective view from above of the heat source and tail light assembly of FIG. 1 according to another aspect.

As shown in FIG. 2, vehicle tail light 10 includes further details in exploded perspective view of heat source 12 on PC board 30 of a light source 16 mounted within housing assembly 14 to housing 18 beneath lens 19. More particularly, heat source 12 includes a rectangular thin walled ceramic plate 20 onto which a Positive Temperature Coefficient (PTC) heater 22 is adhesively affixed with a thermally transmissive heat resistant adhesive 23 (see FIG. 4) to ceramic plate 20. A threaded fastener, or screw 24 is received through a hole 44 drilled through ceramic plate 20, through a spacer washer 45 and into a hole 46 within PC board 30 to rigidly secure heat source 12 onto PC board 30 in spaced-apart relation. In this configuration, heat source 12 is mounted centrally of an array of six individual light emitting diode (LED) illumination sources 32, 34, 36, 38, 40 and 42 each mounted onto a front face of PC board 30. A pair of bridge conductive wire leads, or jumpers 26 and 28 are soldered between insulated conductive leads 56 and 58, respectively, on opposite sides of PTC heater 22 and to ground and power leads on PC board 30 that feed power to the series of LED illumination sources 32, 34, 36, 38, 40 and 42. Leads 56 and 58 are soldered to opposed surfaces, or termination poles of PTC heater 22.

Figure 3:
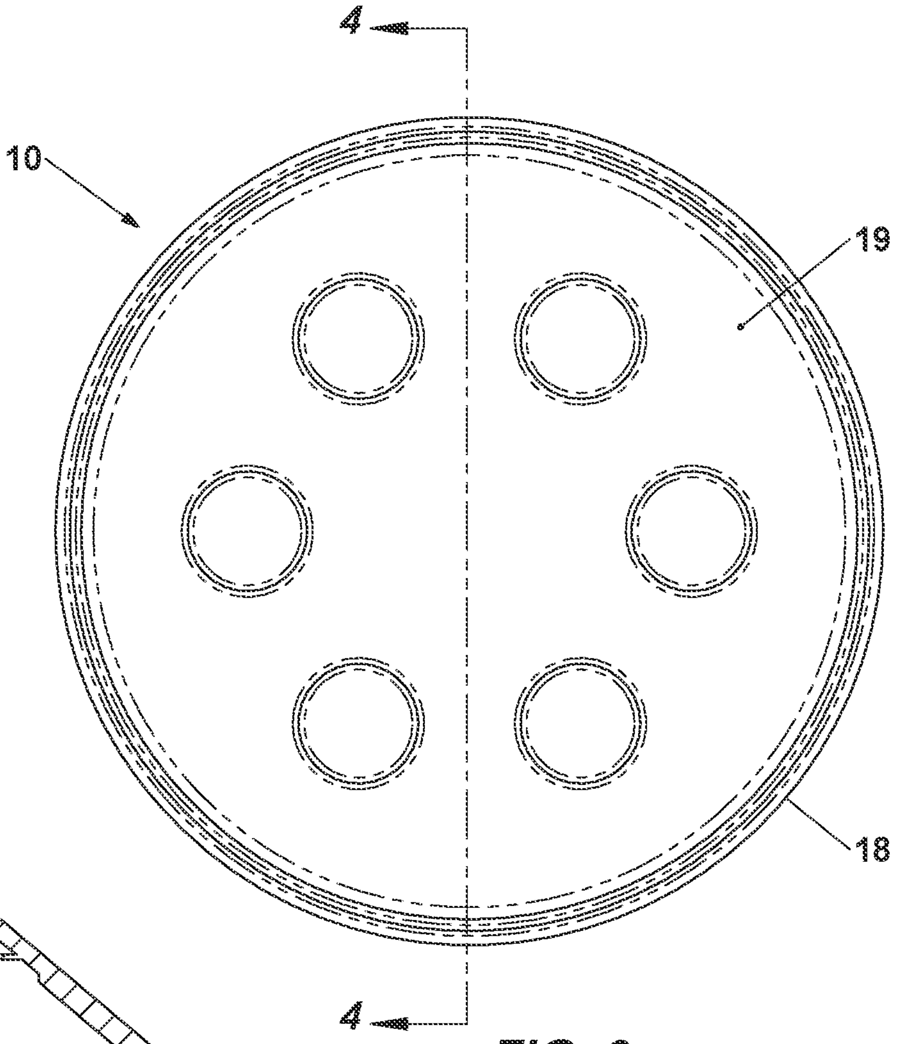
FIG. 3 is a front view of the assembled tail light assembly of FIGS. 1-2.

FIG. 3 illustrates vehicle illumination system 10 in front view showing a light transmission portion comprising a central cylindrical portion of lens 19 provided within the bounds of housing 18.

Figure 4:
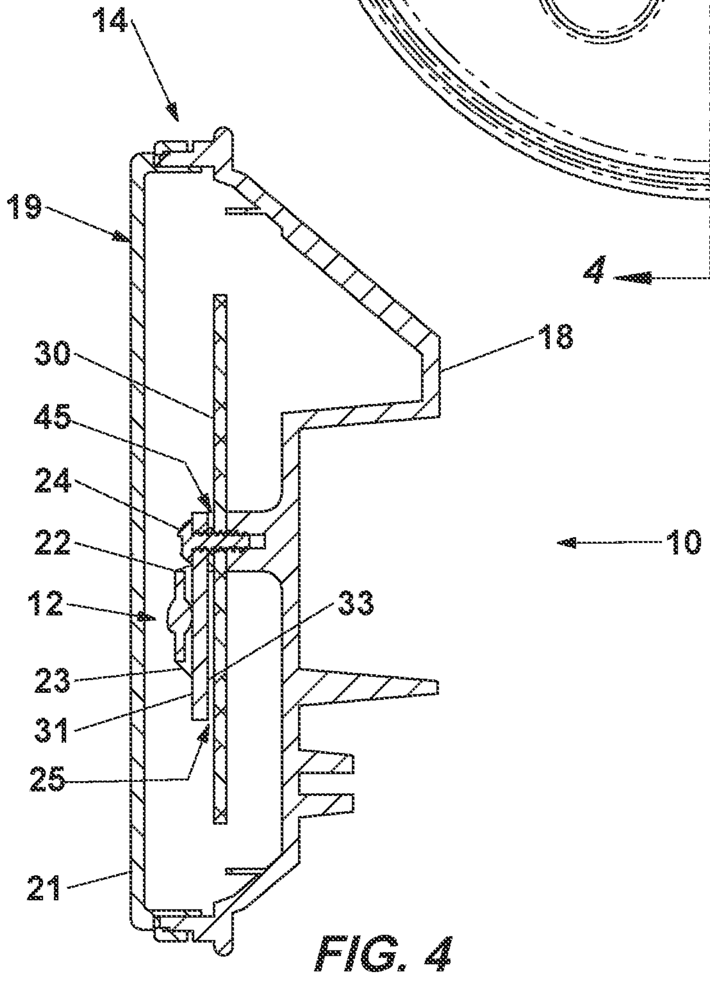
FIG. 4 is a cross-sectional view of the heat source taken along line 4-4 of FIG. 3.
Figure 5:
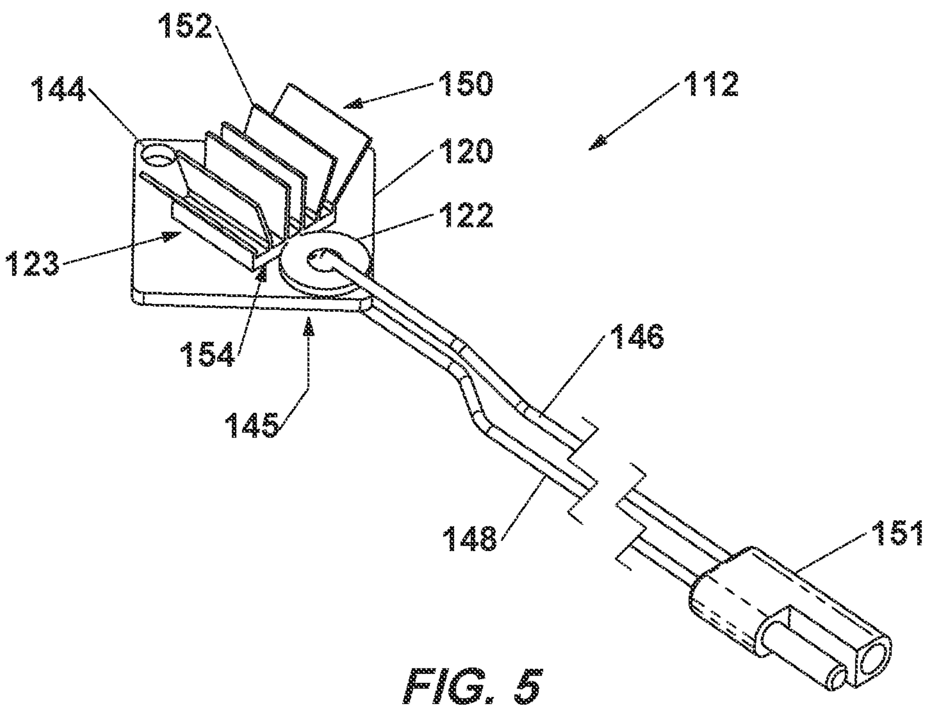
FIG. 5 is a perspective view of an alternative construction heat source for use in the tail light assembly of FIGS. 1 and 2.

FIG. 4 illustrates in vertical sectional view assembly details of vehicle illumination system 10. More particularly, housing 14 forms an internal cavity between housing member 18 and lens 19 within which heat source 12 is rigidly affixed to PC board 30 and housing 18 via threaded fastener 24. Solder bumps on opposed faces result from attachment of conductive leads (not shown). Thermally conductive and heat resistant adhesive 23 is used to affixed PTC heater 22 in thermally conductive relation with an outer surface 31 of the ceramic radiant heat dissipating body, or square ceramic thin plate 20. An inner surface 33 of plate 20 is spaced apart from PC board 30 by a gap 25 define by the thickness of spacer washer 45. In operation, heat source 12 is powered to supply heat into ceramic plate 20 which is proximate an inner surface of light transmissive portion 21 of lens 19, imparting both radiant heat transfer, as well as convective heat transfer to the lens. Ceramic plate 20 has an emissivity higher than that found on earlier metal and anodized metal heat sink designs, above 0.75 and in the range of 0.9 to 0.95 which imparts a significant and greater radiant heat delivery to lens 19 to mitigate and/or eliminate condensation building on either inner or outer surfaces of lens 19 due to solid (frozen) or liquid condensation. In some cases, plate 20 can be formed of a ceramic that has surface pores that increase surface area for convective heat transfer. In other cases, plate 20 can be formed from porcelain. In yet other cases, plate 20 can be formed of a smooth surface ceramic material. It should be understood that the heated tail light assembly of FIGS. 1-4 depict and provides self-contained heated tail light with no further modification to the vehicle or electrical wiring onto which it is installed FIG. 5 is a perspective view of an alternative construction heat source 112 for use in the tail light assembly of FIGS. 1 and 2, or for use in any other form of vehicle illumination system. More particularly, a thin ceramic plate 120 has a mounting hole 144 drilled through one corner and a conductive lead hole 145 drilled through an opposite corner. A finned ceramic body 150 is adhesively affixed atop a top surface of ceramic plate 120 using a thermally conductive and heat resistant adhesive 123 provided along a bottom surface of rectangular base 154 of ceramic body 150. Ceramic body 150 has an integrally formed radial array of parallel individual fins, such as fin 152, also integrally formed of ceramic material. PTC heater 122 is affixed atop a top surface of ceramic plate 120 over lead hole 145 so that a bottom insulated conductive lead 146 can pass through ceramic plate 120 where a conductive end is soldered onto a bottom surface of PTC heater 122. A bottom surface of PTC heater 122 is affixed atop a top surface of ceramic plate 120 using thermally conductive and heat resistant adhesive. A top insulated conductive lead 148 is soldered at a conductive end atop PTC heater 122 and insulated wire leads 146 and 148 join together at an electrical connector assembly 151 that mates with a complementary electrical connector assembly provided on the PC board (not shown). Such connector assembly 151 facilitates insertion, removal and repair/replacement.

As shown in FIG. 5, plate 120 and fin body 150 are commercially available ceramic components available as Digi-Key Part Number 1168-1618-ND, for purchase from Digikey Electronics, 701 Brooks Avenue South, Thief River Falls, MN 56701 USA. One exemplary PTC heater 122 is commercially available from Mouser Electronics, 1000 North Main Street Mansfield, TX 76063 USA, using a PTC thermistor as a heating element. A metallized round disk PTC thermistor can be used by EPCOS/TDK, 12 Vdc, 3 ohms disc PTC heating, Series/Type: B59060, Mouser Part No. 871-B59060A0160A010, EPCOS/TDK Manufacturer Part No. B59060A0160A010. Alternatively, PTC heaters can have rectangular or square configurations. One suitable thermally conductive adhesive is Locktite 3761 UV light cured adhesive available from Henkel Corporation North America, 14000 Jamboree Road, Irvine, CA 92606 USA. Another suitable thermally conductive adhesive is available from Dymax Corporation (Headquarters), 318 Industrial Lane, Torrington, CT 06790 USA. Other suitable thermally conductive epoxy adhesives are available from Masterbond, 154 Hobart Street, Hackensack, NJ 07601 USA. Further suitable thermally conductive adhesives are available as high temperature ceramic adhesives from Aremco Products Inc., 707 Executive Blvd., Valley Cottage, NY 10989 USA.

Figure 6:
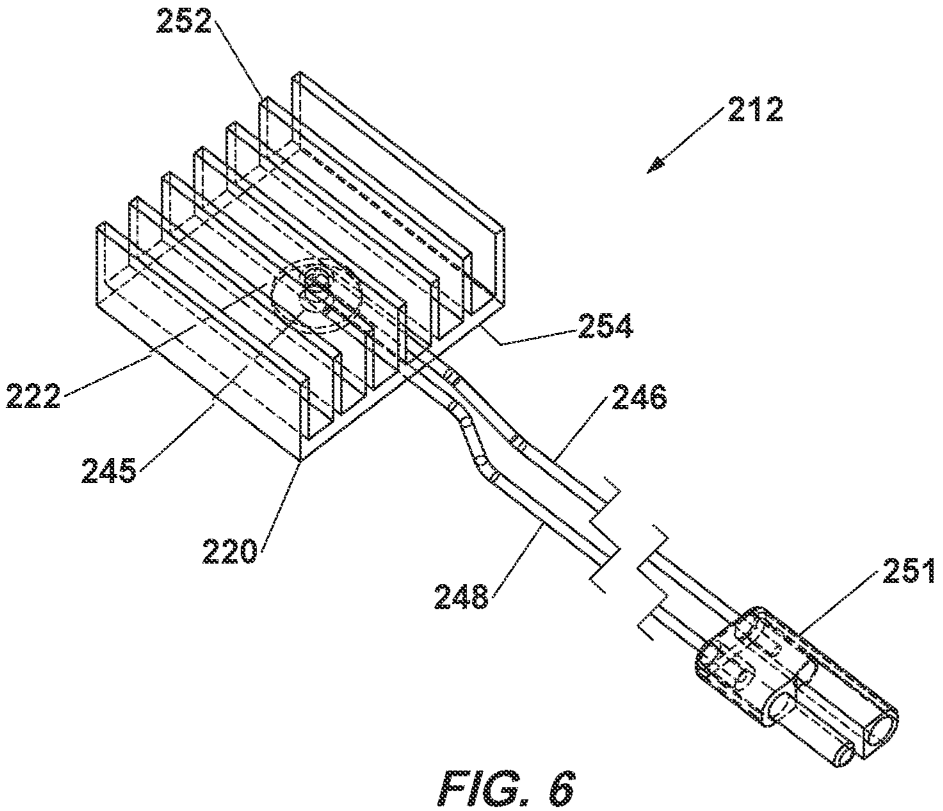
FIG. 6 is a perspective view of another alternative construction heat source for use in the tail light assembly of FIGS. 1 and 2.

FIG. 6 is a perspective view of another alternative construction heat source 212 for use in the tail light assembly of FIGS. 1 and 2, or for use in any other form of vehicle illumination system. More particularly, heat source 212 comprises a PTC heater 222 adhesively affixed to a bottom surface of a unitary ceramic finned plate 220. Plate 220 is commercially available as part number FCH252505T from AMEC Thermasol, Marcom House, 1-2 Steam Mill Lane, Great Yarmouth, Norfolk, NR31 0HP, United Kingdom. A central hole 245 is drilled through a square base plate 254 of finned plate 220, between adjacent pairs of elongate rectangular fins 252. Hole 245 is used to run a top insulated conductive lead 246 to a top surface of a PTC heater 222 where conductive end of the lead 246 is soldered to a top surface of PTC heater 222, after which PTC heater 222 is adhesively affixed with a thermally conductive and heat resistant adhesive to a bottom surface of plate 254. Another insulated conductive lead 248 with a conductive end is soldered to a bottom surface of PTC heater 222. Insulated leads 246 and 248 terminate in an electrical connector 252. Although shown as a flat plate with parallel fins 252, it is understood that ceramic plate 220 can take on any other form including circular, rectangular, and curved surfaces having fins on one or more surfaces radiating in parallel, curved, angled or any other suitable configuration integrally formed from ceramic material to increase surface area and convective heat transfer while also providing improved radiative heat transfer by using relatively high emissivity ceramic material compared to metal, aluminum and anodized aluminum heat sinks.

Figure 7:
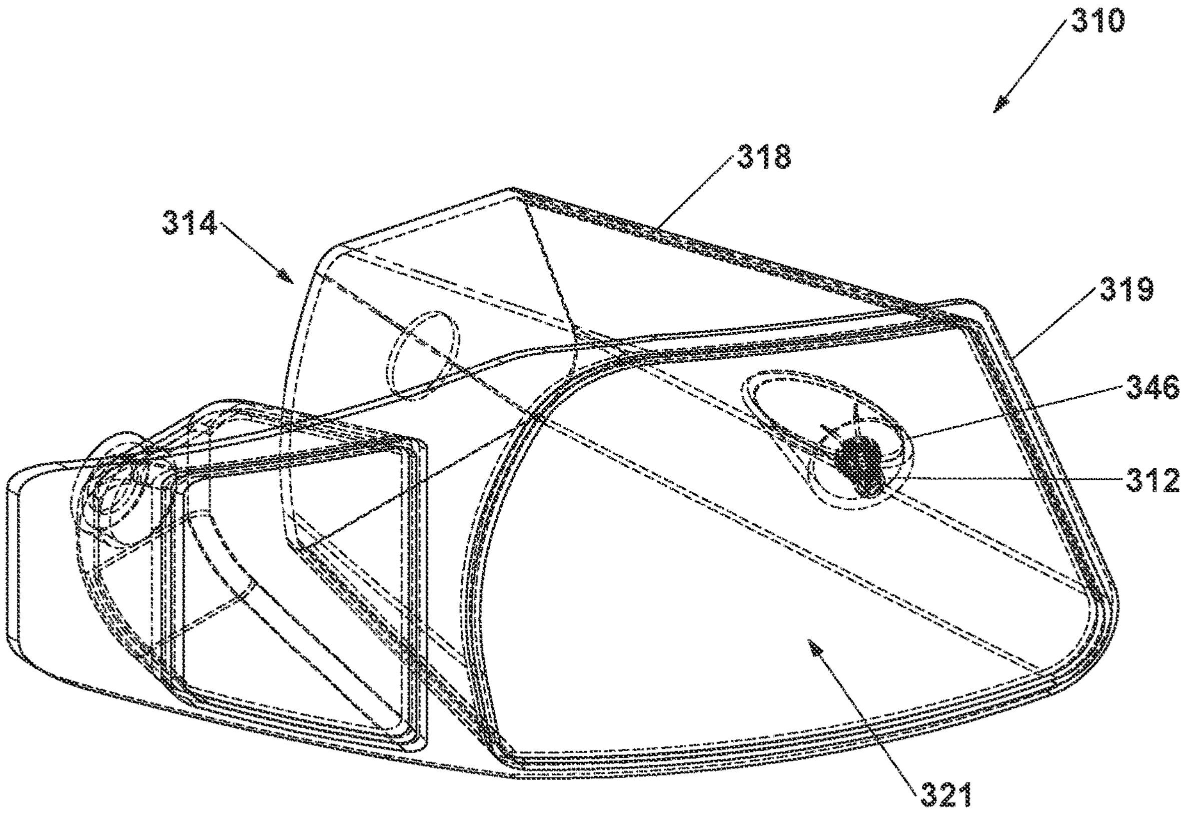
FIG. 7 is a perspective view of a head light assembly with a heat source having an elongate ceramic radiant heat dissipative body with a cylindrical ceramic portion containing a PTC heater.

FIG. 7 is a perspective view of a head light assembly 310 with a heat source 312 mounted, or rigidly affixed with a grommet in an aperture 346 of a housing 318 on a housing assembly 314 having a light transmissive portion 321 of a lens 319. Heat source 312 has an elongate ceramic radiant heat dissipative body with a cylindrical ceramic portion containing a PTC heater.

Figure 8:
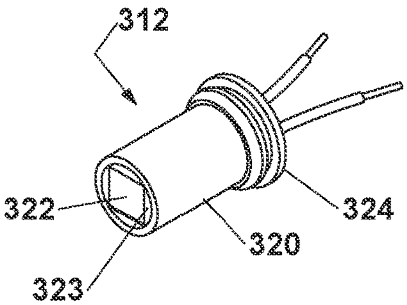
FIG. 8 is a front perspective view from above of the heat source of FIG. 7.
Figure 9:
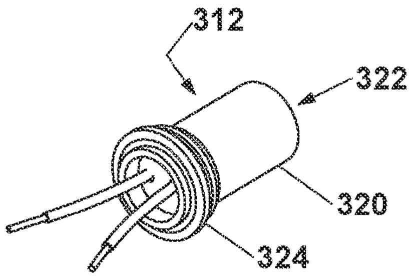
FIG. 9 is a rear perspective view from above of the heat source of FIG. 7.
Figure 10:
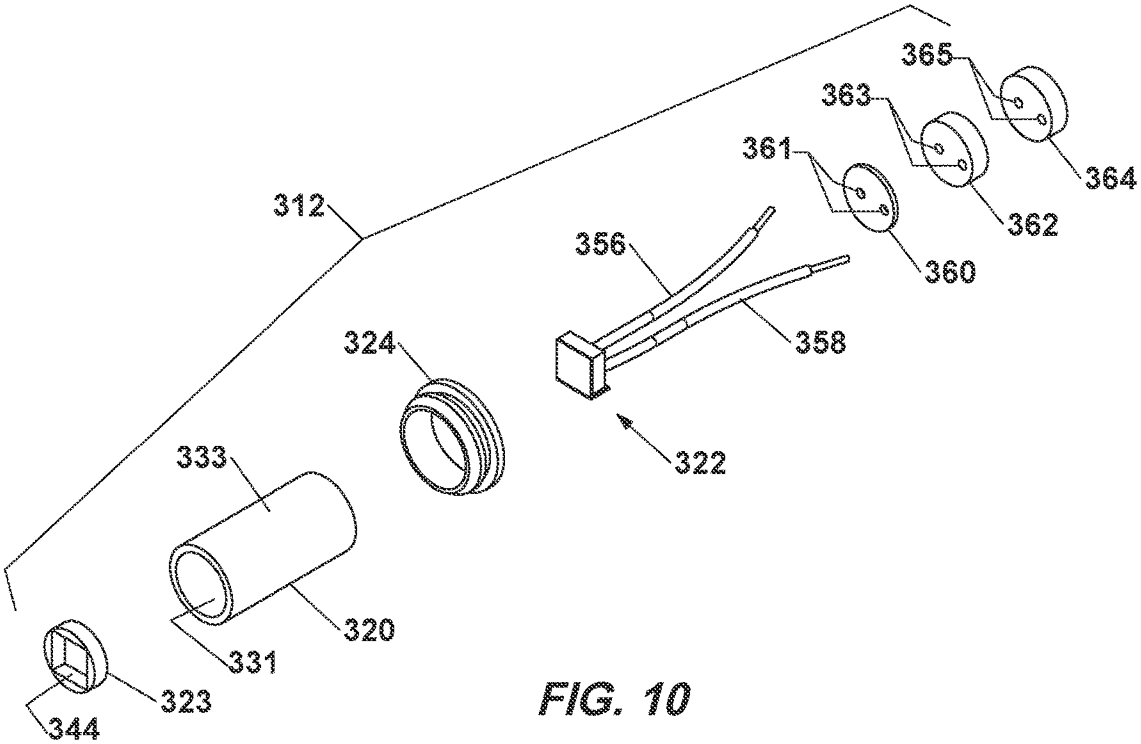
FIG. 10 is a front exploded perspective view from above of the heat source of FIGS. 8-9.

FIG. 8 is a front perspective view from above of the heat source 312 of FIG. 7. More particularly, heat source 312 includes a thin-walled ceramic cylindrical tube 320 affixed within a silicon grommet 324 at a proximal end with a PTC heater 322 affixed within the cylindrical tube 320 at a distal end with an endwall or bulkhead of thermally conductive heat resistant epoxy adhesive 323. FIG. 9 is a rear perspective view from above of the heat source 312 and contained PTC heater 322 of FIGS. 7-8 further showing the flexible silicon rubber sealing grommet 324 affixed about ceramic tube 320. FIG. 10 is a front exploded perspective view from above of the heat source 312 of FIGS. 8-9 showing the assembly of tube 320 within grommet 324 and the installation of PTC heater 322 within a square aperture 344 formed in a thermally conductive end wall 323 affixed within an inner surface 331 of tube 320 at a distal end. Insulated thermally conductive lead wires 356 and 358 pass through sealing apertures 361, 363, and 365 in respectively a cylindrical aluminum reflector plate 360, a cylindrical insulator plate 362, and a cylindrical silicon rubber end seal 364. In operation, a distal end of PTC heater 322 and end wall 323 radiates and convectively delivers heat towards a lens and within a vehicle illumination assembly (not shown), while outer surface 333 further radiates and convectively delivers heat towards a lens and within a vehicle illumination assembly (not shown).

Figure 11:
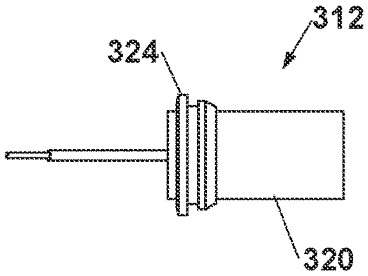
FIG. 11 is a left side view of the heat source of FIGS. 8-10.
Figure 12:
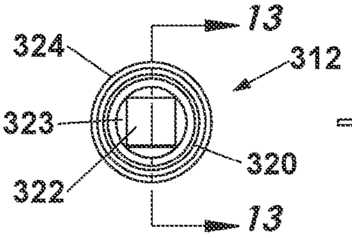
FIG. 12 is a front end view of the heat source of FIGS. 8-11.
Figure 13:
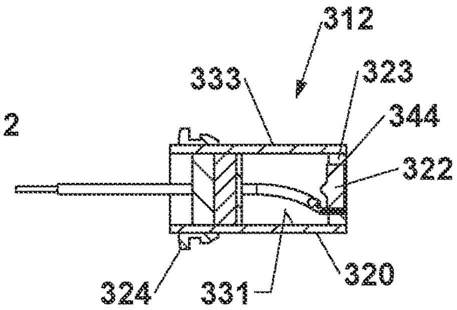
FIG. 13 is a vertical sectional view taken along line 13-13 of FIG. 12.

FIGS. 11-13 further illustrate ceramic tube 320 of heat source 312 coaxially received in sealing relation within silicon rubber grommet 324. Grommet 324 is urged in assembly within a bore, or aperture formed in a wall portion of a vehicle illumination housing where the grommet 324 seals within the aperture. Further details of PTC heater 322 potted within or adhesively affixed within in a window or receptacle 344 of thermally conductive end wall 323 are shown in FIGS. 12 and 13 spaced from grommet 322. According to one construction, end wall 323 is formed from a plug of thermally conductive adhesive, such as an epoxy adhesive. Optionally, end wall 323 can be formed from a ceramic filled adhesive. The PTC heating element of heater 322 delivers heat through end wall 323 to an inner surface 331 of ceramic tube 320 to radiate (and convect) heat from outer surface 333 of tube 320.

Figure 14:
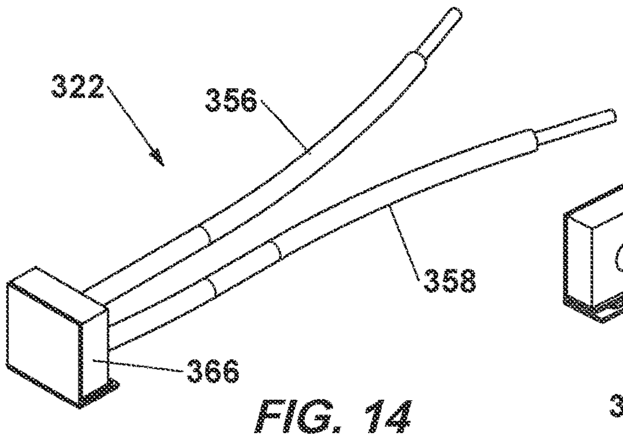
FIG. 14 is a front perspective view of the PTC heater of the heat source of FIGS. 8-13.
Figure 15:
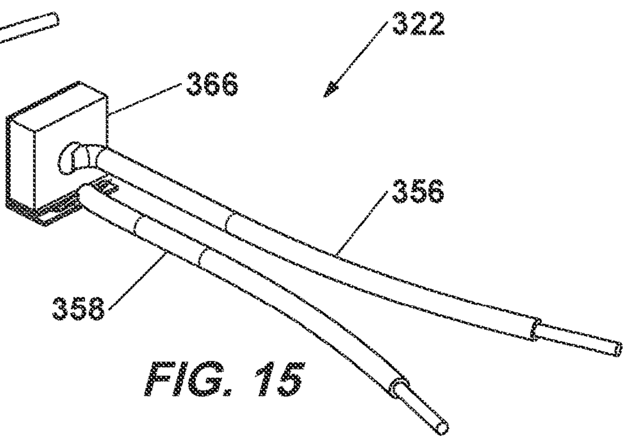
FIG. 15 is a rear perspective view of the PTC heater of FIG. 14.
Figure 16:
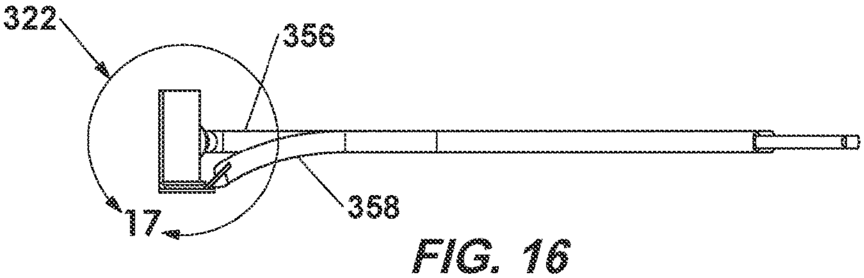
FIG. 16 is a right side view of the PTC heater of FIGS. 14-15.
Figure 17:
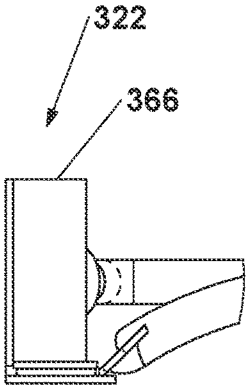
FIG. 17 is enlarged side view taken from encircled region 17 of FIG. 16.
Figure 18:
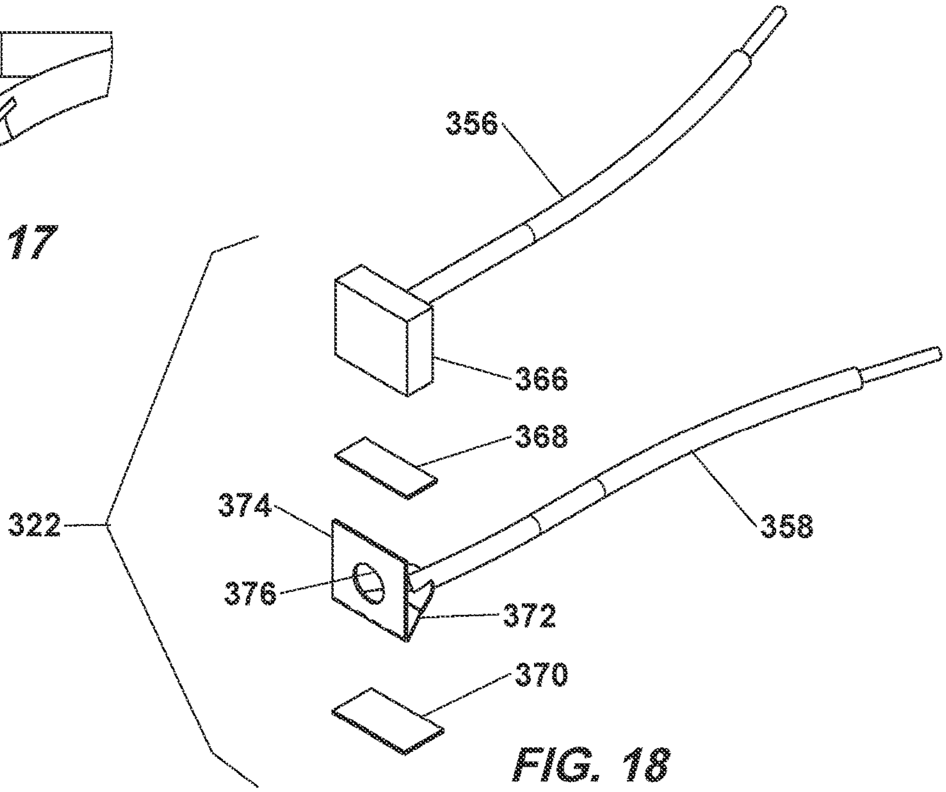
FIG. 18 is an exploded front perspective view of the PTC heater of FIGS. 14-17.

FIG. 14 is a front perspective view of the PTC heater 322 of the heat source 312 of FIGS. 8-13. More particularly, a square PTC body 366 has a pair of back and front insulated conductive leads 356 and 358. As shown in FIG. 15-17, lead 356 of heater 322 is affixed with solder at a conductive end to a back surface of PTC block 366. As shown in FIG. 18, lead 358 of heater 322 is electrically soldered to an L-shaped conductive plate comprising contiguous legs 372 and 374 that is further soldered to a front face of PTC block 366 via a cylindrical solder hole 376. Electrically insulating pads 368 and 370 electrically isolate plate 372 from portions of PTC block 366 and adjacent conductive items including lead 356 to prevent undesirable shorting out between such conductive leads.

Figure 19:
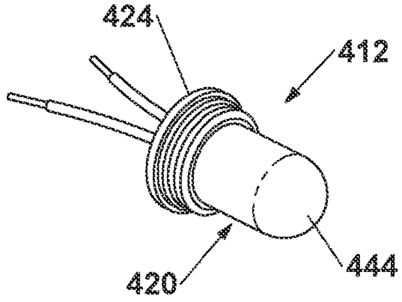
FIG. 19 is a front perspective view of yet another heat source having a ceramic radiant heat dissipative body with an elongated cylindrical ceramic radiant heat dissipative body with a hemispherical head and an internal PTC heater.
Figure 20:
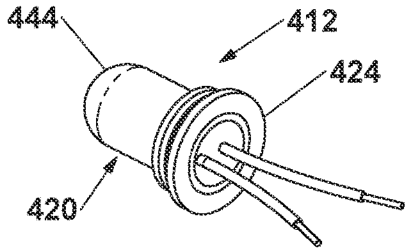
FIG. 20 is a rear perspective view of the heat source of FIG. 19.
Figure 21:
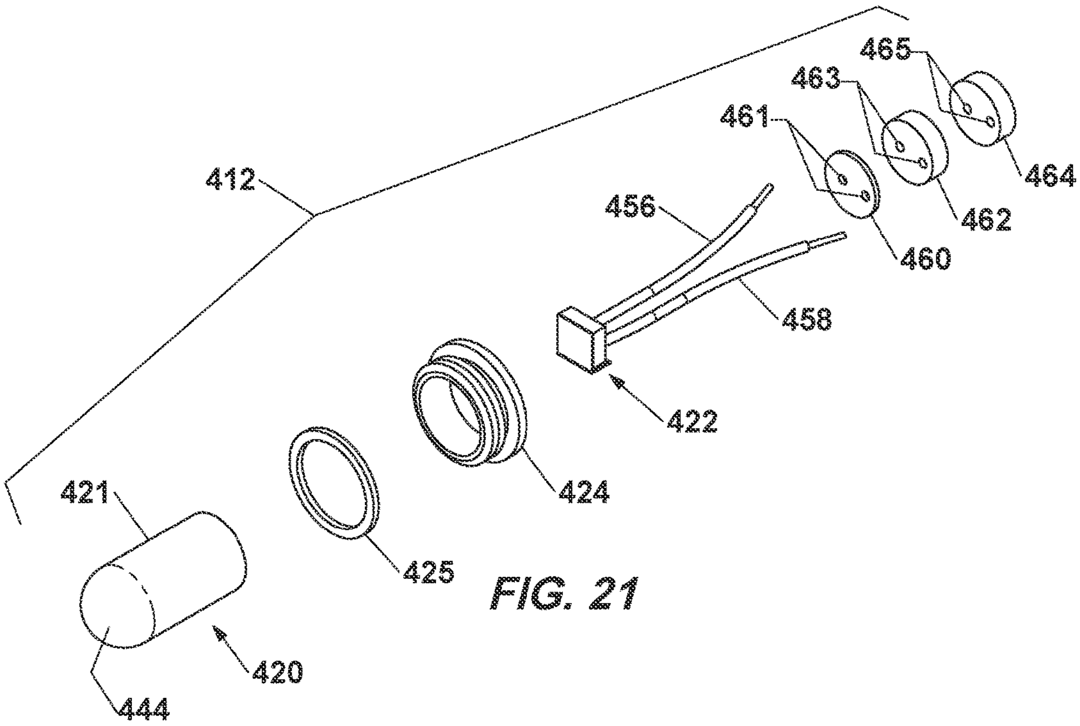
FIG. 21 is an exploded front perspective view of the heat source of FIGS. 19-20.
Figure 22:
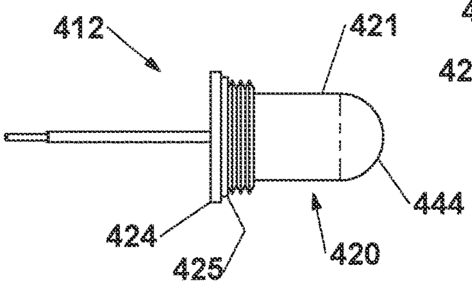
FIG. 22 is a left side view of the heat source of FIGS. 19-21.
Figure 23:
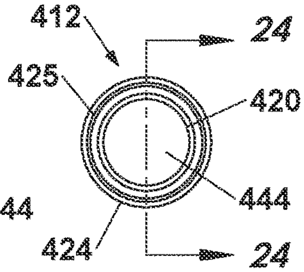
FIG. 23 is a front view of the heat source of FIGS. 19-22.
Figure 24:
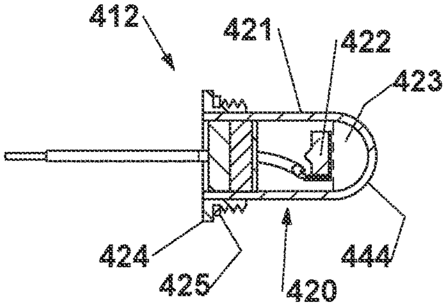
FIG. 24 is a vertical sectional view of the heat source taken along line 24-24 of FIG. 23.

FIG. 19 is a front perspective view of yet another heat source 412 having a ceramic radiant heat dissipative body 420 with an elongated cylindrical ceramic radiant heat dissipative body 421 (see FIG. 21) with a hemispherical, or semi-spherical head 444 and an internal PTC heater 422 (see FIG. 21), similar in construction to PTC heater 322 in FIGS. 14-18. A threaded retention base 424 made of plastic or metal has male threads that screw into a threaded boss, or bore in a vehicle illumination housing (not shown). A cylindrical silicon washer 425 (see FIG. 21) of rectangular cross section seats about the threaded portion of base 424 to seal in assembly heat source 412 to the housing. PTC heater 422 mounts similar to PTC heater 312 of FIG. 10) with insulated conductive wire leads 456 and 458 passing through respective sealing bores 461, 463, and 465 in reflector plate 460, insulator plate 462, and silicon rubber sealing end plate 464 which are adhesively affixed within body 420. As shown in FIGS. 21-24, ceramic radiant heat dissipative body 420 with elongate cylindrical body 421 is a commercially available piece from Ortech Advanced Ceramics, 6720 Folsom Blvd. Suite 219 Sacramento CA 95819 that is affixed with adhesive within an inner bore of base 424. As shown in FIG. 24, an end portion of hemispherical head 444 is filled with a block 423 of thermally conductive heat resistant adhesive and PTC heater 422 is affixed therein with such adhesive block 423.

Figure 25:
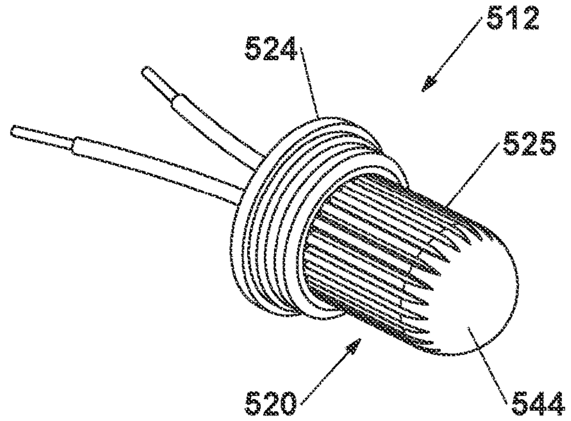
FIG. 25 is a front perspective view of yet even another heat source having a longitudinally finned ceramic radiant heat dissipative body with an elongated cylindrical ceramic radiant heat dissipative body with a hemispherical head and an internal PTC heater.
Figure 26:
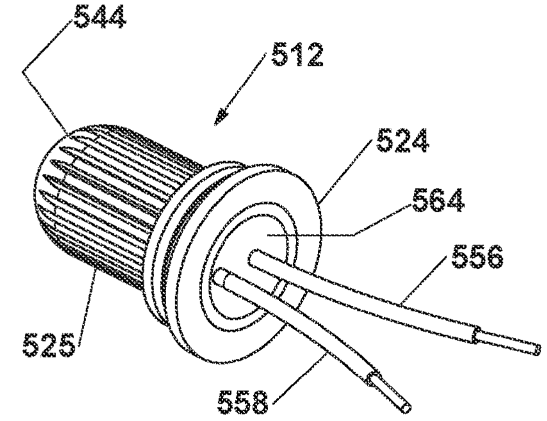
FIG. 26 is a rear perspective view of the heat source of FIG. 25.

FIG. 25 is a front perspective view of yet even another heat source 512 having a longitudinally finned ceramic radiant heat dissipative body 520 comprising an elongated cylindrical ceramic radiant heat dissipative body with a hemispherical head 544, a circumferential array of longitudinally extending radially outwardly extending integral fins 525 and an internal PTC heater (not shown) similar to the PTC heater 422 depicted in FIGS. 19-24 having insulated and electrically conductive wire leads 556 and 558 (see FIG. 26). Base 524 is threaded and sealed similar to base 424 in FIG. 21. Ceramic body 520 is adhesively affixed within an inner bore of base 524.

FIG. 26 is a rear perspective view of the heat source 512 of FIG. 25. More particularly, insulated conductive wire leads 556 and 558 exit through end plate 564 of heat source 512. Threaded retention base 524 is affixed at a distal end of heat dissipative body 512 with a hemispherical head 544 provided at a proximal end, with fins 525 extending longitudinally along an outer surface therebetween.

Figure 27:
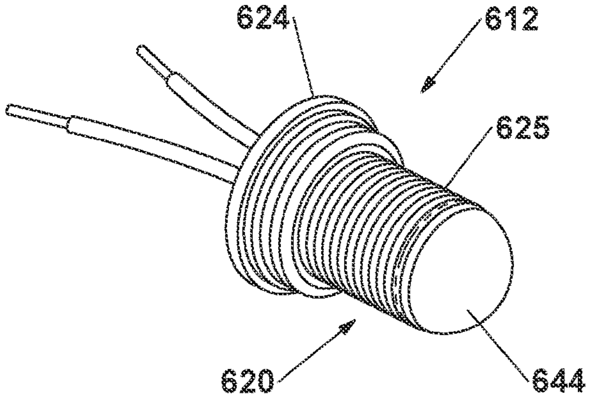
FIG. 27 is a front perspective view of even yet another heat source having a circumferentially finned ceramic radiant heat dissipative body with an elongated cylindrical ceramic radiant heat dissipative body with a hemispherical head and an internal PTC heater.
Figure 28:
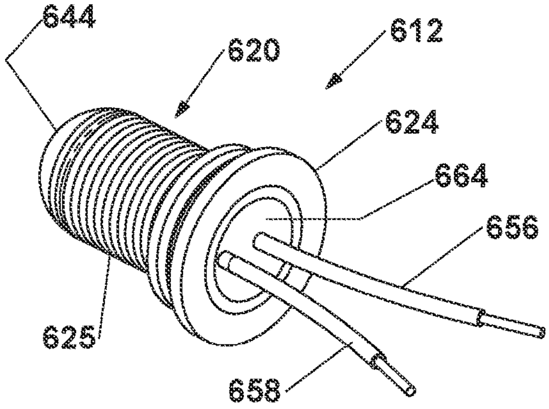
FIG. 28 is a rear perspective view of the heat source of FIG. 27.

FIG. 27 is a front perspective view of even yet another heat source 612 having a circumferentially finned ceramic radiant heat dissipative body 620 comprising an elongated cylindrical ceramic radiant heat dissipative body with a hemispherical head 644, a longitudinally extending array of circumferential radially outwardly extending ring-shaped fins 625, and an internal PTC heater (not shown) similar to the PTC heater 422 depicted in FIGS. 19-24 having insulated and electrically conductive wire leads 656 and 658 (see FIG. 28). Base 624 is threaded and sealed similar to base 424 in FIG. 21. Ceramic body 620 is adhesively affixed within an inner bore of base 624.

FIG. 28 is a rear perspective view of the heat source 612 of FIG. 27. More particularly, insulated conductive wire leads 656 and 658 exit through end plate 664 of heat source 612. Threaded retention base 624 is affixed at a distal end of ceramic radiant heat dissipative body 620, opposite hemispherical head 644 at a proximal end, with fins 625 extending longitudinally along an outer surface therebetween.

Figure 29:
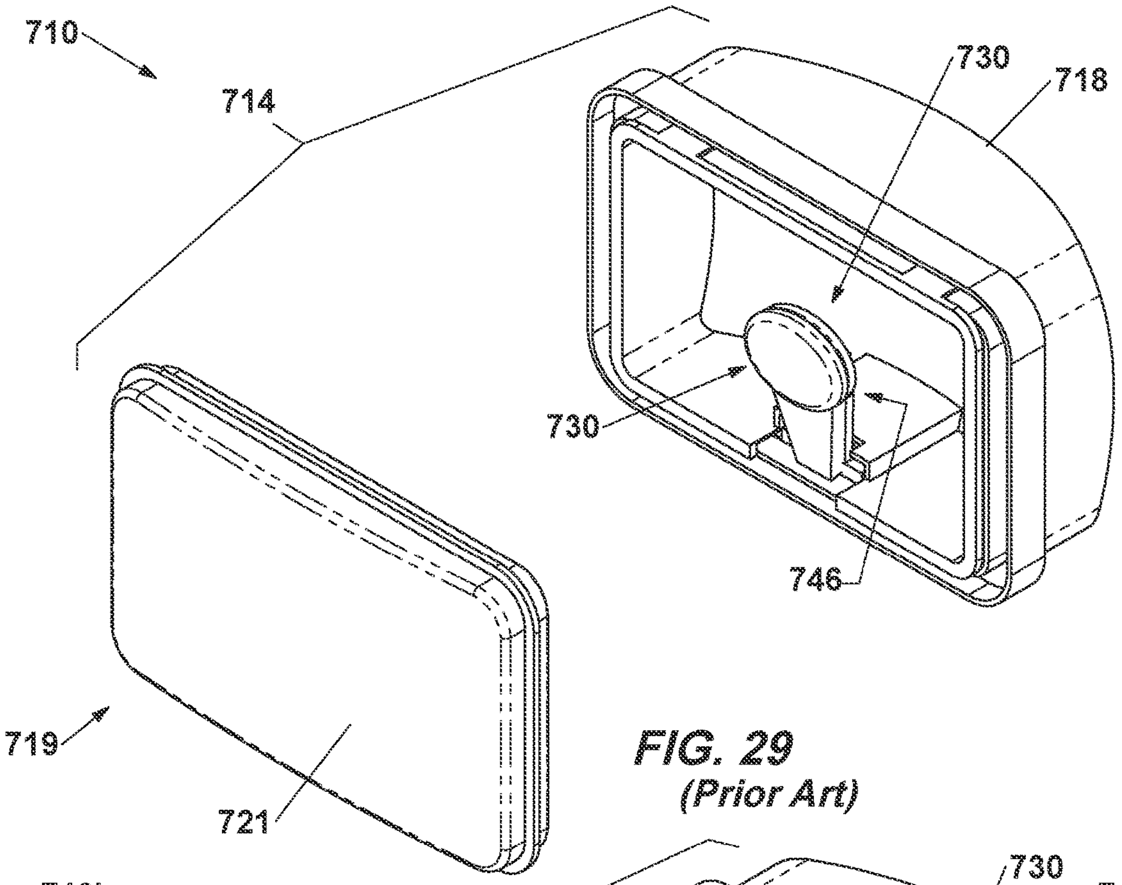
FIG. 29 (Prior Art)
FIG. 29 is a prior art perspective view from above of a headlight assembly with the lens removed showing an LED light source carried on a central support structure with a housing.

FIG. 29 is a prior art perspective view from above of a headlight assembly 710 with the lens 719 having a light transmissible portion 721 removed showing an LED light source 730 carried on a central support structure, or post 746 with a housing 718 of a housing assembly 714.

Figure 30:
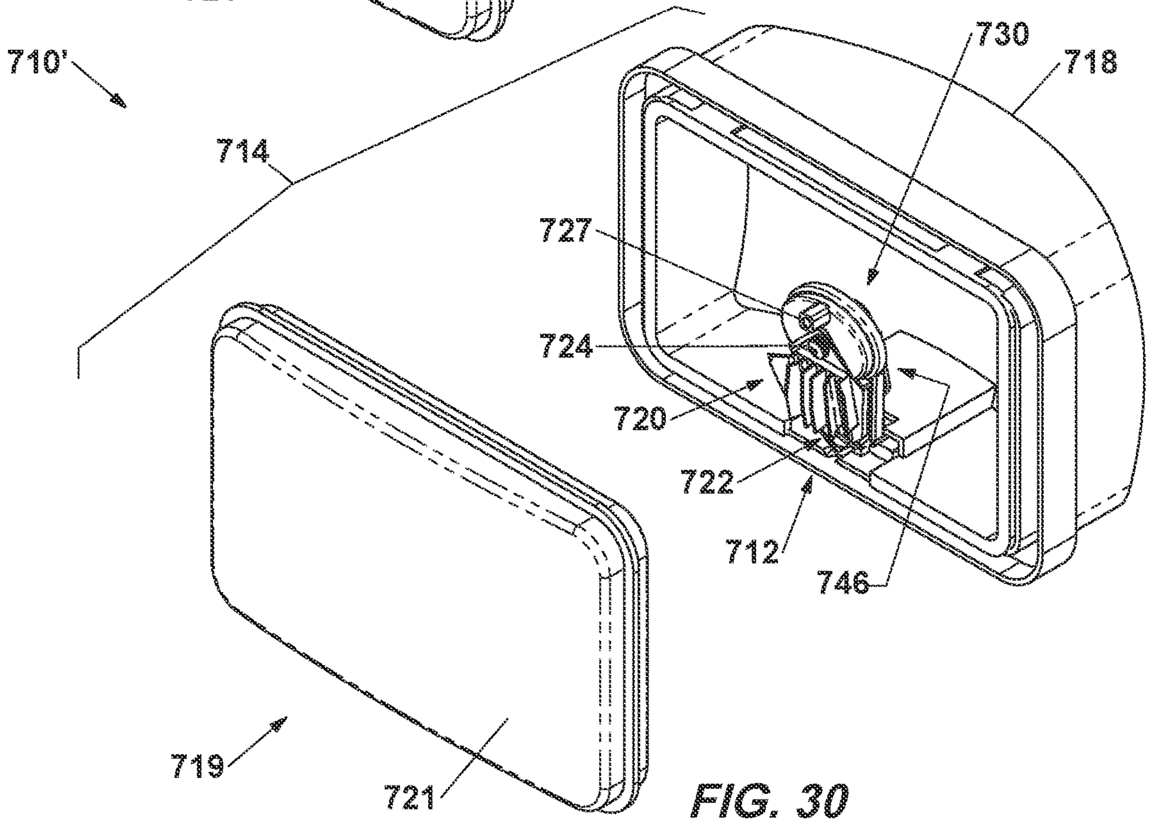
FIG. 30 is a perspective view from above of a headlight assembly with the lens removed showing an LED light source carried on a central support structure, or post within a housing and having even another heat source finned ceramic radiant heat dissipative body with a PTC heater.

FIG. 30 is perspective view from above of a headlight assembly 710' with the lens 719 having a light transmissible portion 721 removed showing an LED light source 730 carried on a central support structure, or post within a housing 718 of a housing assembly 714 and having even another heat source 712 having a ceramic plate 720 and a finned ceramic radiant heat dissipative body 750 (see FIG. 31) with a PTC heater 722 affixed to post 746 with a threaded fastener 724. A thermistor 727 provides further optional temperature feedback control to operation of the PTC heater 722 such that heat is only delivered when needed.

Figure 31:
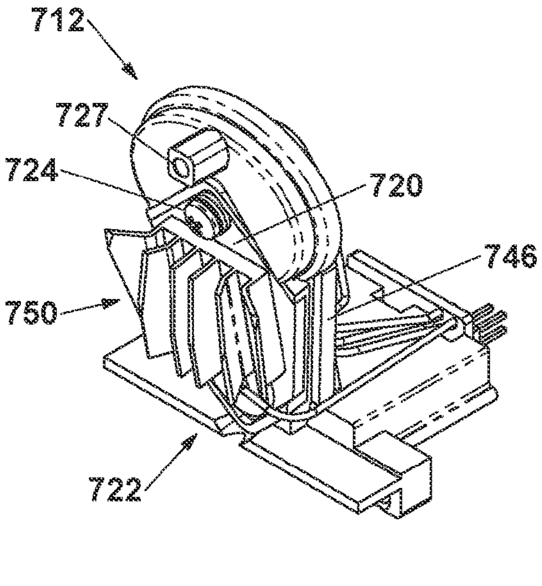
FIG. 31 is a front right perspective view from above of the heat source of FIG. 30.

FIG. 31 is front right perspective view from above of the heat source 712 of FIG. 30. More particularly, PTC heater 722 delivers a source of heat to ceramic plate 720 and further to finned ceramic radiant heat dissipative body 750 to deliver heat via radiation, conduction and convection to an inner surface of light transmissible portion 721 (see FIG. 30). A thermistor 727 is electrically coupled with PTC heater 722 from an electrical power supply and vehicle wiring harness (not shown) to control and regulate power delivery to PTC heater 722. Ceramic body 750 is affixed in thermally conductive relation via epoxy, or ceramic-filled epoxy, onto a front face of ceramic plate 720, while PTC heater is likewise affixed in thermally conductive relation onto ceramic plate 720. Outer surfaces, including an array of elongate fins, on body 750 conduct, convect, and radiate heat from body 750 into the cavity within housing assembly 714 and onto a back surface of lens 719 to dissipate and remediate accumulation of condensate (frozen and/or vapor) from lens 719 on both inner and outer surfaces. Threaded fastener 724 affixes plate 720 and body 750 onto post 746. Optionally, body 750 can be formed from an anodized aluminum piece, such as an Aavid part number 799403B01500G available from Aavid, a thermal division of Boyd Corporation, and are available for purchase from and are available for purchase through Digi-Key Electronics, 701 Brooks Avenue South, Thief River Falls, MN 56701 USA.

Figure 32:
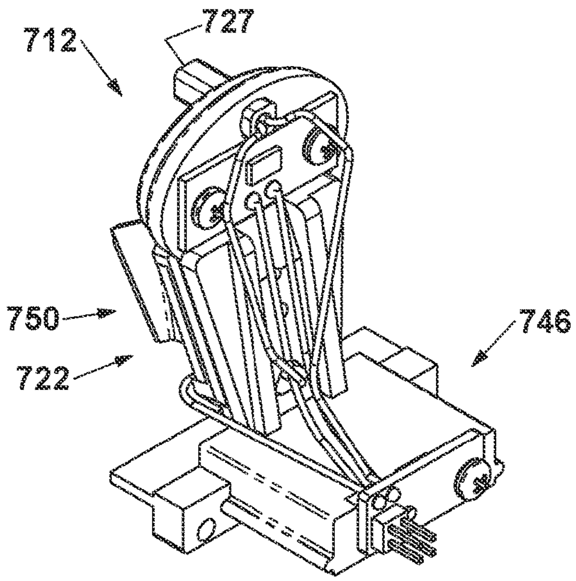
FIG. 32 is a rear right perspective view from above of the heat source of FIG. 30.

FIG. 32 is a rear right perspective view from above of the heat source 712 of FIG. 30 further showing body 520, PTC heater 722 and thermistor 727 on L-shaped post 746.

Figure 33:
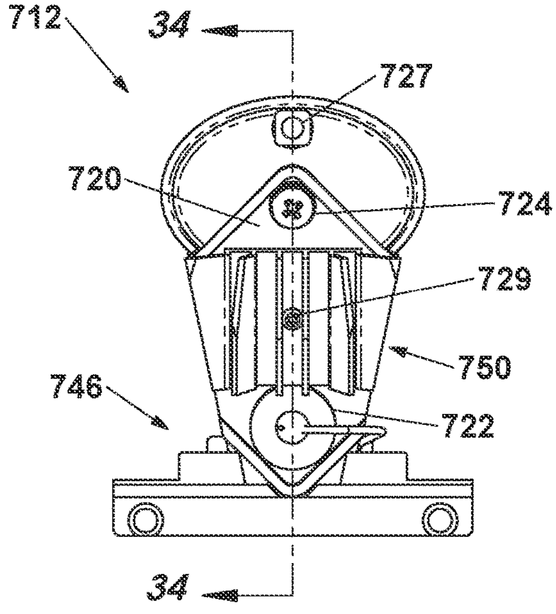
FIG. 33 is a front elevational view of the heat source of FIG. 30.

FIG. 33 is a front elevational view of the heat source 712 of FIG. 30. Fastener 724 affixes plate 720 and body 750 to post 746 along with PTC heater 722. Fastener 729 affixes plate 720 and body 750 to post 746 in addition or optionally to thermally conductive adhesive, or epoxy. Thermistor 727 is supported at a distal end of L-shaped bracket 746, above plate 720 and body 750.

Figure 34:
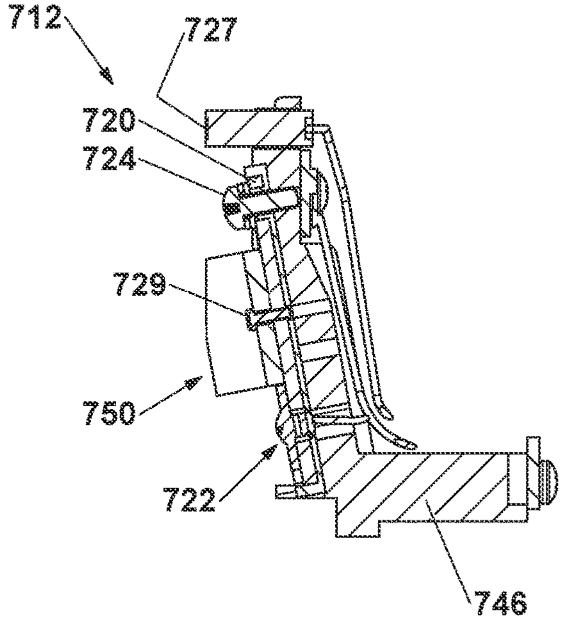
FIG. 34 is a vertical sectional view of the heat source of FIG. 30 taken along line 34-34 of FIG. 33.

FIG. 34 is a vertical sectional view of the heat source 712 of FIG. 30 taken along line 34-34 of FIG. 33. Thermistor 727 is shown in sectional view affixed through a complementary through bore in L-shaped bracket 748 where it is affixed with epoxy adhesive. Optionally, thermistor 727 can be affixed with any form of fastener including mating threads, screws, bolts, rivets, or other bonding agents. Fastener 729 affixes body 750 and plate 720 together while fastener 720 secures such assembly onto post 746. In this way, fastener 729 does not thermally conduct heat into a lower portion of post 746. Furthermore, fastener 720 is received through ceramic plate 720 through an oversized bore, or hole and a thermally insulating washer is provided on the head of fastener 720 to thermally isolate plate 720 from post 746. PTC heater 722 is provided spaced from such fasteners 729 and 724 to further thermally isolate heater 722 from post 746. In this way, heat transfer from heater 722 is minized to post 746 (and the accompanying LED light source which increases life expectancy of the LED light source.

Figure 35:
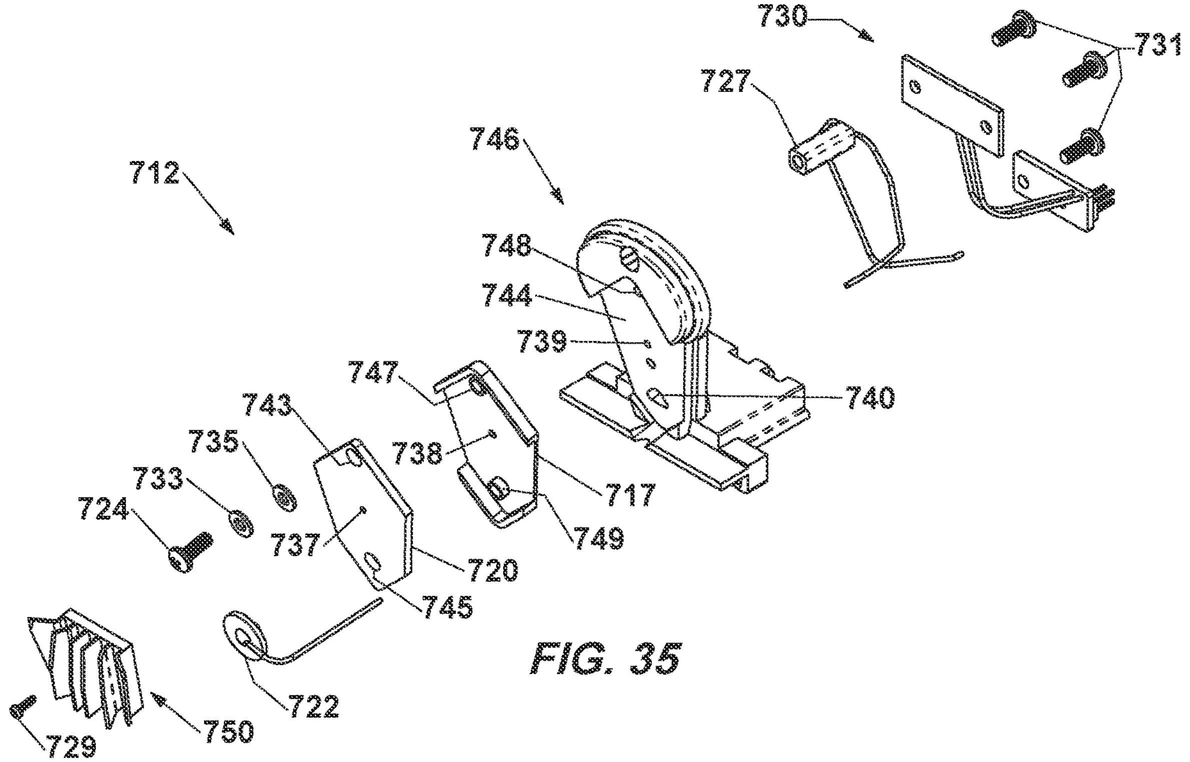
FIG. 35 is a right front exploded perspective view from above of the heat source of FIG. 30.

FIG. 35 is a right front exploded perspective view from above of the heat source 712 of FIG. 30. More particularly, an insulating silicon layer 717 is provided between ceramic plate 720 and surface 744 on post 746 in order to prevent heat transfer to post 746 and of the LED circuit board 730 where LED 732 (see FIG. 36) might otherwise suffer reliability issued resulting from excessive heat buildup. Insulating bosses, or raised portions 747 and 749 each having a central bore and silicon insulating washer prevent heat transmission from ceramic plate 720 to surface 744 via threaded fasteners 724. Thermistor 727 is affixed in assembly to post 740, beneath LED circuit board assembly 730 which is further affixed in assembly to post 746 with three threaded fasteners 731. Fastener 724 extends through washers 733 and 735 and through bores 743 and 747, into threaded bore 748 in L-shaped bracket, or escutcheon 746. In one case, washer 733 is a thermally conductive washer and washer 735 is a thermally insulating (non-conductive) washer. Threaded fastener 729 affixes finned body 750 onto ceramic plate and silicon insulating layer, or plate 717, by threading into apertures 737 and 738. Optionally, where fastener 729 is made from a thermally insulative material, fastener 729 can further thread into aperture 739 in post 746, within surface 744. PTC heater 722 is affixed to a front face of ceramic plate 720 with thermally conductive adhesive, or epoxy (such as ceramic-filled epoxy) over through-bore 745 so that a conductive lead from thermistor 727 passes through bores 749 and 740 to form an electrical in-series connection with a back surface of PTC heater 722. In this way, thermistor 727 controls operation of PTC heater 722. In one case, a positive coefficient thermistor 727 is used in order to shut down current to PTC heater 722 to prevent overheating. In an optional or additional case, a negative temperature thermistor can be used in order to shut down current to PTC heater 722 to prevent use during summer months where temperature is warm for cases where snow and ice accumulation is the design concern, or for bounding performance of the PTC heater under high and low temperature performance threshold conditions.

Figure 36:
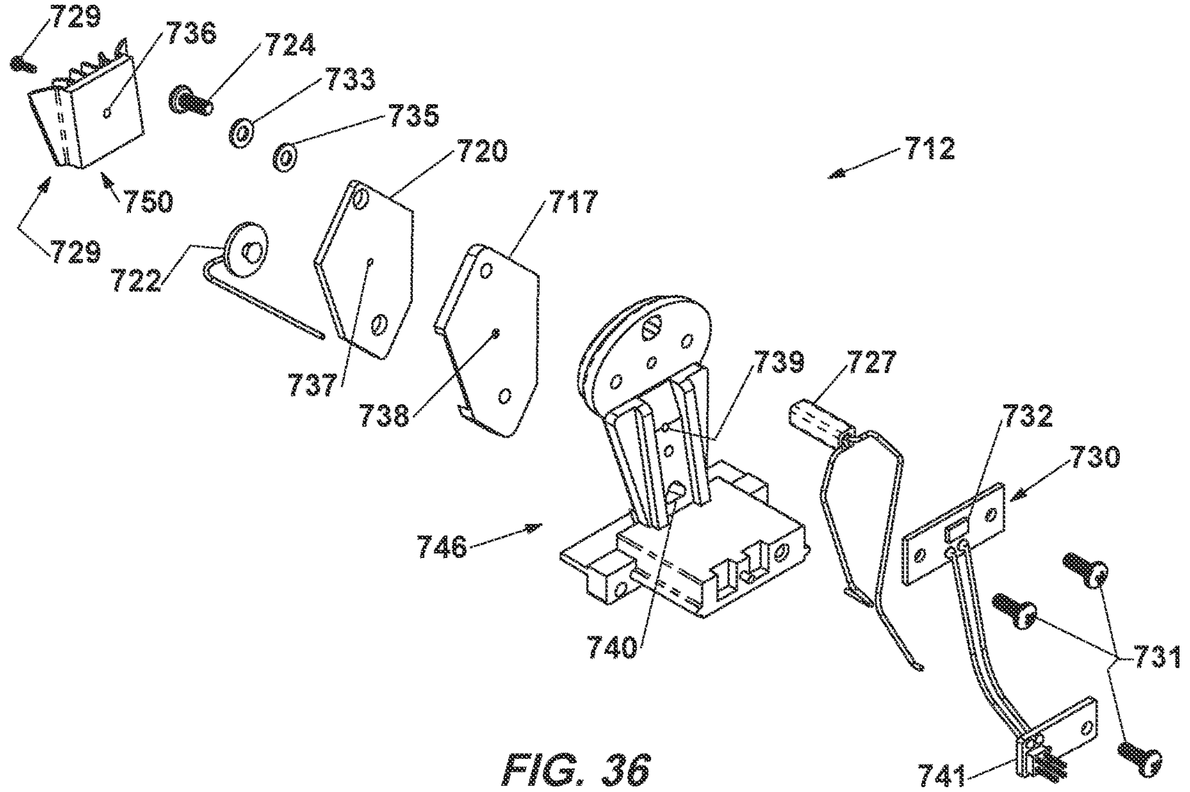
FIG. 36 is a right rear exploded perspective view from above of the heat source of FIG. 30.

FIG. 36 is a right rear exploded perspective view from above of the heat source 712 of FIG. 30. Assembly of block 750 with fastener 729 to plate 720 and layer 717 via bores 737, 738 and (optionally) 739 is shown. Likewise, assembly of fastener 724, washers 733 and 735, plate 720, layer 717, and post 746 is detailed. One lead from thermistor 727 passes through hole 740 in bracket 746, layer 717, and plate 720 to electrically connect with a back surface of PTC heater 722. Finally, LED board assembly 730 is shown affixed to a back surface of bracket 746 with three threaded fasteners. An electrical PC board connector assembly 741 for LED circuit board assembly 730 is also shown.

Figure 37:
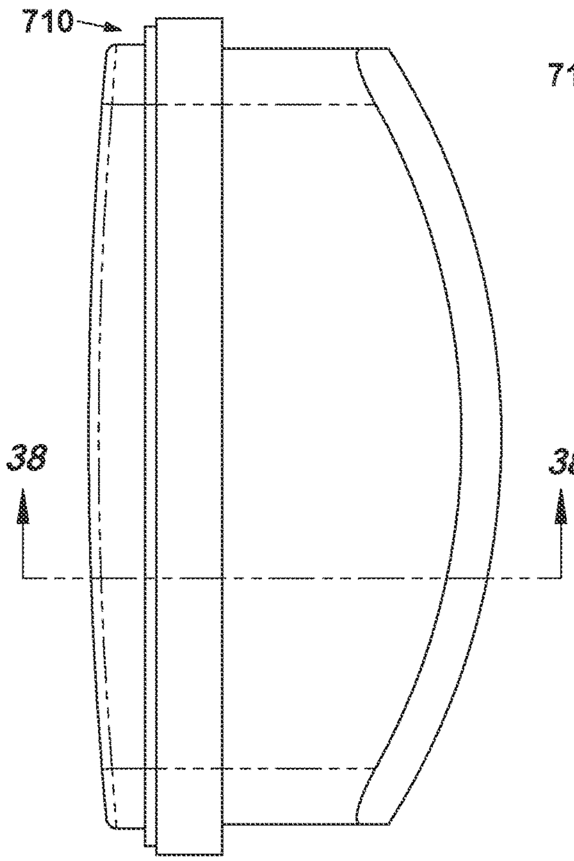
FIG. 37 is a plan view from above of the headlight assembly of FIG. 30.

FIG. 37 is a plan view from above of the headlight assembly 710 of FIG. 30.

Figure 38:
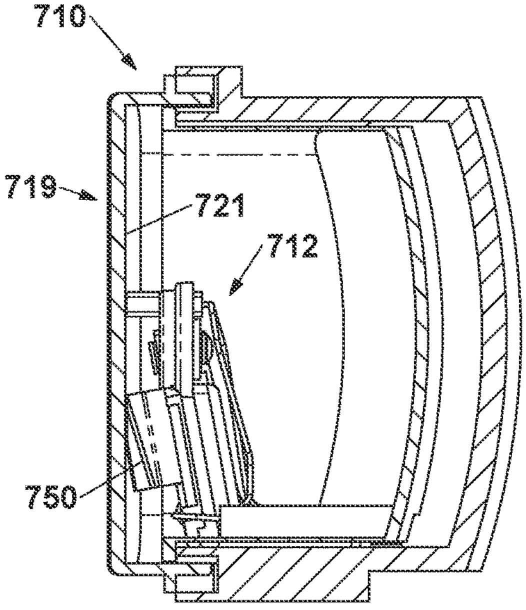
FIG. 38 is a vertical sectional view of the headlight assembly and heat source taken along line 38-38 of FIG. 37.

FIG. 38 is a vertical sectional view of the headlight assembly 710 and heat source taken along line 38-38 of FIG. 37. Heat source 712 of FIGS. 35 and 36 is shown installed in one exemplary headlight assembly 710. Finned ceramic (or anodized aluminum) heat dissipative body 750 is shown supported proximate, but slightly spaced from an inner surface of lens 719 behind a light transmissive portion 721 of lens 719.

Figure 39:
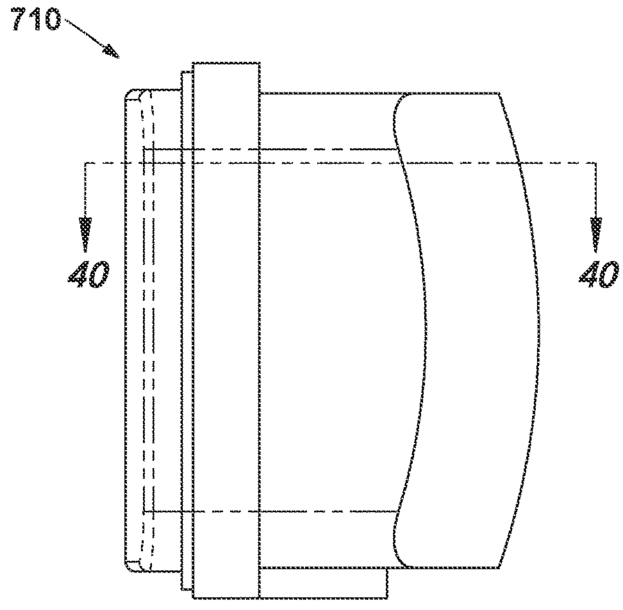
FIG. 39 is a right elevational side view of the headlight assembly of FIG. 30

FIG. 39 is a right elevational side view of the headlight assembly of FIG. 30

Figure 40:
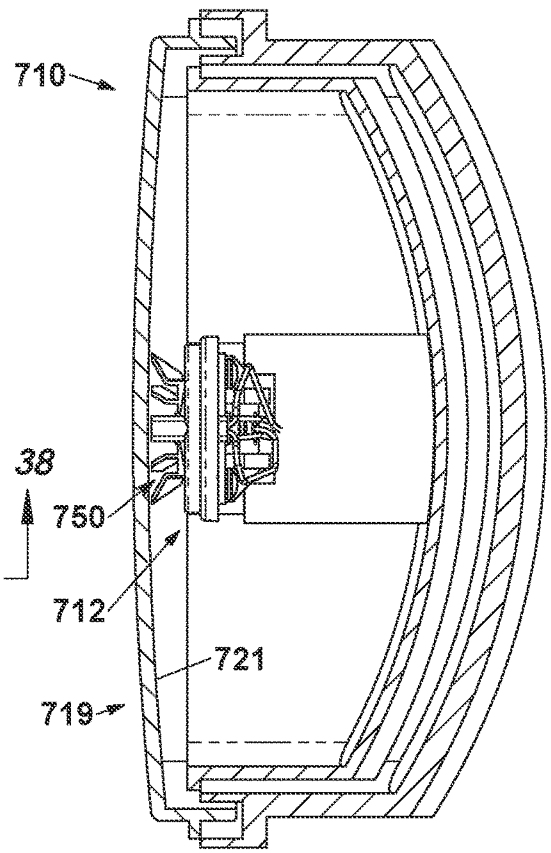
FIG. 40 is a vertical sectional view of the headlight assembly and heat source taken along line 40-40 of FIG. 39.

FIG. 40 is a vertical sectional view of the headlight assembly 710 and heart source 712 taken along line 40-40 of FIG. 39 and showing the proximate positioning and orientation of finned ceramic heat dissipative body 750 adjacent to lens 719 for delivering heat via convection and radiation thereto to light transmissive portion 721. Portion 721 can additionally, or optionally be optically clear for the case where optical or safety sensors are provided in the housing of headlight assembly 710 for use with self-driving sensing technologies, and such heater can be provided in a housing with a light transmissible (or optically transmissible) portion housing a sensor without any light source. Optionally, portion 721 can additionally or optionally be an opaque material where electromagnetic radiation can pass in either direction through the material for various types of sensor applications.

Figure 41:
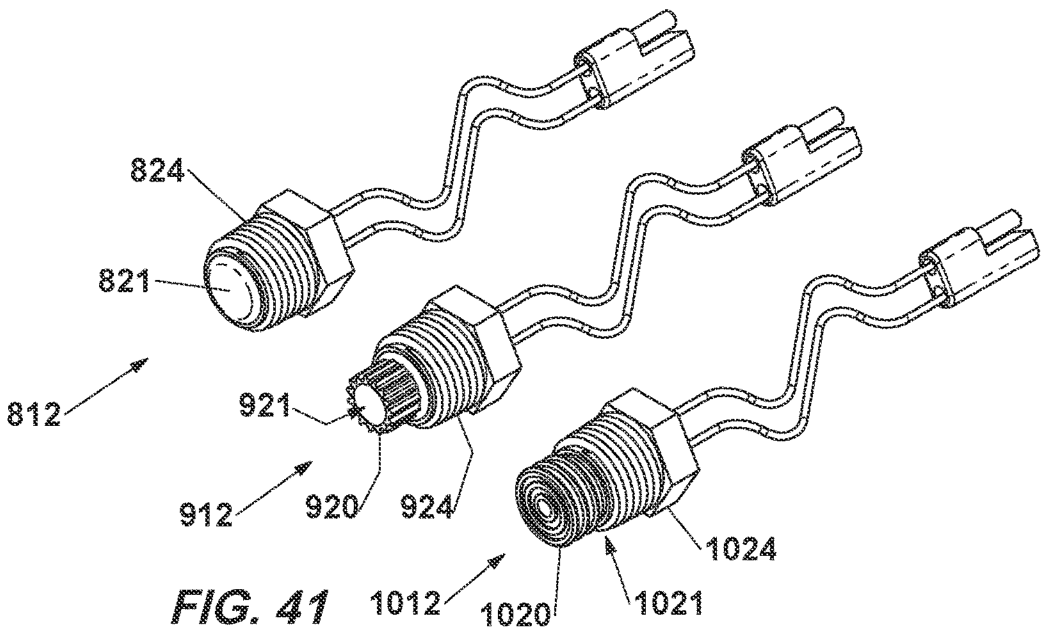
FIG. 41 is a front perspective view from above of three alternative heat sources for use in a light assembly.

FIG. 41 is a front perspective view from above of three alternative heat sources 812, 912, and 1012 for use in a light assembly, such as a headlight, tail light or side marker light, or any light assembly shown in the present application. Heat source 812 had a plug 821 of potted ceramic adhesive that encases a PTC heater inside of a plastic threaded plug body 824. Optionally, plug 821 can be a ceramic powder filled epoxy, an epoxy, or a cyanoacrylate epoxy that encases and conducts heat from the PTC heater to the distal open end of plug body 824 for directed delivery via convection and radiation to a lens surface or a ceramic reflecting body (see FIG. 71B).

Heat source 912 of FIG. 41 includes a splined ceramic post 920 that is affixed atop a ceramic adhesive plug 921 that fills plug body 924 and encases a PTC heater therein.

Heat source 1012 of FIG. 41 includes a fluted ceramic end body 1020 having a stack of undulating cylindrical disk-shaped flutes that are affixed atop a ceramic adhesive plug 1021 that fills plug body 1024 and encases a PTC heater therein. Detail A of FIG. 43 shows in greater detail the geometry of end body 1020.

Figure 42A:
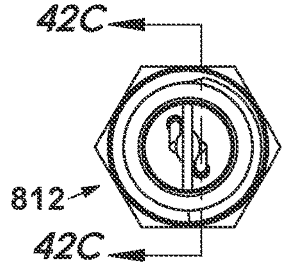
Figure 42B:
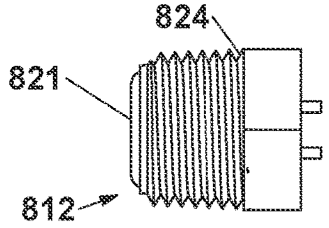
Figure 42C:
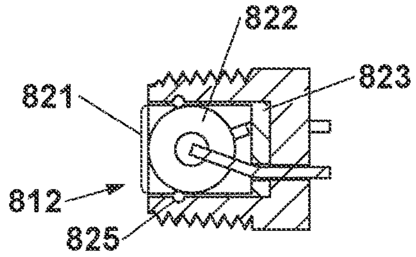

FIGS. 42A-1 are respective front, side and sectional views taken along lines 42A-42A, 42B-42B, 42C-42C, 42D-42D, 42E-42E, 42F-42F, 42G-42G, 42H-42H, and 42I-42I for each of the three heat sources of FIG. 41. More particularly, FIG. 42A shows heat source 812 in end view, while FIG. 42B shows heat source 812 in side view with plug 821 and plug body 824. FIG. 42C shows PTC heater 822 affixed in plug 820 and insulating thimble 823. An annular radial outward ring or rib 825 on thimble 823 interfits within a complementary annular groove in plug body 824 (see FIG. 42B).

Figure 42D:
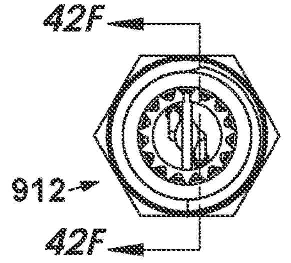
Figure 42E:
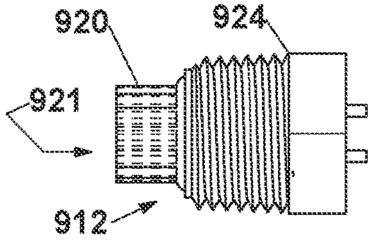
Figure 42F:
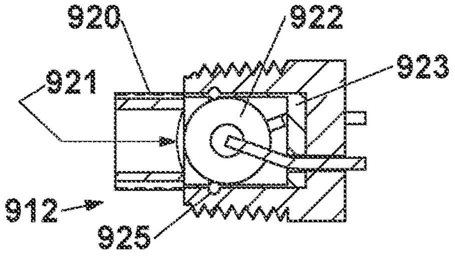

FIG. 42D shows heat source 912 in end view, while FIG. 42E shows heat source 912 in side view with plug 921 and plug body 924 and splined ceramic post 920. FIG. 42F shows PTC heater 922 affixed in plug 921 and insulating thimble 923. An annular radial outward ring or rib 925 on thimble 923 interfits within a complementary annular groove in plug body 924 (see FIG. 42E), and splined ceramic post 920 extends beyond a distal end of plug 921.

Figure 42G:
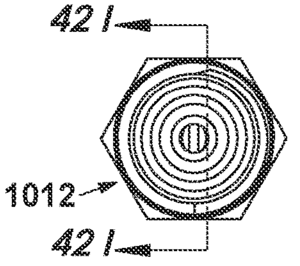
Figure 42H:
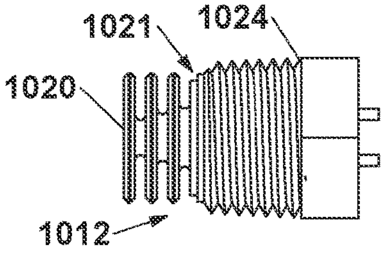
Figure 42I:
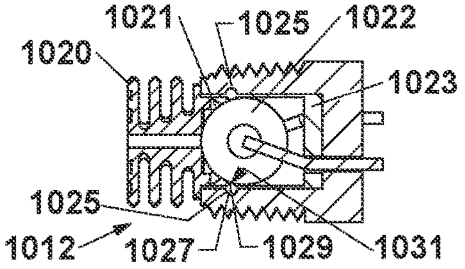

FIG. 42G shows heat source 1012 in end view, while FIG. 42H shows heat source 1012 in side view with plug 1021 and plug body 1024 and fluted ceramic end body 1020. FIG. 42I shows PTC heater 1022 affixed in plug 1021 and insulating thimble 1023. An annular radial outward ring or rib 1025 on thimble 1023 interfits within a complementary annular groove 1027 in plug body 1024 (see FIG. 42H), and fluted ceramic end body 1020 extends beyond a distal end of plug 1021. A similar annular groove 1029 in thimble 1023 receives a similar complementary annular rib 1031 is potting material plug 1021.

It is understood that epoxy potting material 821, 921 and 1021 is not shown in FIGS. 42A, 42D, and 42G, as well as FIGS. 42C, 42F, and 42I in order to facilitate viewing of internal structure. However, voids are shown where the epoxy potting material is actually resident. In one case, ceramic powder is added to material 821, 921 and 1021 to increase emissivity of such resulting material.

FIG. 43 is an exploded rear perspective view from above of the third heat source 1012 of FIG. 40 with FIG. 43A of encircled region A showing in enlarged view a ceramic head 1020 of heat source 1012. Ceramic head 1020 affixes via ceramic adhesive plug 1021 within silicon insulating thimble 1023 and further within plastic plug body 1024. Annular ribs 1031 and 1025 interfit in complementary relations within annular grooves 1029 (see FIG. 44) and 1027 (see FIG. 44) to secure such parts together. Optionally, plug body 1024 can be metal or some other suitable structural material having either thermally insulative or thermally conductive properties, depending on the application and need to transfer or limit transfer of heat laterally. Insulated conductive leads, or wires 1056 and 1058 extend from connector plug 1051 through apertures in plug body 1024, passing through apertures in thimble 1023 and apertures in plug 1021 to affixed to opposed sides of PTC heater 1022.

FIG. 44 is an exploded front perspective view from above of the third heat source 1012 of FIG. 40 with FIG. 44A of encircled region B showing in enlarged view a ceramic head 1020 of the heat source 1012. A plug of potted and cured ceramic adhesive 1021 encapsulates and conducts heat from a PTC heater 1022, whereas an insulating silicon thimble 1023 prevents heat from transmitting to threaded plastic plug body 1024. Annular ribs 1031 and 1025 interfit with grooves 1029 and 1027, respectively to ensure secured assembly. Insulated conductive wires 1056 and 1058 are encased in conductive epoxy plug 1021 and connect to respective electrical leads on opposed surfaces of PTC heater 1022. Connector plug 1051 enables direct connection to a power source for an LED light within a light housing. Ceramic head 1020 of FIG. 44A includes opposed arcuate wings each with a radially extending aperture 1033 into which conductive epoxy from plug 1021 can interlock when formed to provide securement therebetween and thermal conductivity.

Figure 45:
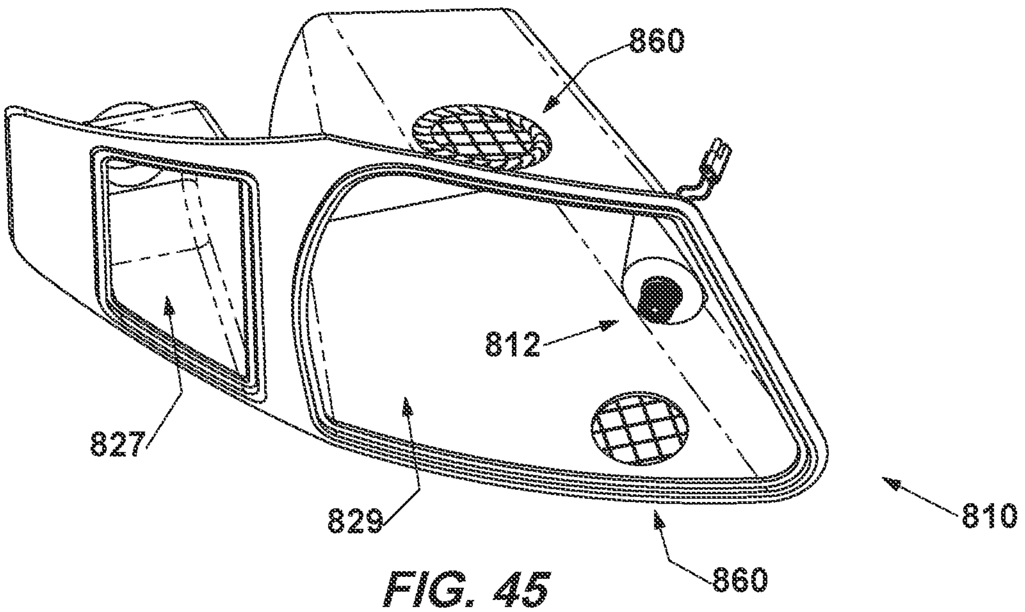
FIG. 45 is a front perspective view from above of a headlamp assembly with the front light transmissive lens portion removed showing a heat source and a pair of moisture permeable membrane ports provided in the housing to mitigate condensate occlusion of the light transmissive lens portion.

FIG. 45 is a front perspective view from above of a headlamp assembly 810 having a primary light well 829 and a secondary light well 827 with the front light transmissive lens portion removed showing a heat source 812 and a pair of moisture permeable membrane ports 860 provided in the housing to mitigate condensate occlusion of the light transmissive lens portion. Heat from heat source 812 is presently believed to create a thermal and vapor concentration mechanism that helps vaporize water in such housing and further helps to drive moisture from within such housing via ports 860.

Figure 46:
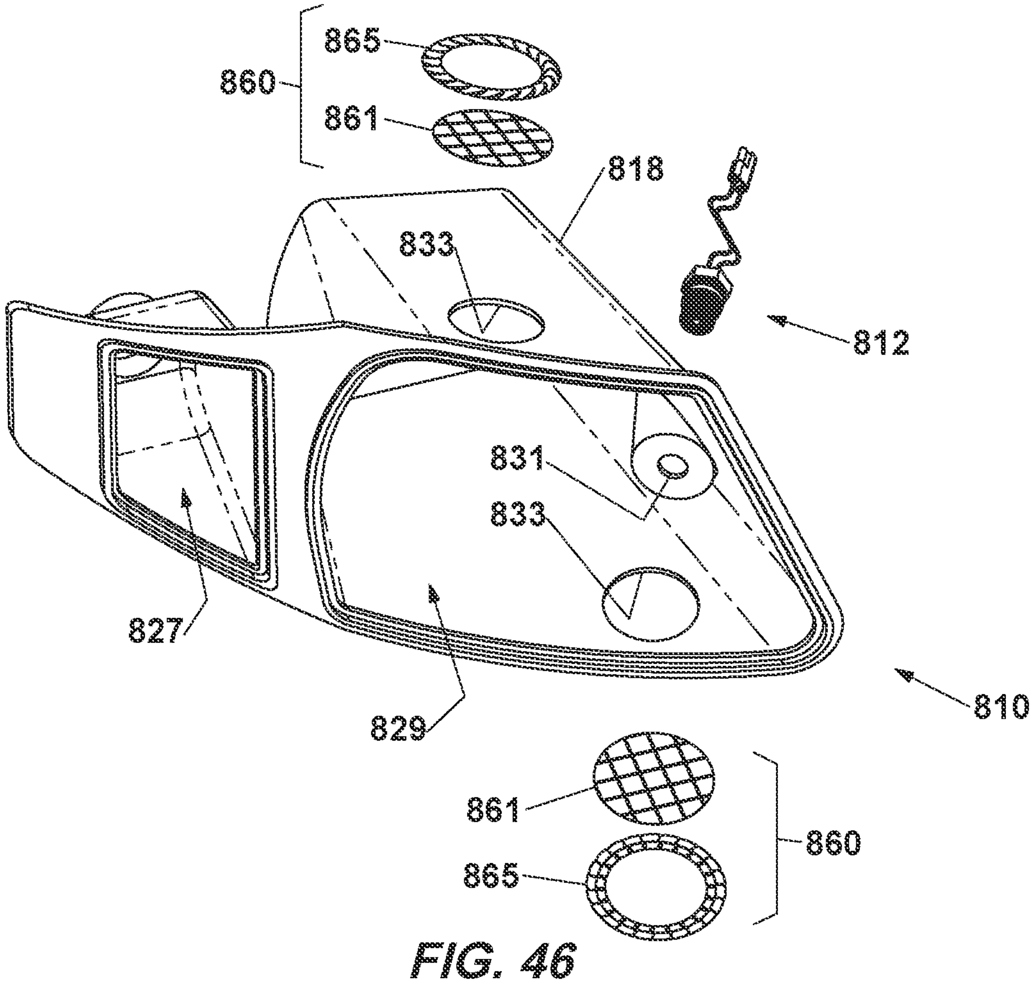
FIG. 46 is a partial exploded view of the headlamp assembly of FIG. 45.

FIG. 46 is a partial exploded view of the headlamp assembly 810 of FIG. 45. Each port 860 includes a cylindrical disk of moisture permeable membrane 861 affixed about an aperture 833 in housing 818 via a cylindrical strip 865 of double-back adhesive tape. One suitable class of moisture permeable membranes is available from GORE-TEX®. Other suitable moisture permeable membranes and fabrics, including coated semi-permeable fabrics can alternatively be used. An aperture 831 in housing 818 of headlamp assembly 810 receives heat source 812 (see FIG. 45) in assembly. Although not shown herein, it is understood that a similar port and heat source can be provided in secondary well 827 as provided in primary well 829. Optionally, wells 827 and 829 can be connected together via a port or passage.

Figure 47:
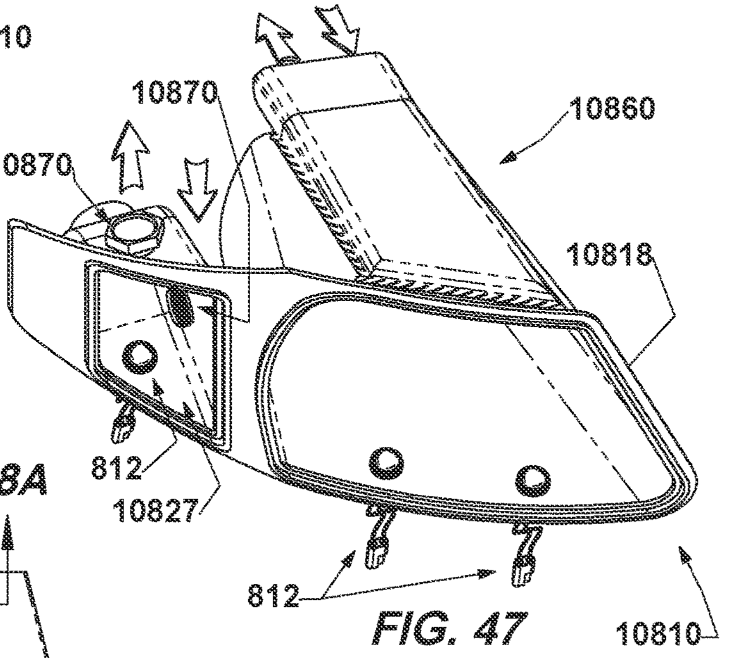
FIG. 47 is a front perspective view from above of another headlamp assembly with the front light transmissive lens portion removed showing three heat sources, a pair of plug moisture permeable membrane plugs, and a ducted moisture permeable membrane array of ports provided in the housing to mitigate condensate occlusion of the light transmissive lens portion.

FIG. 47 is a front perspective view from above of another headlamp assembly 10810 with a front light transmissive lens portion removed showing three heat sources 812 (see FIGS. 47, 49, 50 and 51), a pair of moisture permeable membrane plugs 10870 in secondary well 10827, and a ducted moisture permeable membrane array 10860 of ports 10835 (see FIG. 49) provided in the housing 10818 to mitigate condensate occlusion of the light transmissive lens portion. As shown in FIG. 51, a duct 10863 reduces dirt from collecting on moisture permeable membrane 10861 which is sealed with a double-sided adhesive strip 10865 onto housing 10818 around apertures 10835. Air flow (including moisture) paths are shown by way of arrows in FIG. 47. One suitable class of moisture permeable membranes is available from GORE-TEX®. Other suitable moisture permeable membranes and coated moisture permeable fabrics can alternatively be used. Plugs 10870 each include a disc of such moisture permeable member secured over a central bore of the plug with a ring strip of double-backed adhesive.

Figure 48A:
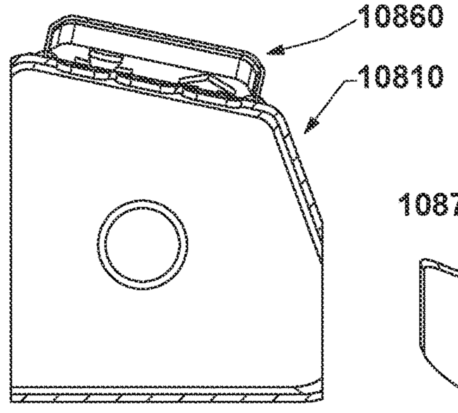
FIG. 48A is a sectional view taken along line 48A-48A of FIG. 48.
Figure 48:
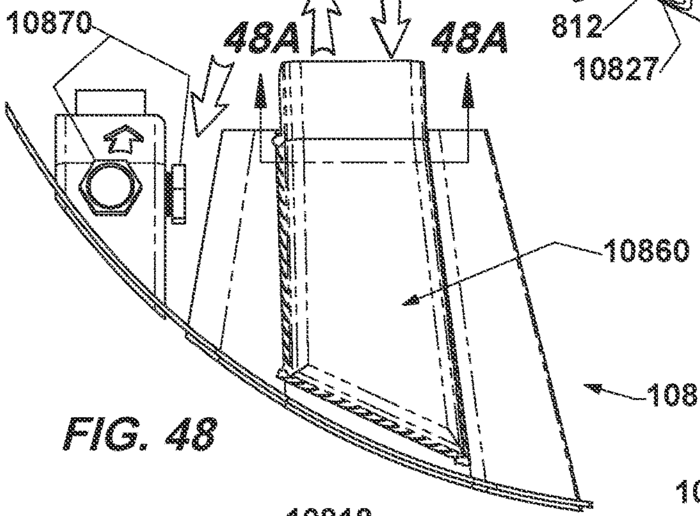
FIG. 48 is a plan view from above of the headlamp assembly of FIG. 47 with vertical section A-A further showing the ducted moisture permeable membrane array of ports.

FIG. 48 is a plan view from above of the headlamp assembly 10810 of FIG. 47 with vertical section 48A-48A in FIG. 48A further showing the ducted moisture permeable membrane array 10860 of ports on assembly 10810. Plugs 10870 are provided along an outboard portion of assembly 10810.

Figure 49:
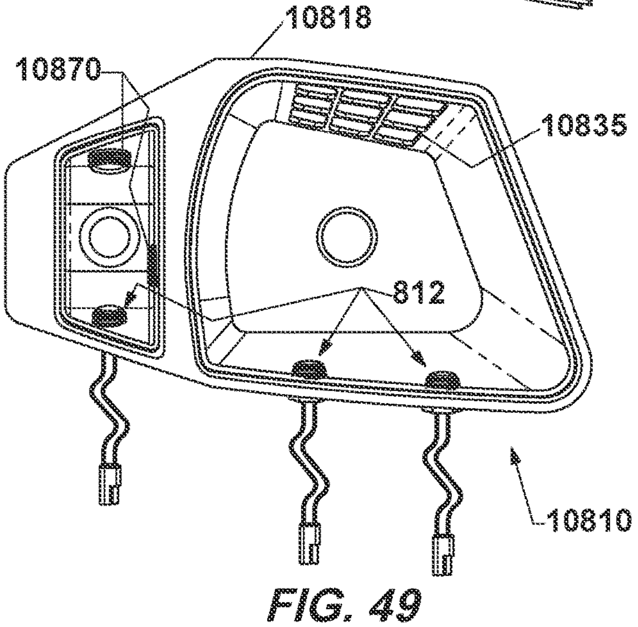
FIG. 49 is a front elevational view of the headlamp assembly of FIG. 48.

FIG. 49 is a front elevational view of the headlamp assembly 10810 of FIG. 48. Internally exposed moisture permeable membrane material on plugs 10870 and apertures 10835 can be seen internally.

Figure 50:
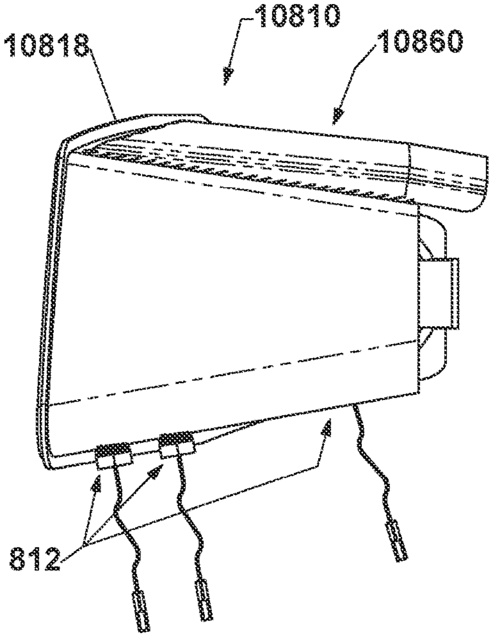
FIG. 50 is a right side view of the headlamp assembly of FIG. 49.
Figure 51:
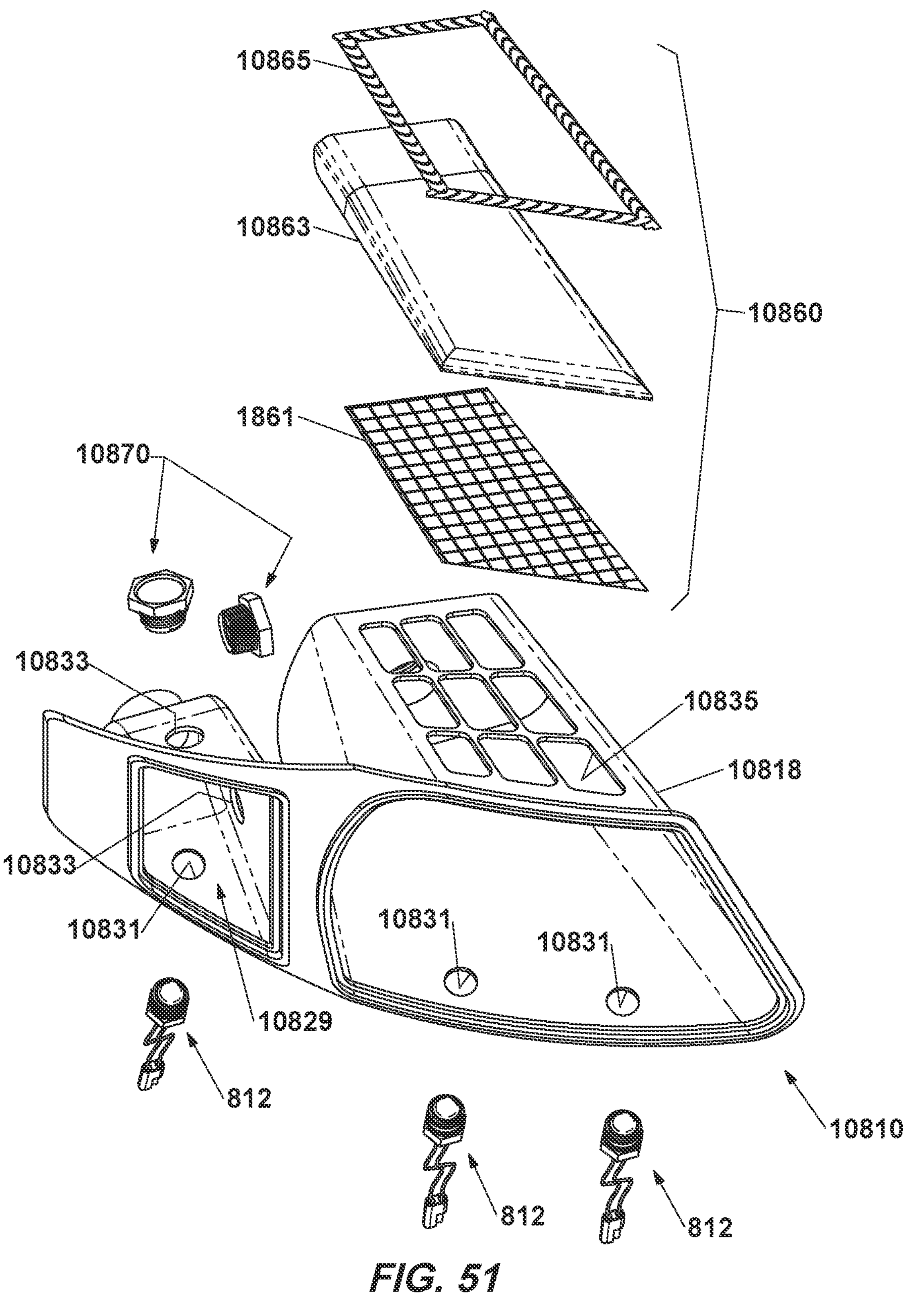
FIG. 51 is an exploded perspective view from above of the headlamp assembly of FIGS. 47-50.

FIG. 50 is a right side view of the headlamp assembly 10810 of FIG. 49. The ducted side profile of array 10860 is shown affixed atop housing 10818 to facilitate migration of moisture via thermal and vapor differential membrane mechanisms.

FIG. 51 is an exploded perspective view from above of the headlamp assembly 10810 of FIGS. 47-50. Apertures 10831 in secondary well 10829 each receive a respective heat source 812 in secured relation. Apertures 10833 each received a plug 10870 is secured relation. Physical apertures 10835 in housing 10818 expose moisture permeable membrane 10861 as affixed in sealed relation by strip 10865 of double-backed adhesive about an outer periphery of apertures 10835 with housing 10818 beneath duct cover 10863 which has a read edge opening. Ducted array 10860 comprises strip 10865, duct cover 10863 and membrane 10861.

Figure 52:
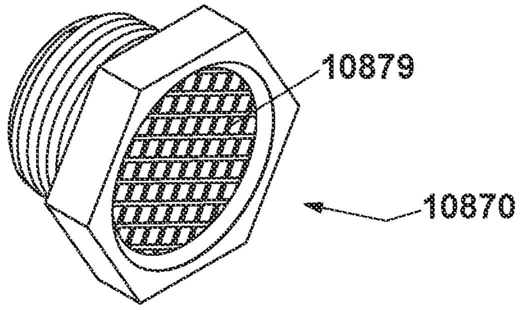
FIG. 52 is a front component perspective view from above of one moisture permeable membrane plug of FIGS. 47-51.

FIG. 52 is a front component perspective view from above of one moisture permeable membrane plug 10870 of FIGS. 47-51 for use in a light housing, such as a headlight, tail light, or marker light housing. A cylindrical disk configuration of moisture permeable membrane 10879 is provided in the end of a threaded plug body. Such configuration is similar to a fuel or air filter. One suitable class of membranes is available from GORE-TEX®. A threaded end of plug 10870 is received in a thread hole of a light housing having one of the heat sources detailed herein in order to generate heat that helps drive moisture from the light housing via the moisture permeable membrane.

Figure 53:
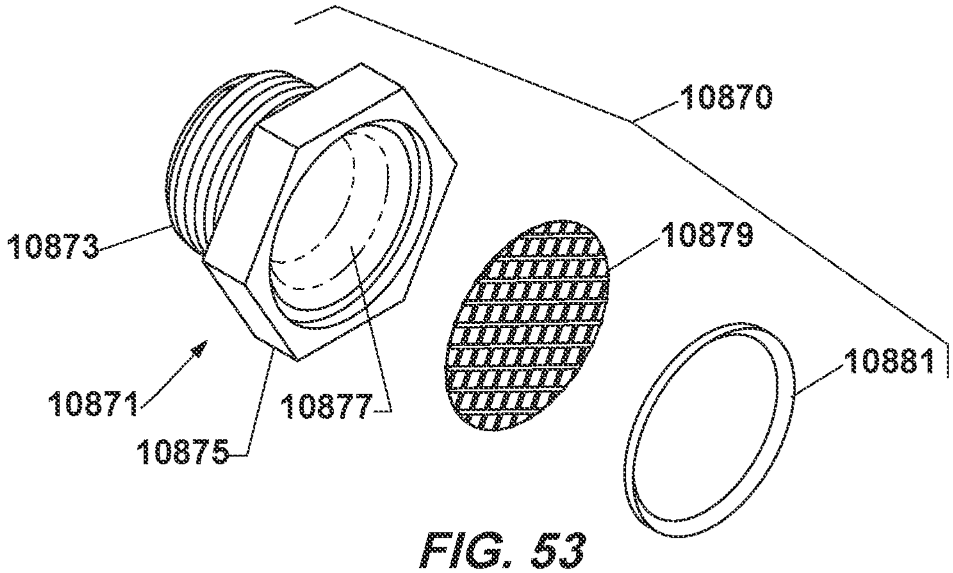
FIG. 53 is a front exploded perspective view of the plug of FIG. 52.

FIG. 53 is a front exploded perspective view of the plug 10870 of FIG. 52 showing threaded plug body 10871 having an inner bore 10877, a cylindrical threaded end portion 10873 and a hexagonal tool flange 10875. Moisture permeable membrane 10879 is adhesively affixed with a cylindrical strip 10881 of double-backed adhesive in a groove about bore 10877 of plug body 10871.

Figure 54:
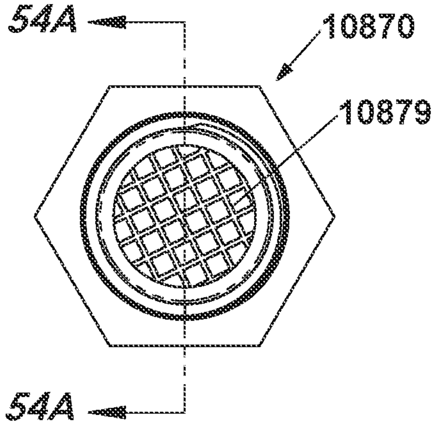
FIG. 54 is a front elevational view of the plug of FIGS. 52-53.
Figure 54A:
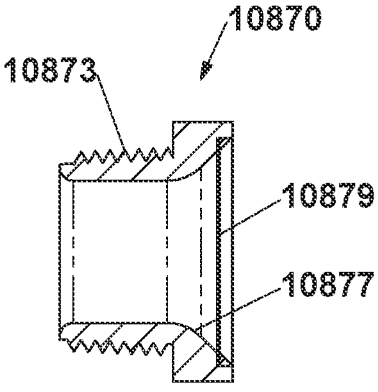
FIG. 54A is a sectional view taken along line 54A-54A of FIG. 54.

FIG. 54 is a front elevational view of the plug 10870 of FIGS. 52-53 showing membrane 10879 with section A-A of FIG. 54A further showing the plug 10870 in vertical sectional view showing moisture permeable membrane 10879 in edge view covering an entrance end of bore 10877 opposite and spaced from threaded end portion 10873.

Figure 55:
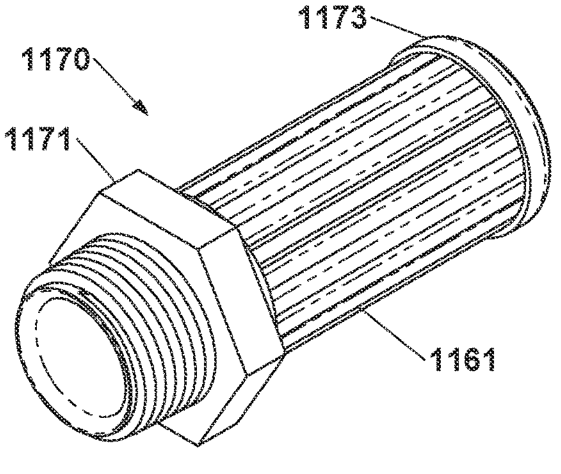
FIG. 55 is a rear perspective view from above showing an alternate moisture permeable membrane plug for using in a light housing, such as a headlight, tail light, or marker light housing.

FIG. 55 is a rear perspective view from above showing an alternate moisture permeable membrane plug 1170 for use in a light housing, such as a headlight, tail light, or marker light housing. A baffled, or pleated cylindrical configuration (to increase surface area) of moisture permeable membrane 1161 is provided between a threaded plug end 1171 and a cap end 1173 which seal with each opposed end of membrane 1161. Such configuration is similar to a fuel or air filter. One suitable class of membranes is available from GORE-TEX®. Plug end 1171 is received in a thread hole of a light housing having one of the heat sources detailed herein in order to generate heat that helps drive moisture from the light housing via the moisture permeable membrane.

Figure 56:
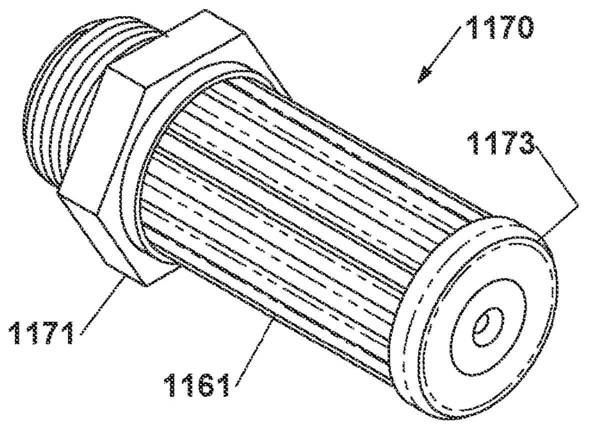
FIG. 56 is a front perspective view from above of the plug of FIG. 55.

FIG. 56 is a front perspective view from above of the plug 1170 of FIG. 55 further showing end 1171, cap 1173 and membrane 1161.

Figure 57:
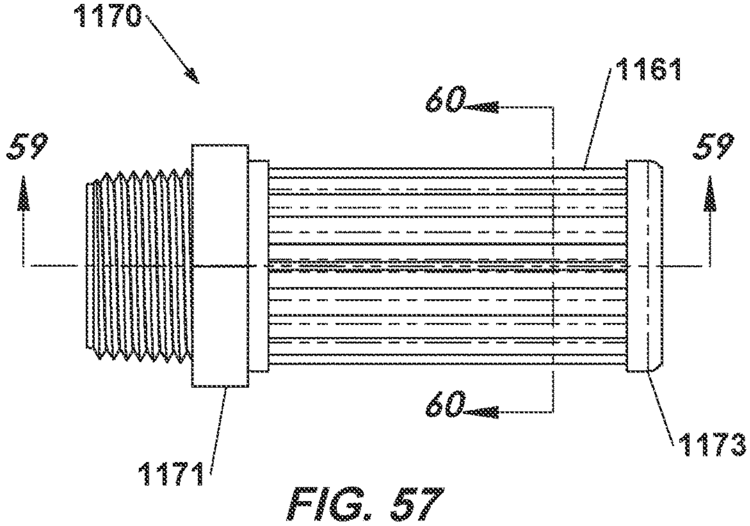
FIG. 57 is a left side elevational view of the plug of FIGS. 55-56.

FIG. 57 is a left side elevational view of the plug 1170 of FIGS. 55-56. More particularly, end 1171, cap 1173, and membrane 1161 are shown in side view.

Figure 58:
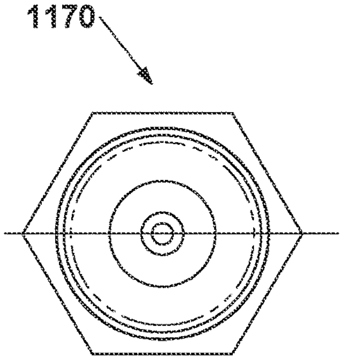
FIG. 58 is a front end view of the plug of FIGS. 55-57.

FIG. 58 is a front end view of the plug 1170 of FIGS. 55-57.

Figure 59:
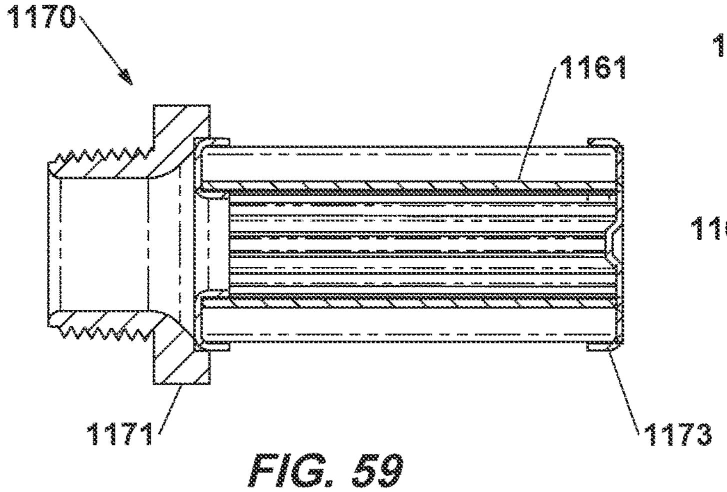
FIG. 59 is a vertical sectional view of the plug of FIGS. 55-58 taken along line 59-59 of FIG. 57.

FIG. 59 is a vertical sectional view of the plug 1170 of FIGS. 55-58 taken along line 59-59 of FIG. 57 and showing end 1171, cap 1173 and membrane 116 in sectional view.

Figure 60:
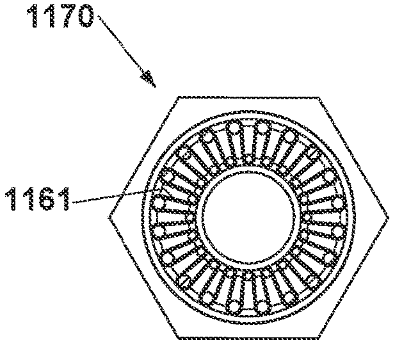
FIG. 60 is a vertical sectional view of the plug of FIGS. 55-59 taken along the line 60-60 of FIG. 57.

FIG. 60 is a vertical sectional view of plug 1170 of FIGS. 55-59 taken along the line 60-60 of FIG. 57 showing the pleats configuration of membrane 1161 and plug 1170.

Figure 61:
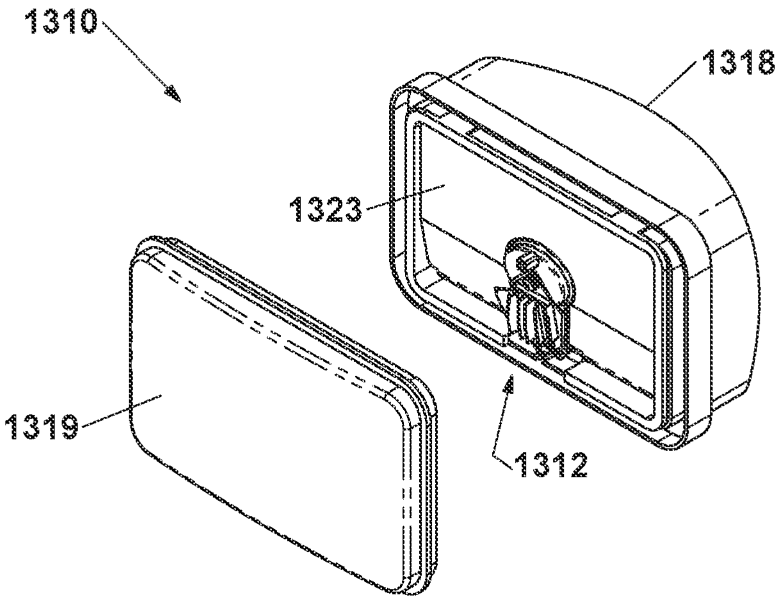
FIG. 61 is front exploded perspective view from above of a headlamp similar to that depicted in FIG. 30

FIG. 61 is a front exploded perspective view from above of a headlamp, or vehicle illumination assembly 1310 similar to that depicted in FIG. 30. Heat source, or heat transfer body 1312 includes a finned ceramic body (optionally an anodized finned body) that is heated with a PTC heater and is oriented to deliver radiant heat to lens, or outer electromagnetic lens 1319 (along with conduction and convection) to remove moisture occlusion from light transmissible portion 1321 of lens 1319. A light transmissible inner lens divider, or inner electromagnetic lens 1323 is also provided in housing 1318.

Figure 62:
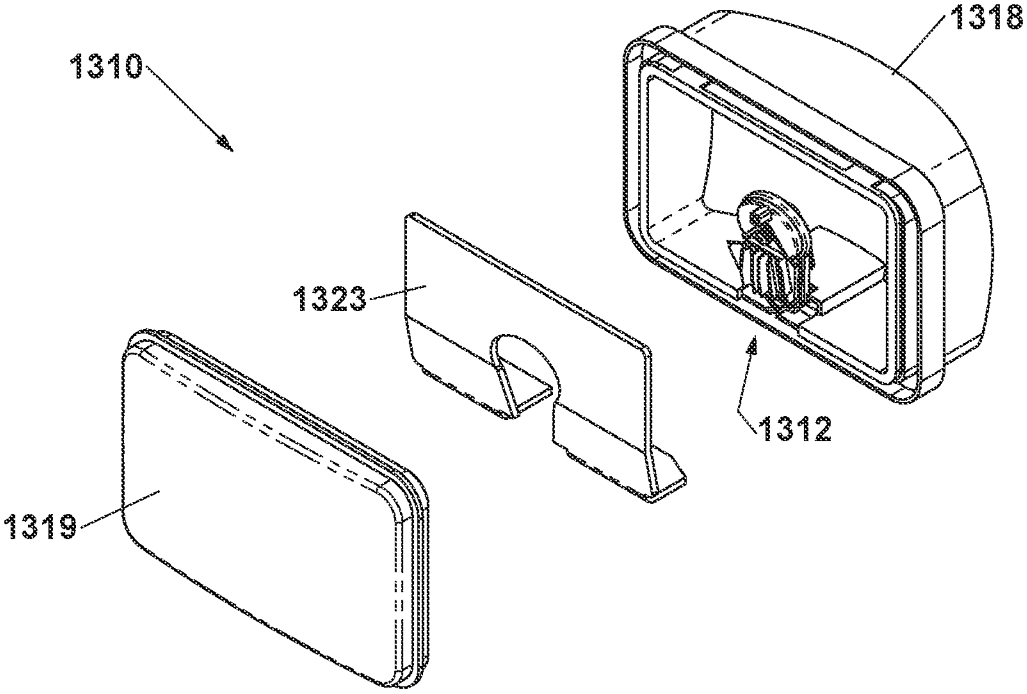
FIG. 62 is a front exploded perspective view from above of a modified headlamp similar to that depicted in FIG. 61 with the addition of a light transmissible inner lens divider that creates a smaller gas volume behind the light transmissible lens that is heated with a heat source.

FIG. 62 is a front exploded perspective view from above of a modified headlamp 1310 similar to that depicted in FIG. 61, further showing the addition of light transmissible inner lens divider 1323 before installation in housing 1318 to create a smaller gas volume behind the light transmissible lens 1319 that is heated with a heat source 1312. Heat source 1312 includes a finned ceramic body and a PTC heater configured to deliver heat, both radiant and convective, to the reduced volume provided between lens 1319 and lens divider 1323.

Figure 63:
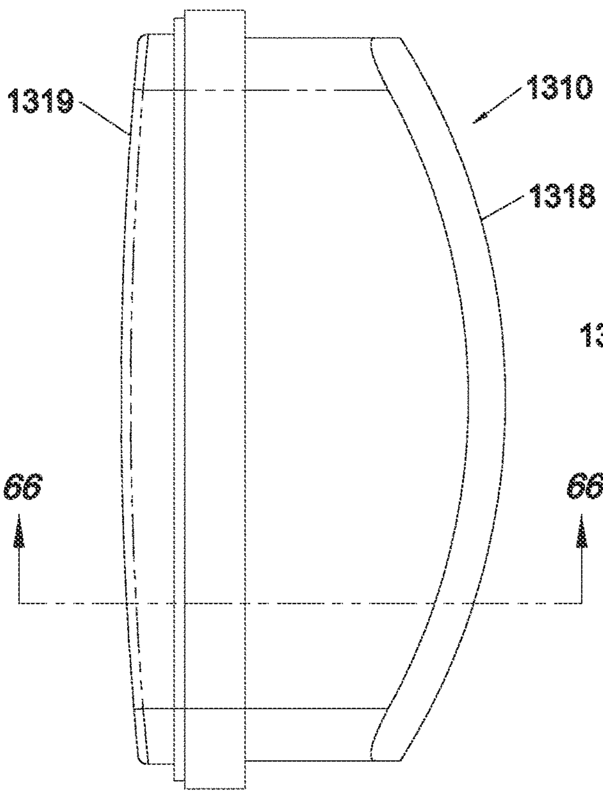
FIG. 63 is a plan view from above of the headlight assembly of FIG. 30.

FIG. 63 is a plan view from above of the headlight assembly 1310 of FIG. 30 showing lens 1319 and housing 1318.

Figure 64:
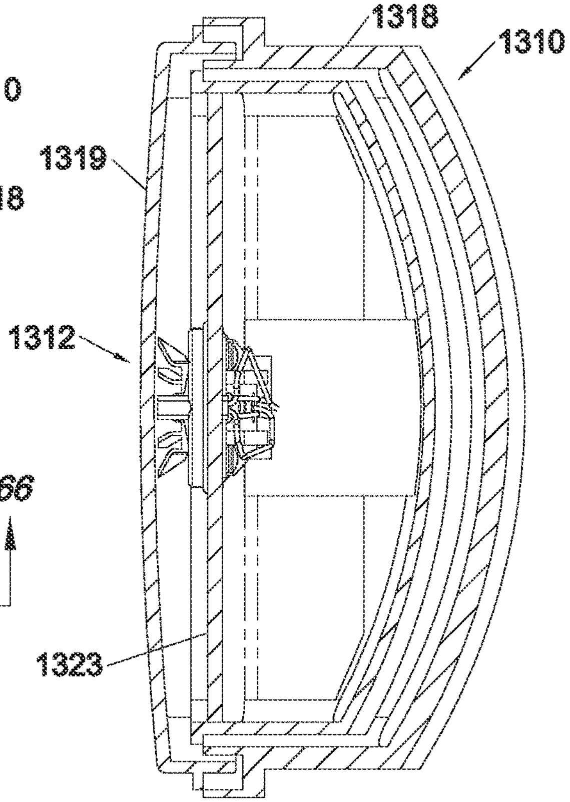
FIG. 64 is a vertical sectional view of the headlight assembly and heat source taken along line 64-64 of FIG. 65.
Figure 65:
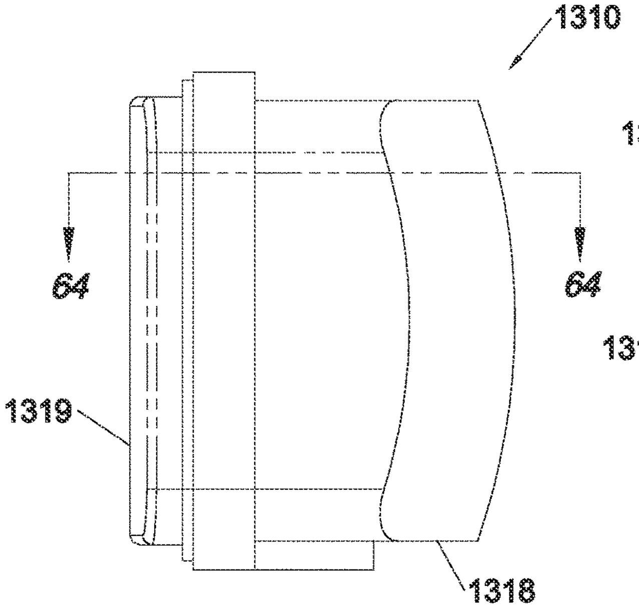
FIG. 65 is a right elevational side view of the headlight assembly of FIG. 30.

FIG. 64 is a vertical sectional view of the headlight assembly 1310 and heat source 1312 taken along line 64-64 of FIG. 65. More particularly, lens divider 1323 is shown disposed in housing 1318 behind heat source 1312 to subdivide the volume in housing 1318 which reduces volume of gas needed to be heated by source 1312 to convectively heat lens 1319. In addition, source 1312 also heats lens 1319 via radiant and convective heat transfer.

FIG. 65 is a right elevational side view of the headlight assembly 1310 of FIG. 63 showing lens 1319 and housing 1318 in side view.

Figure 66:
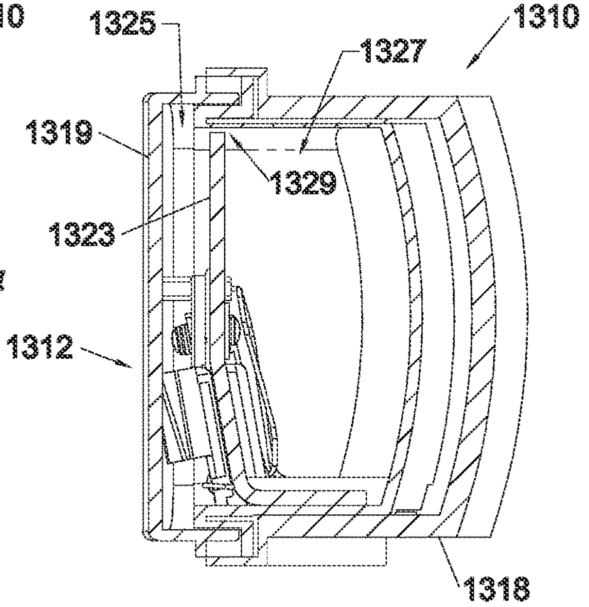
FIG. 66 is a vertical sectional view of the headlight assembly and heat source taken along line 66-66 of FIG. 63.

FIG. 66 is a vertical sectional view of the headlight assembly 1310 and heart source 1312 taken along line 66-66 of FIG. 63 and showing relative positions of lens divider 1323 relative to lens 1319 and housing 1318. Inner lens, or lens divider 1323 is affixed to enclosure, or housing 1318 to partition an outer chamber 1325 between the outer lens 1319 and the inner lens 1323 and an inner chamber 1327 behind the inner lens within the housing 1318. A fluid passage vent, or gap 1329 is provided between divider 1323 and housing 1318 extending between the outer chamber 1327 and the inner chamber 1329. Lens divider 1323 has a base flange that affixes to an inner surface of housing 1318.

Figure 67:
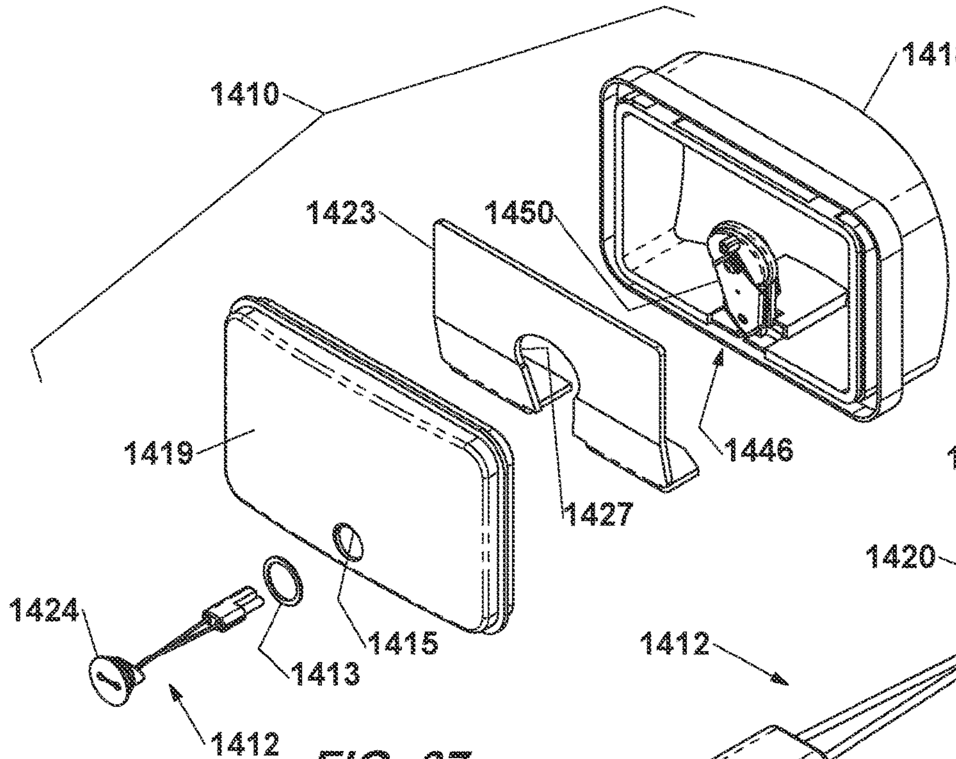
FIG. 67 is a front exploded perspective view from above of even another headlight assembly and heat source.

FIG. 67 is a front exploded perspective view from above of even another headlight assembly 1410 and heat source 1412. More particularly, heat source 1412 has a ceramic sloped and slightly hemispherical surface 1420 (see FIG. 68) that directs radiant heat radially outward and upward in corresponding perpendicular directions from such surface. Another ceramic plate 1450 mounted onto post 1446 within housing 1418 opposite the surface 1420 and is also slightly hemispherically curved in order to further reflect back radiant heat in perpendicular directions that spread out radiant heat onto an inner surface of lens 1419 to remove moisture occlusion from inside and outside lens 1419 and from inside and outside lens divider 1423. Divider 1423 is optional and can be removed in certain configurations. Further optionally, ceramic body 1420 (which is heated by an internal PTC heater (not shown—see FIG. 71A) can be made from a potted epoxy, cyanoacrylate epoxy, or a filled epoxy, such as an epoxy filled with relatively high emissivity ceramic powder. Plug body 1424 (see FIGS. 67 and 68) is mated in sealed engagement via elastomeric cylindrical sealing washer 1413 within a bore 1415 of lens 1419. An edge aperture 1427 in lens divider 1423 encircles post 1446 in close proximity.

Figure 68:
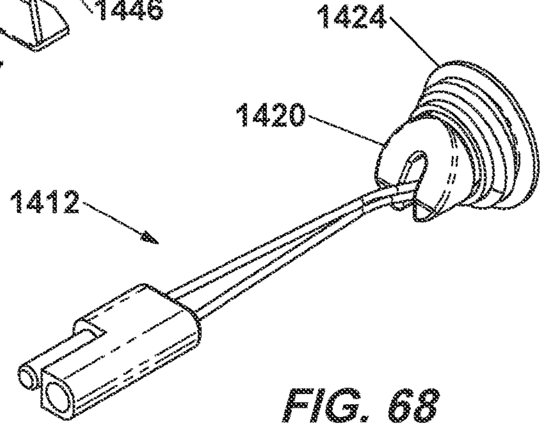
FIG. 68 is a rear perspective component view from above of the heat source of FIG. 67.

FIG. 68 is a rear perspective component view from above of the heat source 1412 of FIG. 67.

Figure 69:
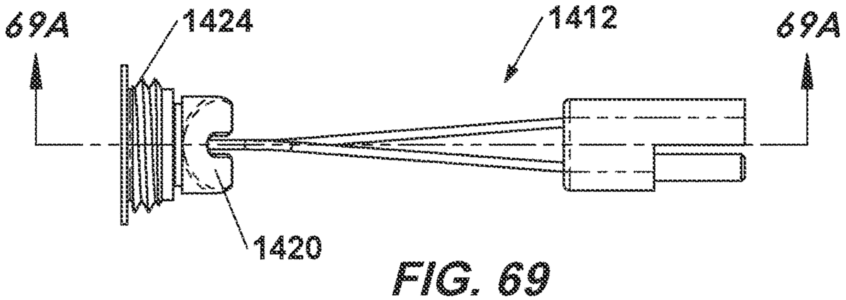
FIG. 69 is a plan view from above of the heat source of FIG. 68.

FIG. 69 is a plan view from above of the heat source 1412 of FIG. 68 showing threaded plug 1424 and sloped, or three-dimensionally shaped end surface on ceramic body 1420.

Figure 69A:
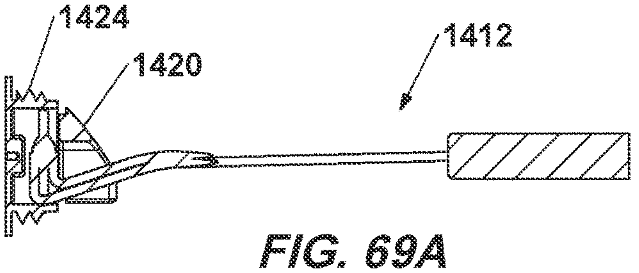
FIG. 69A is vertical sectional view of the heat source taken along line 69A-69A of FIG. 69.

FIG. 69A is vertical sectional view of the heat source 1412 taken along line 69A-69A of FIG. 69 further showing plug 1424 and ceramic body 1420.

Figure 70:
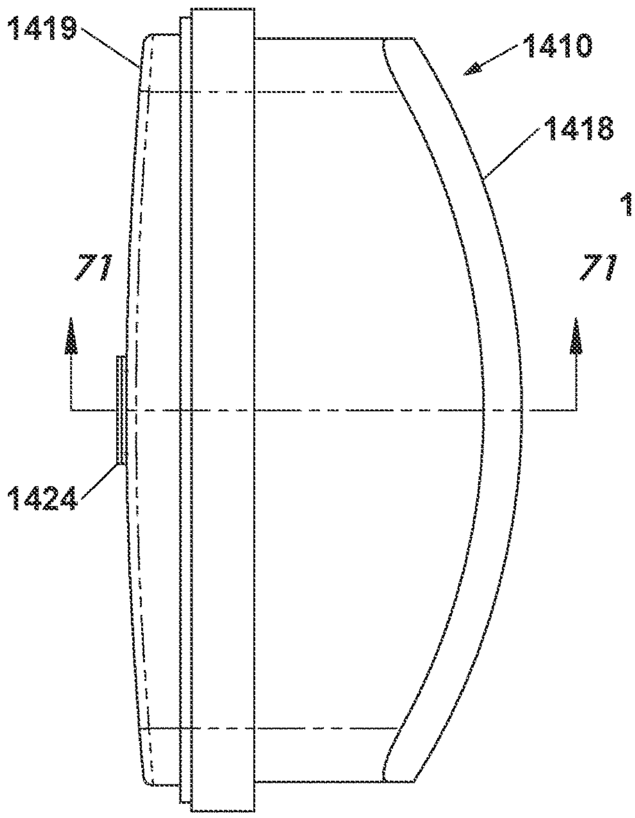
FIG. 70 is plan view from above of the headlight assembly and heat source of FIGS. 67-69A.

FIG. 70 is a plan view from above of the headlight assembly 1410 of FIG. 67-69A. More particularly, plug 1424 is shown installed in sealed engagement through lens 1419 relative to housing 1418.

Figure 71B:
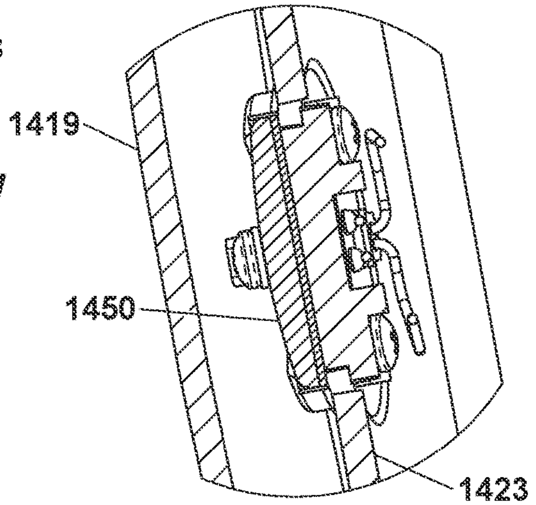
FIG. 71B is an enlarged sectional view taken along line 71B-71B of FIG. 71A.
Figure 71:
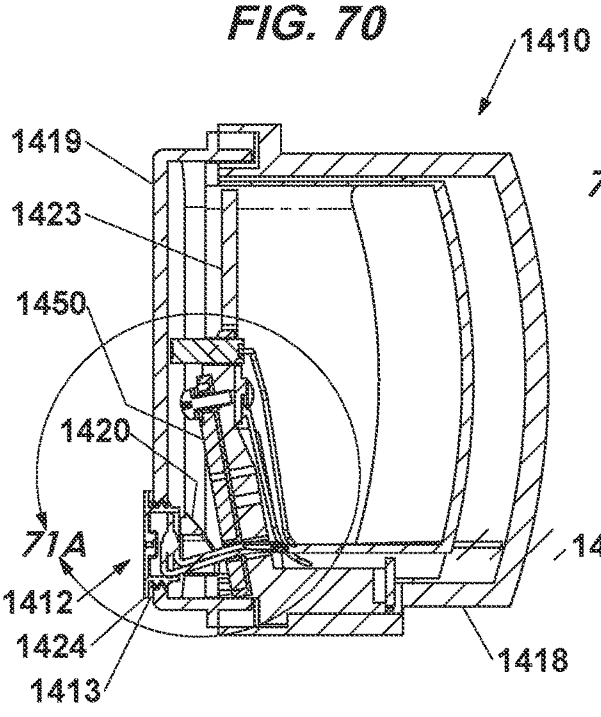
FIG. 71 is a vertical sectional view of the headlight assembly and heat source taken along line 71-71 of FIG. 70.

FIG. 71 is a vertical sectional view of the headlight assembly 1410 and heat source 1412 taken along line 71-71 of FIG. 70. More particularly, lens divider 1423 subdivides a volume within housing 1418 behind lens 1419. A ceramic plate 1450 is spaced apart in close proximity opposite sloped ceramic body 1420 so as to redirect radiant heat back onto the inner surface of lens 1419. Plug 1424 is shown sealed to lens 1419 with resilient sealing washer 1413.

Figure 71A:
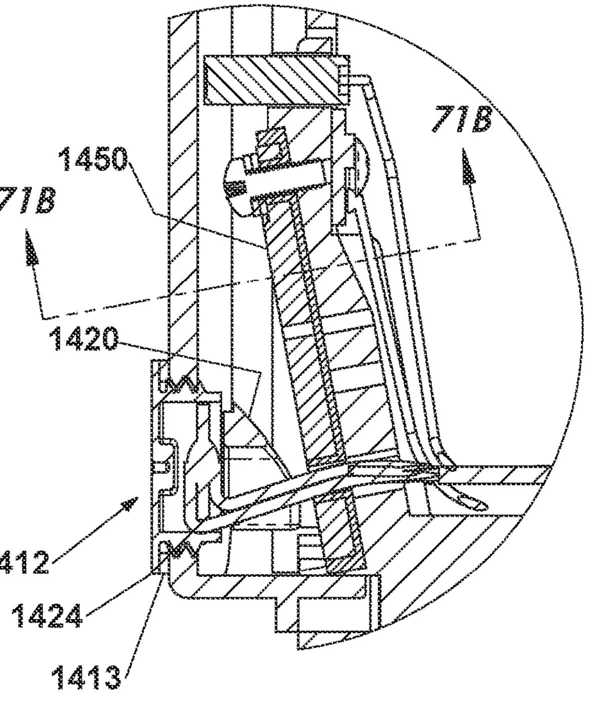
FIG. 71A is an enlarge sectional view taken from the encircled region 71A of FIG. 71.

FIG. 71A is an enlarge sectional view taken from the encircled region 71A of FIG. 71 showing washer 1413 and plug 1424 of heat source 1412 in enlarged greater detail. Likewise, ceramic plate 1450 is also shown in enlarged detail.

FIG. 71B is an enlarged sectional view taken along line 71B-71B of FIG. 71A showing ceramic plate 1450 relative to lens divider 1423 behind lens 1419.

FIG. 72 is a rear perspective view from above of a combination heat source 1512 and moisture permeable membrane plug heater 1520 for use in a light housing or light assembly by inserting the plug heater 1520 into a tapped hole in a light housing or lens.

Figure 73:
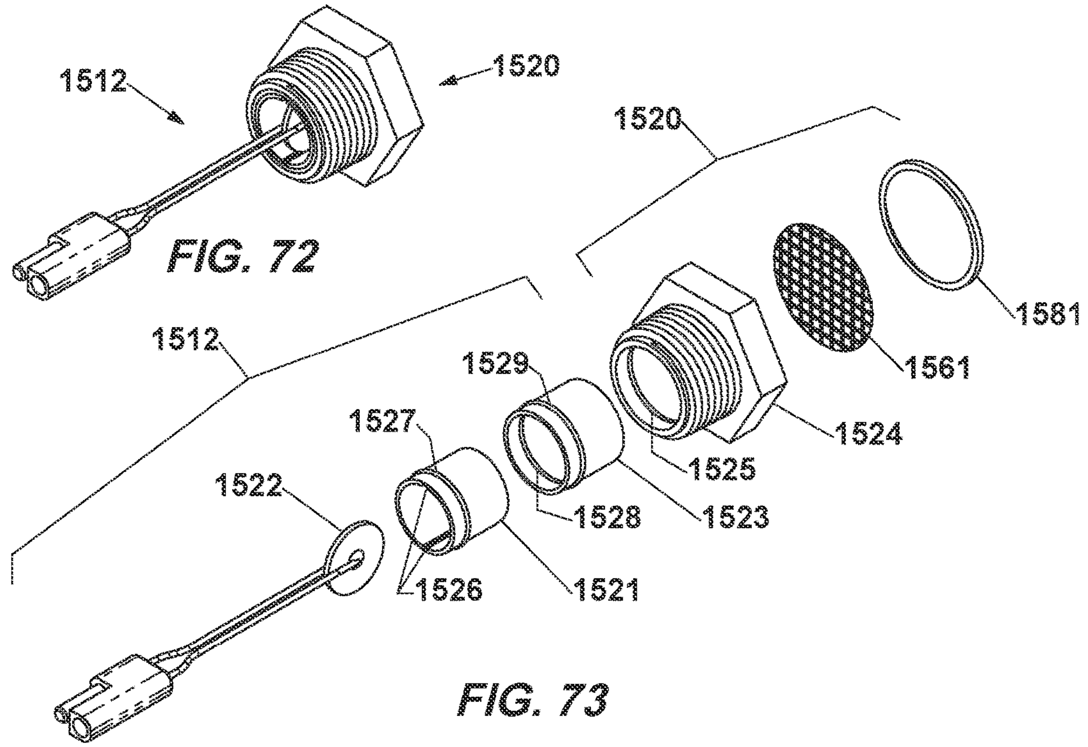
FIG. 73 is a rear exploded perspective view from above of the plug of FIG. 72.

FIG. 73 is a rear exploded perspective view from above of the combination moisture permeable membrane plug heat source 1512 and moisture permeable membrane plug heater 1520 of FIG. 72. A PTC heater 1522 is potted in a threaded body 1524 using a ceramic adhesive plug 1521 inside of an insulating silicon thimble 1523 within threaded plastic body 1524. A moisture permeable membrane 1561 is retained in a groove and about a front bore of body 1524 with a plastic ring retainer 1581 to provide for moisture delivery from within a light housing driven by elevated temperatures provided by PTC heater 1522. Annular ribs 1527 and 1529 are captured in complementary annular grooves 1528 and 1525, respectively to affix together such assembled components. A pair of longitudinal slots are provided in tubular plug 1521 to guide and retain cylindrical PTC heater 1522 therein. One suitable exemplary class of membranes is available from GORE-TEX®. Optionally, epoxy or a cyanoacrylate epoxy can be used to pot PTC heater 1522 in plug 1521. Further optionally, ceramic powder can be used to fill and epoxy when making plug 1521.

Figure 74:
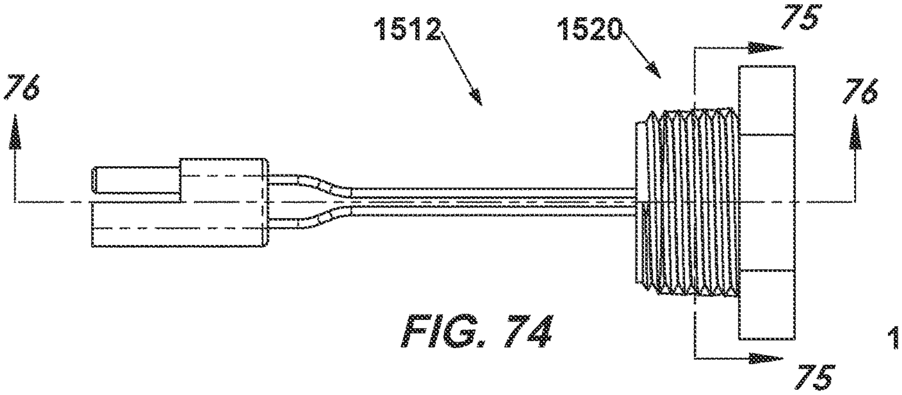
FIG. 74 is a vertical side view of the plug of FIGS. 72-73.

FIG. 74 is a vertical side view of combination moisture permeable membrane plug heat source 1512 and moisture permeable membrane plug heater 1520 of FIGS. 72-73.

Figure 75:
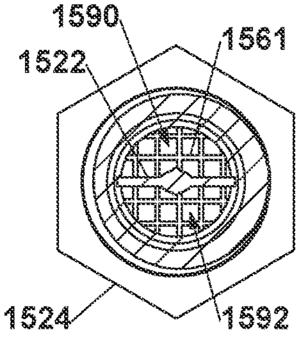
FIG. 75 is a vertical sectional view of the plug taken along line 75-75 of FIG. 74.

FIG. 75 is a vertical sectional view of the combination taken along line 75-75 of FIG. 74 and showing moisture permeable membrane 1561 with PTC heater 1522 shown within plug body 1524 to form a pair of opposed semi-cylindrical apertures 1590 and 1592.

Figure 76:
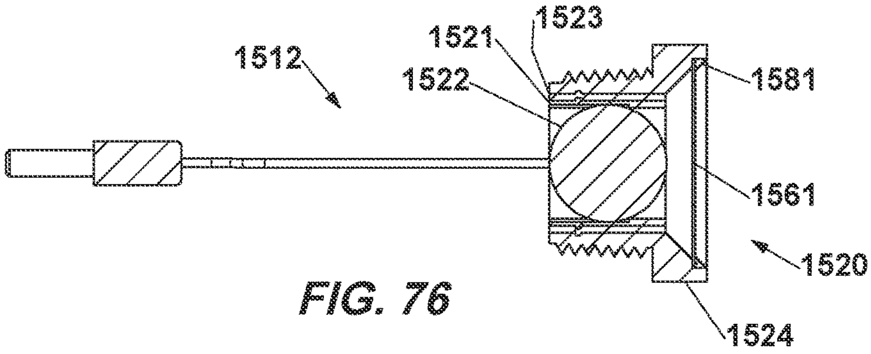
FIG. 76 is a vertical sectional view of the plug taken along line 76-76 of FIG. 74.

FIG. 76 is a vertical sectional view of the combination moisture permeable membrane plug heat source 1512 and moisture permeable membrane plug heater 1520 taken along line 76-76 of FIG. 74. More particularly, retention ring, or affixing adhesive ring 1581 is shown affixing membrane 1561 within and about a central bore of plug body 1524. PTC heater 1522 is affixed within a cylindrical conductive epoxy tubular plug 1521 within an insulating silicon thimble, or tube 1523.

Figure 77:
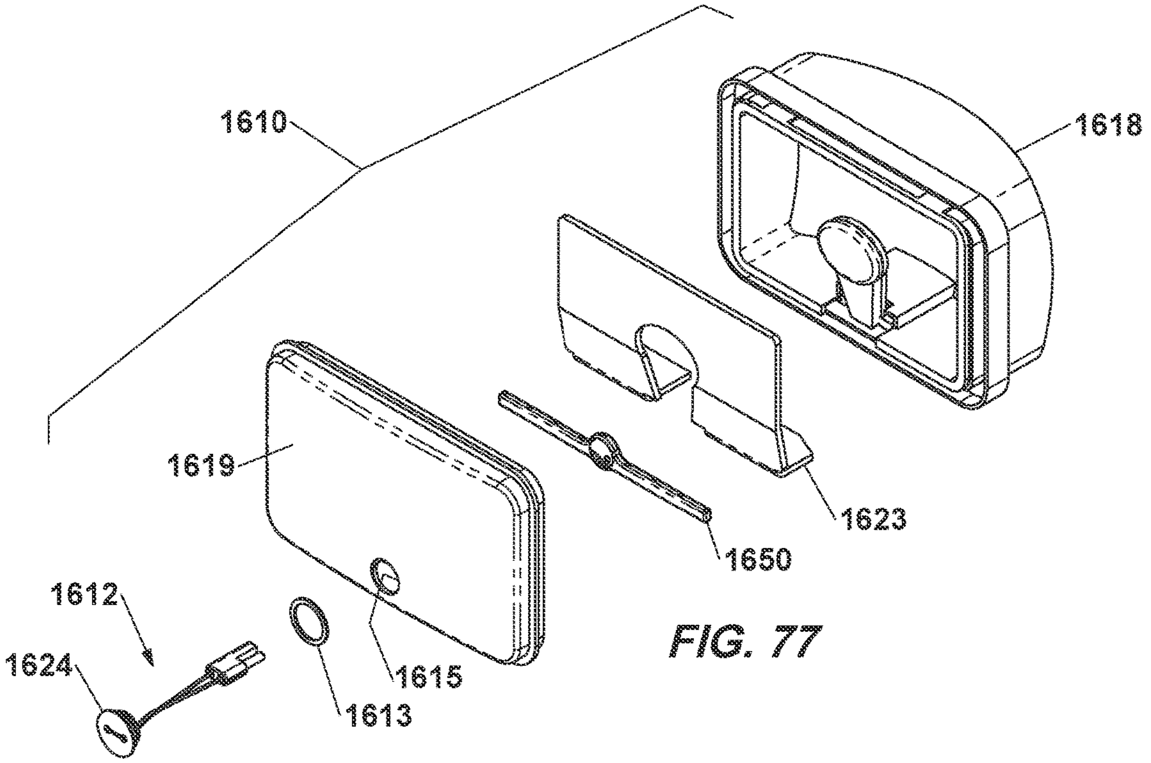
FIG. 77 is a front exploded perspective view from above showing yet even another headlight assembly having a heat source.

FIG. 77 is a front exploded perspective view from above showing yet even another headlight assembly 1610 having a heat source 1612. Heat source 1612 is a plug heater similar to heat source 1412 of FIGS. 68-69A. A plastic hollow heat pipe 1650 is shown having a central hole on a bottom surface adjacent heat source 1612. Heat and air from adjacent source 1612 enters the lower central hole and migrates outwardly on each opposed hollow arm of heat pipe 1650 where a plurality of spaced apart holes and an end hole in each arm provide an exit for rising heat via convection currents. Lens divider 1523 is affixed within housing 1618 behind lens 1619. Plug 1624 seals in threaded engagement via resilient o-ring washer 1613 within bore 1615 in lens 1619.

Figure 78:
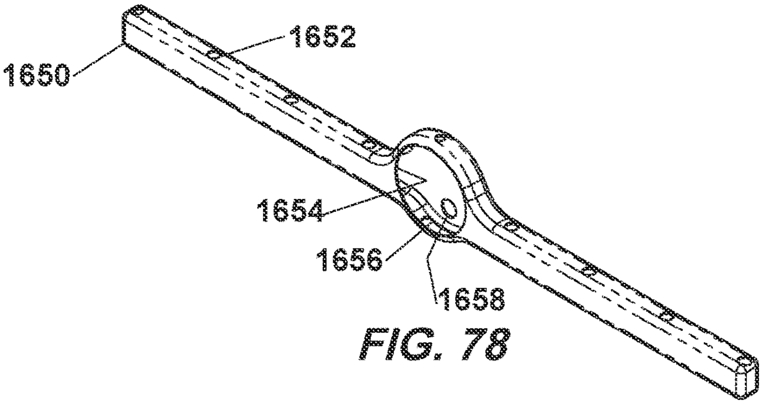
FIG. 78 is a front perspective component view of a heat pipe used in the heat source of FIG. 77.

FIG. 78 is a front perspective component view of heat pipe 1650 used in the heat source of FIG. 77. Heat pipe 1650 includes an equi-spaced apart array of top edge holes 1652 and a central aperture 1654 for receiving plug 1624 (see FIG. 77). Each opposed arm of heat pipe 1650 forms a hollow elongate tube and an air intake aperture 1656 draws in new air as heated air rises up via holes 1652 to heat lens 1619. (of FIG. 77). Aperture 1658 provides a routing path for power supply wires of heat source 1612.

Figure 79:
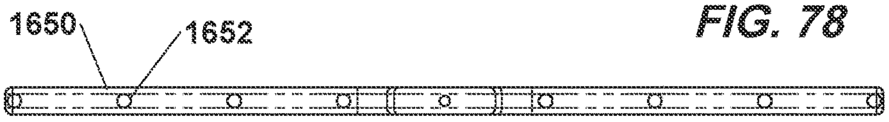
FIG. 79 is a plan view from above of the heat pipe of FIG. 78.

FIG. 79 is a plan view from above of the heat pipe 1650 of FIG. 78 showing the array of top-most spaced-apart heated air delivery holes 1652.

Figure 80:
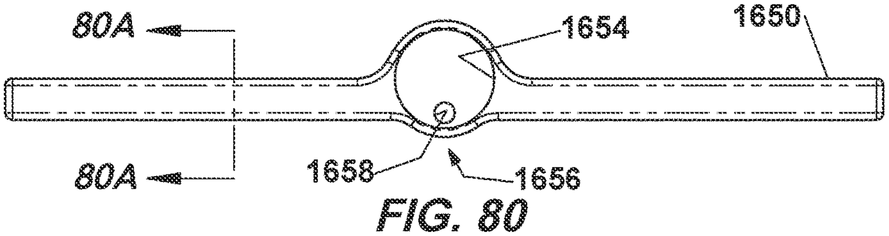
FIG. 80 is a front elevational view of the heat pipe of FIGS. 78-79.

FIG. 80 is a front elevational view of the heat pipe 1650 of FIGS. 78-79 showing central aperture 1654, air intake hole 1656, and wire clearance hole 1656.

Figure 80A:
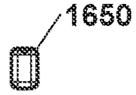
FIG. 80A is a vertical sectional view of the heat pipe taken along line 80A-80A of FIG. 80.

FIG. 80A is a vertical sectional view of the heat pipe 1650 taken along line 80A-80A of FIG. 80.

Figure 81:
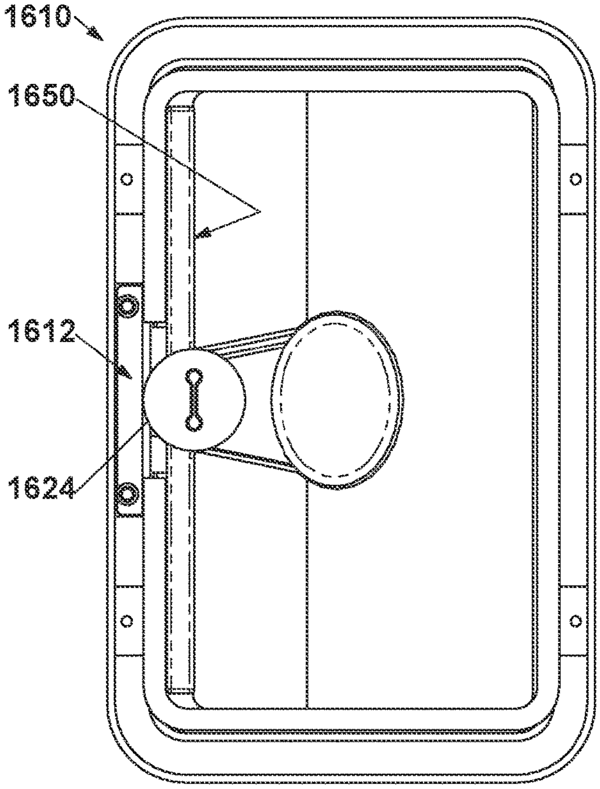
FIG. 81 is a front elevational view of the headlamp and heat source of FIG. 77.

FIG. 81 is a front elevational view of headlamp assembly 1610 and heat source 1612. Heat source 1612 is a plug heater similar to heat source 1412 of FIGS. 68-69A. A plastic hollow heat pipe 1650 is shown supplied with a source of heat from plug 1624.

Figure 82:
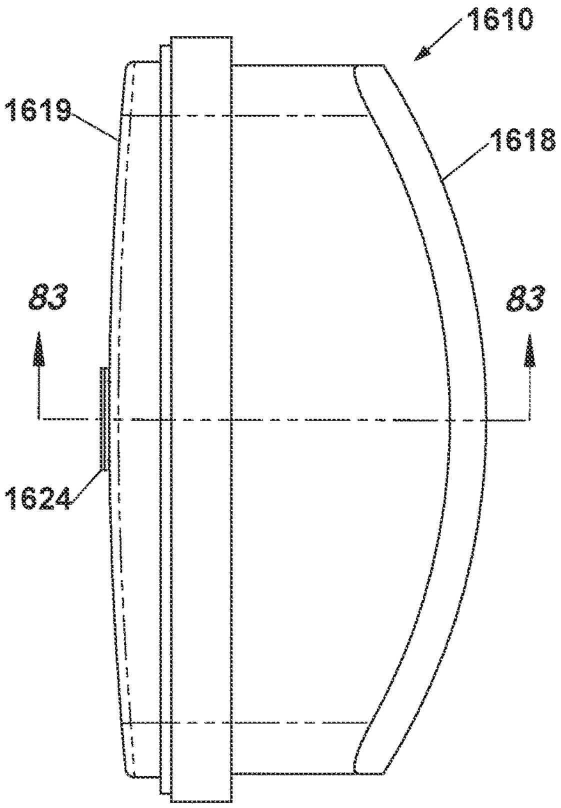
FIG. 82 is a plan view of the headlamp and heat source of FIG. 81.

FIG. 82 is a plan view of the headlamp 1610 and heat source of FIG. 81 showing plug 1624 affixed in sealed relationship within lens 1619 opposite housing 1618.

Figure 83:
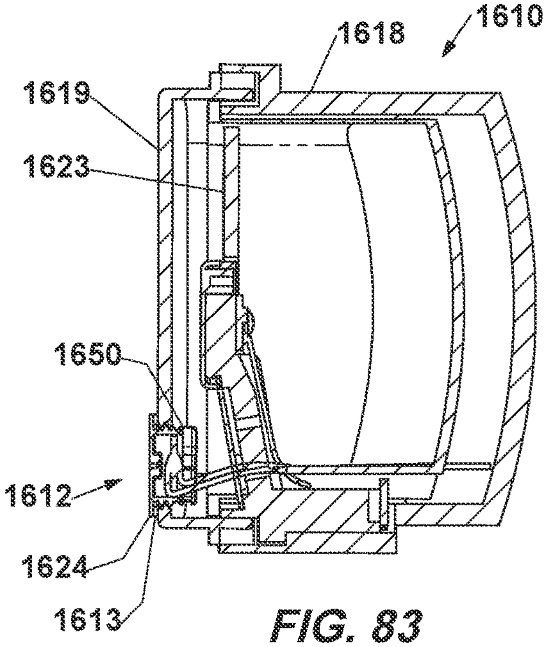
FIG. 83 is a vertical sectional view of the headlamp and heat source taken along line 83-83 of FIG. 82.

FIG. 83 is a vertical sectional view of the headlamp 1610 and heat source 1612 taken along line 83-83 of FIG. 82 showing lens divider 1623 subdividing a volume within housing 1618 behind lens 1619. Plug 1624 is sealed with resilient synthetic rubber o-ring washer 1613 to lens 1619 aligned and seated with heat pipe 1650.

Figure 84:
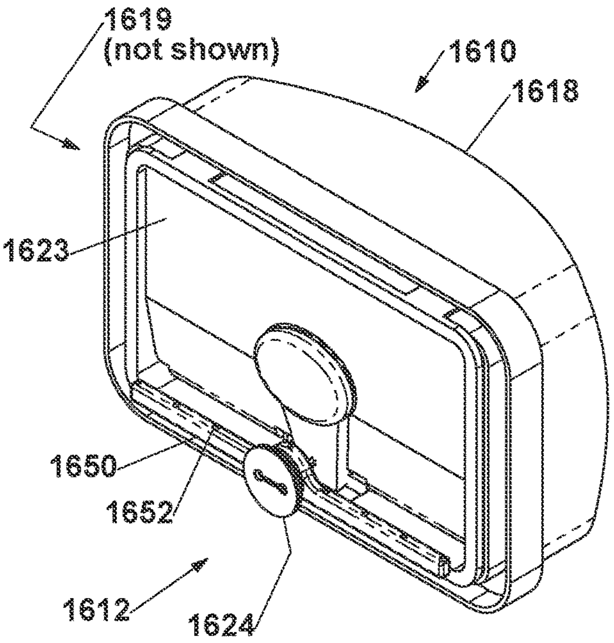
FIG. 84 is front perspective view from above of the headlamp and heat source of FIGS. 81-83.

FIG. 84 is front perspective view from above of the headlamp 1610 and heat source 1612 of FIGS. 81-83 showing lens divider 1623, heat pipe 1650, heated air outlet holes 1652, plug 1624 and (omitted) lens 1619 having a light transmissive portion.

PTC (Positive Temperature Coefficient) heating elements provides a self-contained mechanism wherein the heater is self-regulating, eliminating the need for a thermostat or separate temperature sensor and feedback control loop arrangement. The PTC heating element, which is comparable to an electric resistive heating filament, will increase or decrease its own internal resistive property. Increasing the resistance decreases the current flow and heat, and decreasing the resistance increases the current flow and heat, depending on the internal temperature of the PTC material. This enables the PTC heating element to self-regulate current flow through the device and in particular, heat output of the device within a pre-determined and usefully accurate range. Additionally, use of the PTC heating elements offers the useful advantage of inherent or built-in control of heat output and consumption of electrical current for more efficient power consumption than for regular, or prior design heating elements. Furthermore, new radiative heat transfer structures are implemented with the PTC heater. The prior design heating elements just turn on to the maximum heat until a thermostat turns it off by means of an additional control system or electronic circuitry. Hence, the prior designs can cause undesirable heating and cooling fluctuations including cyclic or periodic heating and cooling. PTC heaters can be designed or otherwise pre-selected to operate within a desired range of temperatures and output heat characteristics at or approaching steady-state conditions for a given application offering inherent simplicity over previous methods. As implemented, a PTC heater and a ceramic radiant heat dissipating body is placed in the light housing enclosure, allowing for increased radiative heat transfer to occur in combination with convective heat transfer (hot air rises, and cold air will cycle downward), and therefore ensure greater heat transfer and concentration to the lens. In one embodiment, the PTC heating element is electrically adapted or connected right into the existing light power circuitry, making installation of a PTC heated light as simple as unplugging one and plugging in or adapting the other in its place. Optionally, alternate heat sources such as dichromium wire or resistive wire heaters can be used as a heat source either separately, or in combination with a PTC and/or thermistor component.

Provision of increased radiative heat transfer over prior efforts via use of a ceramic radiant heat dissipative body provides enhanced ability to eliminate condensation from within and outside of a vehicle lens, both frozen and liquid (vapor). Furthermore, provision of plug shaped PTC heaters in several configurations also provide the enhanced ability to eliminate condensate. Compact and simple to install, plug-shaped PTC heaters are especially useful in retro-fit applications of existing light housings already released to customers and in daily use. This feature is especially important where there are preferably none or at least minimal negative side effects or encroachment to the existing light-transmissible optics and geometries within the light housing. Radiant heat transfer and convective heat transfer are largely independent and unrelated mechanisms, and both are optimized by the present designs. Radiant emissions (heat transfer) can occur in a vacuum whereas convective heat transfer cannot occur in a vacuum. This is because radiant heat transfer is purely black body radiation in accordance with the Stefan-Boltzmann law: $j^*=\epsilon\sigma T^4$, where: $j^*$ is the radiant flux, or irradiance (Watts/meter$^2$), $\epsilon(<1)$ is the emissivity, a is the Stefan-Boltzmann constant, and T is the absolute temperature of the body. Desirable higher levels of emissivity (approaching values of 1) typically means that the surface looks black, especially at the peak spectrum of the radiator, which depends on the temperature. Effective heat convection typically involves superior heat conductors (typically metal) with granular surface finishes to achieve larger surface area in contact with the surrounding gas, or larger surface areas. The balancing between conductive heat transfer and radiant heat transfer is typically slight with very little to trade off because radiant heat dissipation is an order of magnitude larger than convective heat dissipation in air at one atmosphere pressure. The matter is different when dealing with higher density gas.

Figure 85:
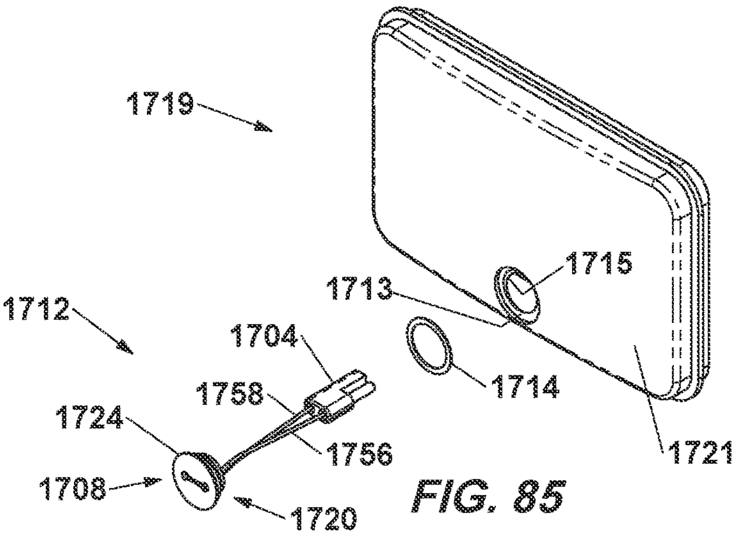
FIG. 85 is an exploded perspective view of one exemplary heated vehicle LED head light lens assembly configured for use on a housing assembly (not shown) having a threaded recessed port within the lens, a plug-shaped threaded heat source and a circumferential seal.

FIG. 85 illustrates one construction for a heated lens 1719 for a vehicle illumination system, or vehicle head light 1710 (see FIG. 87) having a heat source 1712 with a radiant heat dissipating body 1720 including a plug-shaped heater 1708 with a positive temperature coefficient (PTC) heater unit 1722 (see FIG. 86B), which in this example is designed to keep the ambient temperature within the vehicle light housing 1710 at approximately 140 Degrees F. (60 degrees C.) whenever electrical power is supplied to the heater from an electrical power source such as a vehicle power source. Heat source 1712 is affixed to a light transmissive portion 1721 of lens 1719 within a threaded bore 1715. A plug assembly 1704 and a pair of insulated conductive leads 1756 and 1758 pass through bore 1715 in assembly. A flat, cylindrical sealing washer 1714 of flexible and thermally conductive material is provided between a plug body 1724 of heat dissipating body 1720 and a recessed circumferential seal surface 1713 of lens 1719 to provide a weatherproof seal there between. Heat source 1712 enables heat transfer to light transmissive portion 1721 of lens 1719 at a temperature high enough to mitigate or eliminate condensation, either frozen or liquid, from occluding light transmission through the lens 1719. Although depicted on a vehicle head light, it is understood that heat source 1712 can be implemented on any other type of vehicle light, such as tail lights, side marker lights, clearance lights, stop lights and non-powered safety reflectors.

Figure 86:
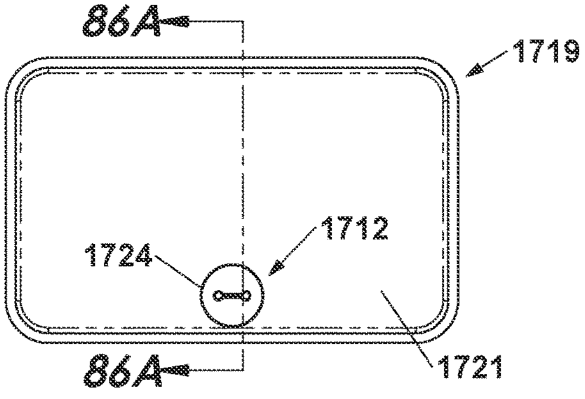
FIG. 86 is a front elevational view of the heated vehicle LED head light lens assembly of FIG. 85.
Figure 86A:
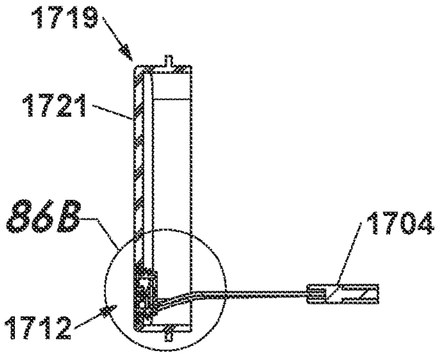
FIG. 86A is a side vertical sectional view of the heated vehicle LED head light lens assembly taken along line 86A-86A of FIG. 86.

As shown in FIG. 86, vehicle head light lens 1719 shows centered bottom placement of heat source 1712 in light transmissive portion 1721 of lens 1719. According FIGS. 86 and 86A, plug body 1724 is mated in threaded engagement within bore 1715 (see FIG. 85) of lens 1719 at most flush with an outer surface of light transmissive portion 1721. Optionally, plug body 1724 can be recessed relative to an outer surface of lens 1719 to provide a recessed heat source 1712 relative to an exterior surface of light transmissive portion 1721. In assembly, connector plug 1704 and insulated conductive leads 1756 and 1758 are received through bore 1715 (see FIG. 85) within a head light 1710 (see FIG. 87) for connection to a power supply (not shown) within such head light assembly, as shown in FIG. 86A.

Figure 86B:
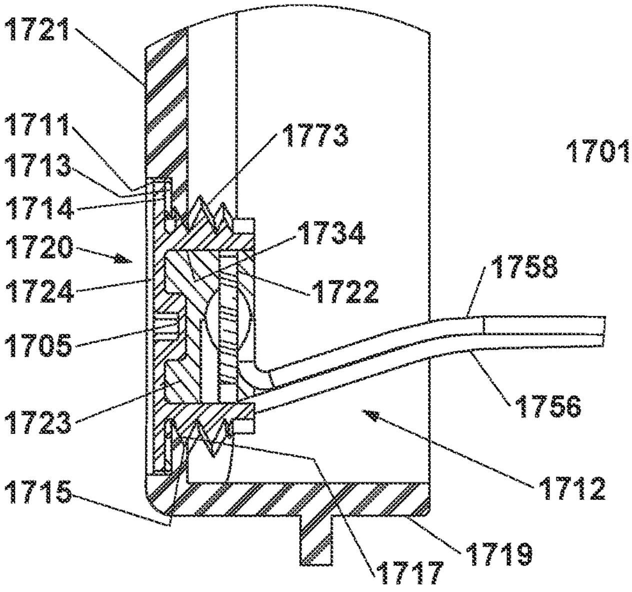
FIG. 86B is an enlarged partial cross-sectional view of the heated vehicle LED head light lens assembly taken from the encircled region 86B of FIG. 86A.

FIG. 86B shows in greater detail moisture proof sealed assembly of plug body 1724 on heat dissipating body 1720. An outer surface of plug 1724 is shown recessed slightly below an outer surface of light transmissive portion 1721 on lens 1719. More particularly, a resilient and thermally conductive flat cylindrical sealing washer 1714 is compressed in sealing engagement between a radially outwardly extending circumferential flange 1711 of plug body and recessed circumferential flange, or seal surface 1713 about threaded bore 1715 of lens 1719. Radially outwardly extending circumferential flange 1711 compresses sealing washer 1714 against recessed circumferential sealing surface, or flange 1713 as cylindrical male threaded portion 1773 threads into engagement with a complementary female threaded portion 1717 of bore 1715. An integrally molded centrally located flat tool slot 1705 enables threaded mating of plug body 1724 within threaded bore 1715 of lens 1719. A cylindrical disk-shaped positive temperature coefficient (PTC) heater 1722 is affixed within a cylindrical bore, or recess 1734 within plug body 1724 using a thermally conductive material 1723, such as an epoxy, filled epoxy, or other suitable adhesive or structural potting material. For example, filled epoxy can include one or more of aluminum or ceramic powder in order to respectively increase thermal conductivity and emissivity of the resulting filled epoxy for heat source 1712. In some cases, it is desirable to have higher thermal conductivity between plug body 1724 and lens 1719. In other cases, it is desirable to have higher radiant heat transfer (elevated emissivity values) with respect to material 1723.

Optionally, one exemplary high thermal transfer epoxy adhesive potting material is a grey two-component, aluminum-filled epoxy system commercially available from Epoxies, Etc. (Innovative Bonding Solutions) through Epoxies.com, 21 Starline Way, Cranston, RI 02921, USA, available commercially as product number 70-3812 NC. This thermal epoxy system has a thermal conductivity of 4.5 W/m-K with an operating temperature range of −55 to 155 degrees C. (−131 to 311 degrees F.) once the two-part epoxy is fully cured after mixing. Rates of curing range from 15 to 20 minutes at 125 degrees C. (257 degrees F.) to 24 hours at 25 degrees C. (77 degrees F.) making this material suitable for use in production manufacturing settings. Additionally, this material passes NASA's outgassing requirements per ASTM standard E-595-07 making this particular potting material highly suitable for extreme environments.

One exemplary lens portion for element 1721 of subassembly 1719 that has been adapted and configured to accept a heated plug assembly is available for purchase and included as a part of 4"×6" (10 cm×15 cm) rectangular LED headlight assembly model number VHL-4X6DRL, manufactured and distributed by Maxxima, a division of Panor Corporation, 125 Cabot Court, Hauppauge, New York 11788, USA.

It can be argued that current LED lighting technology is a victim of its own success when it comes to preventing and eliminating condensation, snow and ice from the lens of a light housing. For example, the reduced power consumption and heat output of the more recently introduced LED lights compared to the well-known greater power consumption and heat output of historic and long-familiar incandescent lights is about 10% of the energy required for incandescent. This difference tends to reinforce and emphasize the inherent problem with the inability of LED lights to prevent and eliminate condensation, snow and ice from accumulating and obstructing the lenses of a vehicle lighting system, and underlines the urgent need for a practical, viable and economically cost-effective solution to this problem.

One exemplary threaded plug for element 1724 is commercially available for purchase part from Thomas & Betts Corporation (A member of the ABB Group), 8155 T&B Boulevard, Memphis, Tennessee 38125, USA. Threaded plug component 1724 is a ½" (13 mm) nominal diameter threaded low-profile, generally flush-head hollow plastic plug used to seal unused threaded holes with commercially available Red Dot (brand) model number S203E rectangular lamp holder cover. This rectangular lamp holder cover is typically used to support lighting fixtures that are specified for use in wet locations for both residential and commercial building wiring and lighting fixture applications.

While the exemplary threaded plug is composed of injection molded plastic material, it is understood that a custom manufactured threaded plug of a different material may be implemented. Optional materials and methods of manufacture may include, for example, a selectively preferred material that is both compatible with its intended long-term exposure to the environment while also providing the ability to readily conduct, transfer or radiate heat energy specifically and directly into the lens portion of a vehicle light. In addition to material thermal conductivity and radiation characteristics, storage of heat within a thermal mass is another factor or attribute defined by the specific heat capacity of different materials. A higher specific heat capacity or the ability to store heat can promote more stable or even heating of the lens throughout a variety of changing temperatures and environmental conditions. Therefore, custom tailored types of more thermally ideal plastics or composite materials are anticipated (beyond for example molded, cast or machined metals such as aluminum, stainless steel, or zinc, etc.), including various types of ceramic having preferred characteristic degrees of heat transfer, high emissivity, and specific heat capacity.

One exemplary plastic-molded polarized 2-wire bullet connector for element 1751, further including flexibly-insulated 16-gauge or the like multi-strand copper conductor wires 1756 and 1758, is commercially available for purchase from Wiring Products, Ltd., 135 Isidor Ct Ste B, Sparks, NV 89441, USA. Flexibly-insulated multi-strand copper conductor wires 1756 and 1758 are electrically bonded to conduct electricity, or otherwise can be electrically attached, bonded or connected to the opposite faces or poles of PTC heater 1722 preferably by typical heat-soldering processes and connection materials available for such purposes.

Optionally, insulated sold copper conductor wires may be utilized in place of multi-strand copper conductor wires 1756 and 1758. Further optionally, electrically conductive insulated bus bar or braided material comprised of other electrically conductive metals and materials may be utilized and mechanically configured to resist both mechanical fatigue or chemical corrosion anticipated as a result of long-term exposure to both vibration and thermal expansion and contraction and the elements.

Optionally, a sealed water-proof polarized connector may be used (not shown) for element 1751. One exemplary sealed water-proof connector is commercially available for purchase as Delphi part number 1210973, male 2-contact shroud half Weather Pack Connector, item number 38042. Further optionally, Delphi part number 12015792, female 2-contact tower half body Weather Pack Connector, item number 38043. Both optional connectors are commercially available for purchase from Waytek, Inc., 2440 Galpin Court, PO Box 690, Chanhassen, MN 55317, USA.

One exemplary heat source for element 1722 is a positive temperature coefficient (PTC) heater commercially available from Digikey Electronics, 701 Brooks Ave South, Thief River Falls, MN 56701 USA, as part number 223-1183-ND (manufacturer part number P5005C050S500H, Spectrum Sensors & Controls, Inc., 328 State Street, St. Mary's, PA 15857, USA). This is a small and compact round disk-shaped heater 0.50 inches (13 mm) in diameter by 0.050 inches (1.27 mm) in thickness, having a rating of 50 volts maximum input voltage and a switch temperature of 50 degrees C. (122 deg. F). Electrical current resistance at 25 degrees (77 deg. F) is rated at 5 ohms. Other optionally available switch temperatures of any desired value between a range of 40 degrees C. (104 deg. F) and 150 degrees C. (302 deg. F) may be selected accordingly by specified temperatures through correspondingly different part numbers. Switch temperatures can be generally defined as the nominal operating target temperature or design temperature range of a PTC heater.

Optionally, it is anticipated that PTC heaters may be manufactured to a specified switch temperature, and that custom PTC heaters may be made available in specified minimum or limited quantities for unique applications in instances where the desired temperatures should fall between commonly-available production PTC switch temperature values.

One exemplary adhesive and potting material for thermally conductive adhesive and potting material of element 1723 is available for purchase from Loctite™ (Adhesives Division of Henkel Corporation), 200 Elm Street, Stamford, CT 06902, USA as a Loctite adhesive number HY 4090 GY. This adhesive is a grey two-part liquid-gel compatible with most metals, plastics, and rubber materials and has a minimum and maximum operating temperature range of −40 degrees (−104 deg. F) to 150 degrees (302 deg. F). This temperature range is well within the anticipated working range of temperatures of the present device. This exemplary adhesive has a mechanical shear strength of 2420 psi and a tensile strength of 1025 psi. The strength of this material is well within the expected working loads of the present device.

Another exemplary adhesive and potting material for element 1723 is available for purchase from Aremco Products, Inc., 707-B Executive Boulevard, Valley Cottage, NY 10989, USA as product part number 865 Ceramabond™ which is suitable for bonding ceramics to ceramics and ceramics to metals further including an aluminum nitride filler material to promote thermal conductivity characteristics between joined components as preferred.

Figure 87:
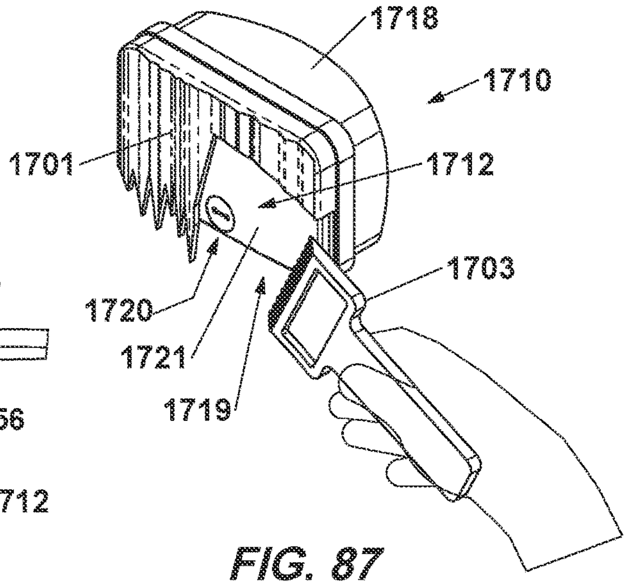
FIG. 87 is a perspective view of an exemplary vehicle LED head light assembly including the heated LED head light lens assembly of FIGS. 85, 86, 86A, and 86B and illustrating an ice scraper being used to scrape accumulated snow and/or ice from an outer surface of a light transmissible portion of the lens.

FIG. 87 is a perspective view of an exemplary vehicle LED head light assembly 1710 including the heated LED head light lens assembly 1719 of FIGS. 85, 86, 86A, and 86B and illustrating an ice scraper 1703 being used to scrape accumulated snow and/or ice 1701 from an outer surface of a light transmissible portion 1721 of lens 1719 on housing 1718. FIG. 87 shows one exemplary complete headlight assembly including the lens portion of a 4"×6" (10 cm×15 cm) rectangular LED headlight assembly model number VHL-4X6DRL, manufactured and distributed by Maxxima, a division of Panor Corporation, 125 Cabot Court, Hauppauge, New York 11788, USA, as previously described. However, the lens 1719 has been modified with a threaded bore 1715 and recessed circumferential seal surface, or flange 1713 to accept in threaded engagement heat source 1712 in the form of a threaded heat dissipating body 1720 that is recessed (or at most flush) with an outer surface of lens 1719. This design provides a distinct advantage such that a user will not snag an ice scraper 1703, for example, on plug body 1720 when clearing ice from portion 1721 of lens 1719. This greatly improves the often-difficult task of scraping and clearing snow and ice 1701 from the light transmissive portion 1721 of lens 1719 without potential physical damage to the plug-shaped heater 1708, the lens 1719 or the ice scraper 1703. Additionally, this flush design of the heat source makes simple cleaning and wiping of the lens convenient by avoiding a protrusion or obstacle at the face of the lens 1921.

Figure 88:
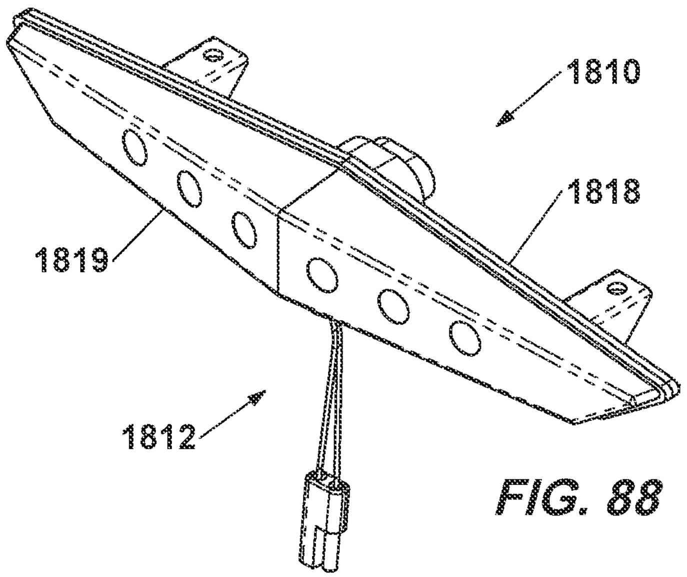
FIG. 88 is a perspective view of another exemplary LED tail light assembly for use on a snowmobile and having a plug-shaped threaded heat source.

FIG. 88 is a perspective view of an exemplary LED tail light assembly 1810 for use on a snowmobile (not shown) and having a plug-shaped threaded heat source 1812. More particularly, heat source 1812 comprises a heat dissipating body 1820 (see FIG. 89) in the form of a cylindrical plug-shaped body 1824 (see FIG. 90) that is affixed into a threaded bore 1815 (See FIG. 90A) in a bottom wall of a lens 1819 of tail light 1810.

Figure 89:
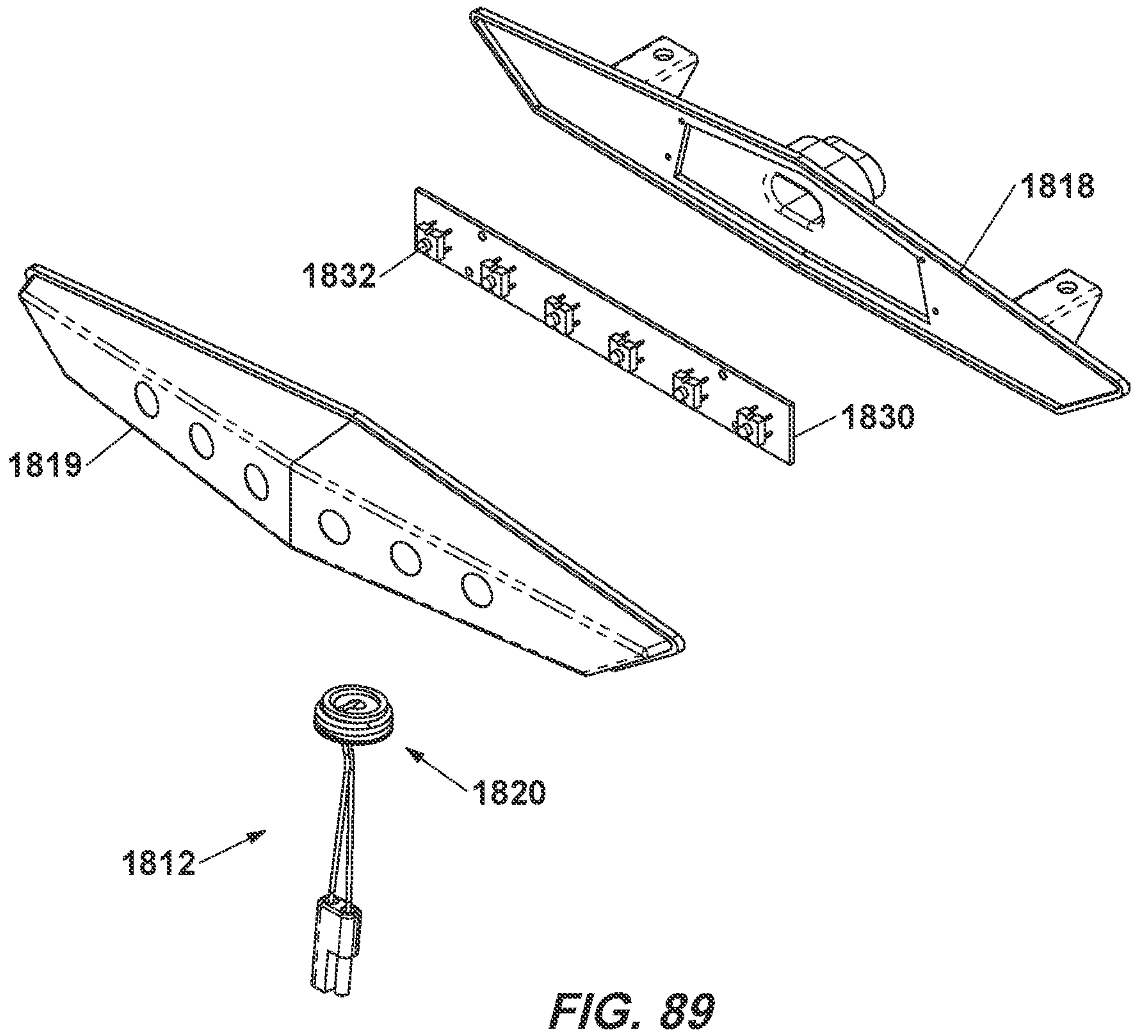
FIG. 89 is an exploded perspective view of the snowmobile tail light assembly of FIG. 88.
Figures 90, 90A, 91, 91A, 92, 93:
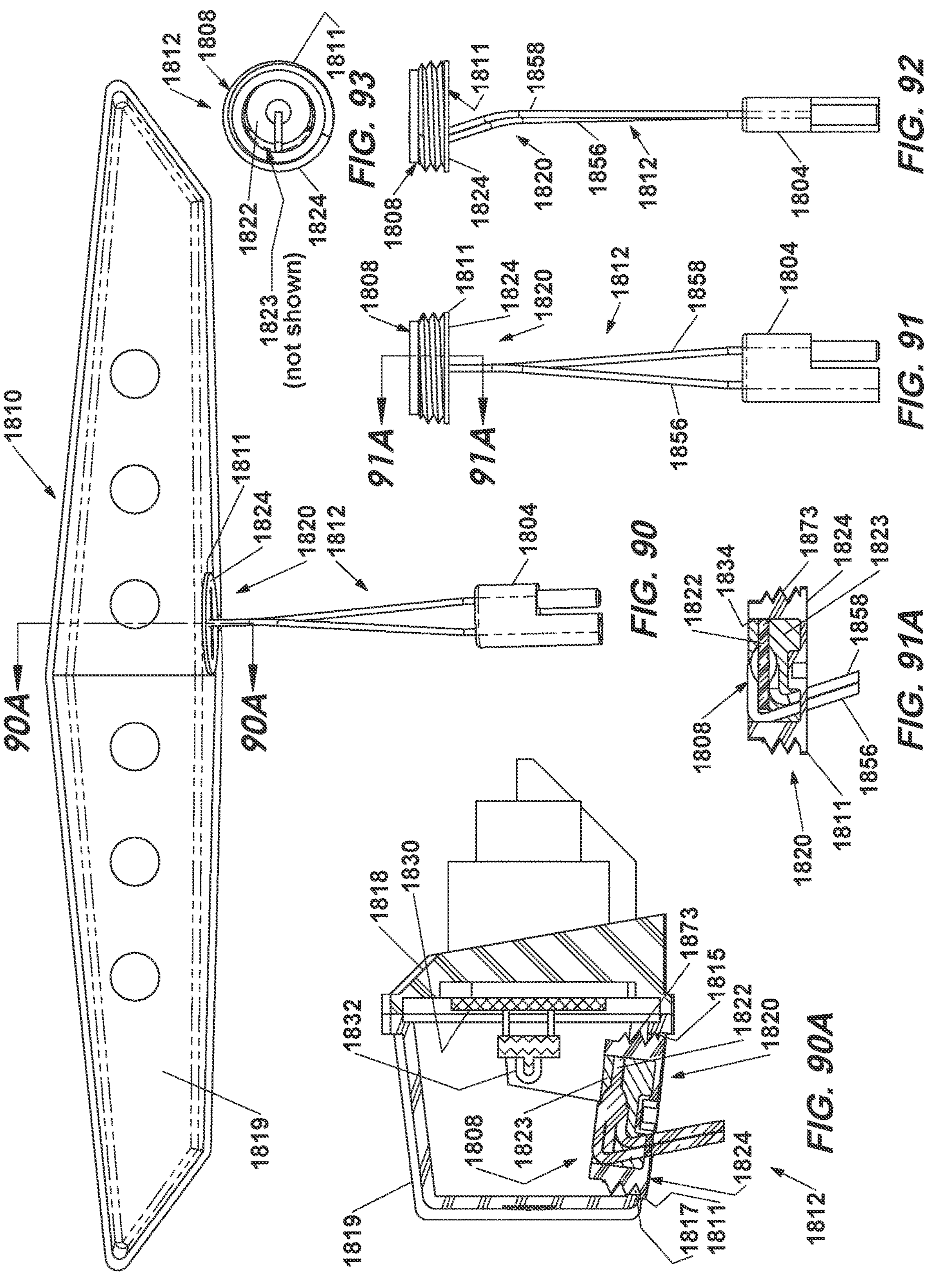
FIG. 90 is a vertical front elevational view of the tail light assembly of FIGS. 88 and 89.
FIG. 90A is a cross-sectional view of the tail light assembly of FIG. 90 taken along line 90A-90A.
FIG. 91 is a front elevational view of the threaded-plug heat source assembly shown in FIGS. 90 and 90A.
FIG. 91A is a cross-sectional view of the threaded-plug heat source assembly of FIG. 91 including an electric PTC heater and conductor wires taken across line 91A-91A in FIG. 91.
FIG. 92 is a side elevational view of the threaded-plug heat source assembly of FIG. 91.
FIG. 93 is a top end view of the threaded-plug heat source assembly of FIG. 92.

As shown in FIGS. 88, 89 and 90A, tail light assembly 1810 includes a three-dimensional lens 1819 that is affixed to a rear light housing member 1818 to form a housing for encasing a printed circuit board 1830 having an array of light emitting diodes (LEDs) 1832 (see FIG. 89). In one case, lens 1819 affixes to housing member 1818 with an ultrasonic plastic weld. In another case, lens 1819 affixes to housing member 1818 with a plurality of threaded fasteners. In yet another case, lens 1819 connects with snap fittings to housing member 1818. For the case where lens 1819 is affixed to housing member 1832 with an ultrasonic weld, threaded plug body 1824 of heat source 1812 provides an aftermarket modification for heating a tail light assembly because an end user can cut, bore, machine, or drill a hole 1815 of appropriate diameter and tap a bore 1815 having female threads 1817 into lens 1819 and affixed a threaded plug-shaped heater 1809 as an aftermarket or retrofit modification without, for example, having to break the ultrasonic weld or disturb the sealed fastening mechanism or feature between lens 1819 and the rear light housing member 1818.

FIG. 90 is a vertical front elevational view of the tail light assembly of FIGS. 88 and 89 showing threaded placement of plug body 1824 in a bottom face of lens 1819 on tail light 1810. Heat dissipating body 1820 of heat source 1812 is inserted from the outside of lens 1819 with plug connector 1851 provided outside of tail light 1810 for connection to an external, complementary connector and vehicle power source (not shown).

FIG. 90A is a cross-sectional view of the tail light assembly of FIG. 90 taken along line 90A-90A depicting the assembled-together configuration of tail light 1810 with lens 1819 ultrasonically welded along an outer periphery to housing member 1818. An array of LEDs, such as LED 1832, emit light through lens 1819. Heat dissipating body 1820 of heat source 1812 is threaded via cylindrical male threaded portion 1873 into female threaded portion 1817 of bore 1815 in lens 1819. In this case, the radially outward extending circumferential flange 1811 of plug-shaped heat source body 1824 may simply contact the flat bottom surface of lens 1819, thus providing a seal by simple mechanical contact. Optionally, contact adhesive, thermally conducive grease or thermally conductive adhesive may be used (not shown) to further ensure sealing out water and any foreign material. Plug-shaped heater 1809 transfers heat via conduction into lens 1819 via heat generated and transferred from PTC heater 1822 though thermally conductive adhesive, or epoxy 1823 provided in plug body 1824 for further heating within lens 1819 by a combination of conduction and convection. In some cases, epoxy 1823 is a filled epoxy with a ceramic powder filler that provides elevated emissivity for adhesive 1823 which enhances radiative heat transfer from a distal end of plug body 1824. In other cases, thermally conductive fillers, such as aluminum powder, are added to increase conductivity. Even further, a combination of fillers that enhance conduction and convection, or one or the other, are added to an adhesive material, such as an epoxy or thermoset plastic or other suitable structural carrier material.

Optionally, it may be preferred to include and attach, when space allows, a small cylindrically-shaped finned heat sink (not shown) to the end portion of plug body 1824 attached to and in thermal communication with adhesive 1823. One exemplary heat sink is commercially available through and can be purchased from Digikey Electronics, 701

Brooks Ave South, Thief River Falls, MN 56701 USA. This exemplary heat sink is manufactured by Aavid, a Thermal Division of Boyd Corporation under extruded collar model 3250, part number 325705B00000G, having an overall diameter of 12.70 mm (0.50 inches) and a height of 6.35 mm (0.25 inches) and an inside diameter of 8.07 mm (0.31 inches). This heat sink comprises black anodized aluminum and includes 15 radially outwardly extending fins each vertically aligned and oriented with the center cylindrical axis of the heat sink. In this way additional or more efficient heat transfer from the PTC heater 1822 to the interior portions of lens 1819 can be accomplished through the thermally conductive adhesive potting 1823 of plug-shaped heater 1808.

FIGS. 88, 89, 90, and 90A show one exemplary snowmobile tail light assembly part number BRP 520001143 available from Bombardier Recreational Products (BRP), Inc. The housing is marked as ABS plastic while the lens is marked PMMA plastic, "Made in Mexico", 13.5V, TAIL 139 mW, STOP 2.6 W, Visteon VP-00146604. It is quite apparent from these product markings that the relatively low total wattage or power rating of the six LED's at only 139 milliwatts would be largely insufficient to readily melt any accumulation of snow and ice from the outer surface of a snowmobile tail light lens during freezing temperatures in snowy conditions. Likewise, the stop light total wattage or power rating is in fact higher than the tail lights, however the stop light is used only during braking of the vehicle on an intermittent basis, so the heat contribution is infrequent and insufficient to melt snow and ice. Therefore, it remains highly likely that an insufficient amount of heat can be generated to maintain the outer light transmissible portion of the lens 1821 free and clear of all accumulations of snow and ice. In this case, there exists a likelihood that snow and ice will continue to accumulate and obstruct the visibility of tail and brake light warning information to others, creating a vehicle, traffic and operator safety hazard unless an additional heat source 1812 is provided within the LED tail light housing of tail light 1810.

FIG. 91 is a front elevational view of the threaded-plug heat source 1812 shown in FIGS. 90 and 690A. More particularly, heat source 1812 of FIGS. 91 and 92 comprises a plug-shaped heater 1809 that provides a heat dissipating body 1820 with a threaded plug body 1824. An electrical connector plug 1804 enables removable electrical connection of a PTC heater 1822 (see FIG. 91A) via insulated conductive wire leads 1856 and 1858 with a complementary plug (not shown) provided to a vehicle wiring harness and electrical power supply (not shown).

As shown in cross-sectional view in FIG. 91A, heat dissipating body 1820 is configured to transfer heat via conduction through threaded portion 1873 to a vehicle lens 1819 (see FIG. 90A) and a combination of radiation, conduction and convection via an outer end portion of plug shaped heater 1808 from a thermal heat transfer material 1823, such as a cured epoxy adhesive material or cement that encases and otherwise encapsulates PTC heater 1822 within cylindrical bore, or recess 1834 of plug body 1824. In one case plug body 1824 is constructed from a heat resistant plastic material. In another case, plug body 1824 is constructed from a ceramic material having a high emissivity capable of significant radiative heat transfer, in addition to thermal conduction into a vehicle heated lens.

FIG. 93 is a top end view of the threaded-plug heat source 1812 of plug-shaped heater 1809 with heat transfer material, or epoxy 1823 removed from the top end portion to show PTC heater 1822.

The threaded plug heater assembly 1812 in FIGS. 91, 91A, 92 and 93 is nearly identical to the threaded plug heater assembly 1712 in previous FIGS. 85, 86, 86A, 86B and 87 with the exception that the insulated conductive wire leads 1856 and 1858 and electrical connector plug 1851 exit the threaded plug body 1824 in an opposite direction.

Figure 94:
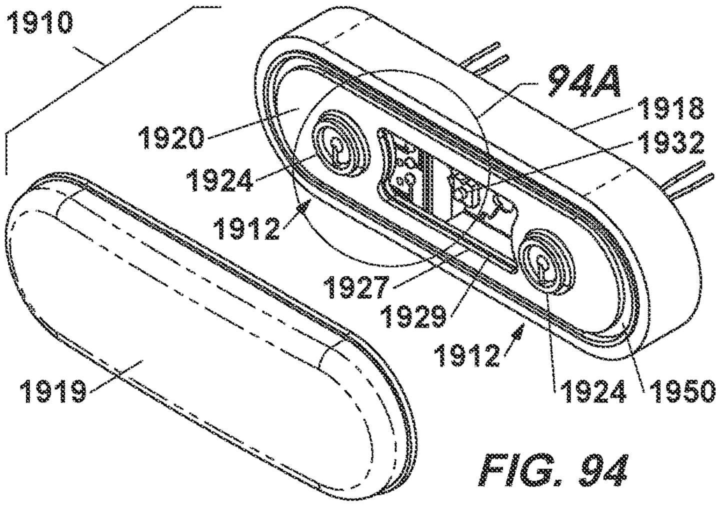
FIG. 94 is a perspective view of an exemplary LED heated vehicle tail light assembly.
Figure 96:
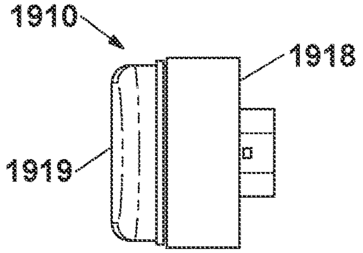
FIG. 96 is a right-side view of the vehicle tail light assembly of FIG. 95.

FIG. 94 is a perspective view of another exemplary LED heated vehicle tail light assembly, or tail light 1910. More particularly, a tail light lens 1919 is shown in exploded view removed from an oval or oblong housing body 1918. In assembly, lens 1919 of tail light 1910 is affixed to housing member 1918 with ultrasonic welding, fasteners, or adhesive, as shown in FIG. 96. A heat sources 1912 includes a pair of plug bodies 1924 provided in spaced apart relation about a central light source aperture 1927 and 1929 provided in a heat dissipating body, or thermal heat transfer plate 1920 and a thermal insulating body, or insulating plate 1950. A light emitting diode (LED) light source 1932 is supported in housing 1918 on an LED board 1931 separate from a PC board 1930 and configured to emit a source of light through apertures 1927 and 1929 for transfer through a light transmissive portion of lens 1919. Plug bodies 1924 transfer heat to heat dissipating body 1920 for delivery to lens 1919, as well as directly to lens 1919 to remove light-occluding precipitation from lens 1919 in the form of ice, frost, condensate or water, as shown in FIG. 94A.

Figure 94A:
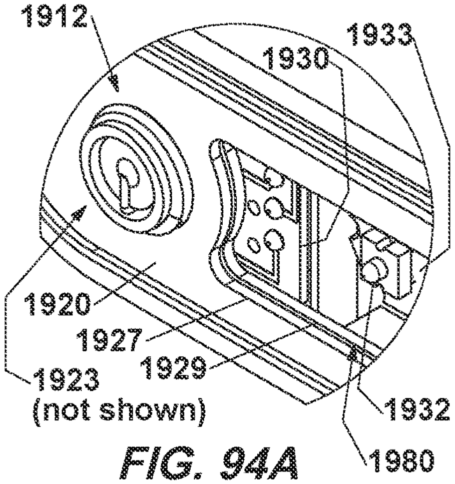
FIG. 94A is an enlarged partial perspective view of the vehicle tail light assembly taken from encircled region 94A of FIG. 94.
Figure 95:
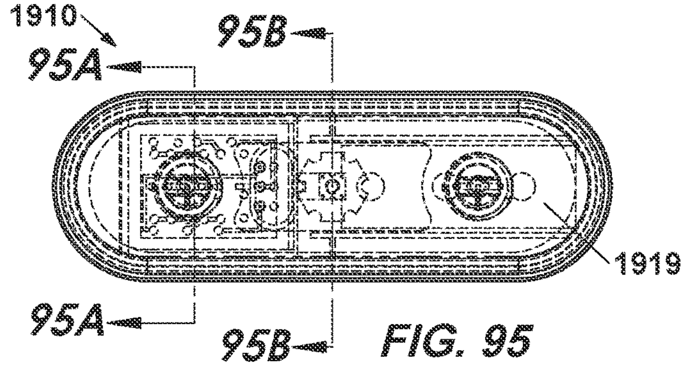
FIG. 95 is a front view of the vehicle tail light assembly of FIG. 94.

Heat transfer can occur as one or more of conduction, convection and/or radiation through lens 1919 of tail light 1910, as shown in FIG. 95. In one form, plate 1920 of FIGS. 94 and 94A is a thermally conductive aluminum plate. In another form, plate 1920 is a thermally conductive aluminum plate having a first or outer surface having a high emissivity coating, such as a ceramic coating, or an anodized aluminum coating that faces and is placed in thermally radiant communication with the lens, and the second, or inner (or back) side has a lower emissivity surface, such as a polished aluminum surface. In even another form, plate 1910 is a ceramic plate that is heated by plug bodies 1924 and distributes the accumulated heat over time to a greater extent as radiant heat transfer, but with conduction and convection to a lesser extent that from an aluminum plate.

As shown in FIGS. 94A and 94A, a slight gap 1980 is provided between heat dissipating plate, or body 1920 and insulating plate 1950. More particularly, a circumferential shoulder 1911 is provided on plug body 1924 enlarged relative to cylindrical threaded portion 1973 and sized slightly larger than heat source clearance bore, or hole 1915 in plate 1920. Clearance bore 1915 is sized to receive threaded portion 1973 in assembly. Plug body 1924 is adhesively affixed via an epoxy or other suitable adhesive material to an outer surface of insulating plate 1950. Heat source 1912 is configured in spaced apart relation from an inner surface of lens 1919 with a plug of cured heat transfer material 1923, or epoxy, that encases PTC heater 1922 in thermally conductive relation therein to transfer heat to inner surface of lens 1919 via one or more of conduction, convection and/or radiation. PTC heater draws power from printed circuit (PC) board 1930 (of FIG. 10A) along with LED 1932, while LED 1932 is supported separately by LED board 1931. Insulating board, or insulation plate 1950 can be formed of any suitable insulating material for resisting one or more of conduction, convection, and/or radiation. For example, an adhesive backed foam can be used to form insulation plate 1950. Optionally, a fiberglass insulating plate that insulates against conductive/convective heat transfer can be used having a reflective top aluminum foil surface that also insulates against radiant heat transfer.

Further optionally, an abrasion-resistant high-temperature silicone foam may be utilized. One exemplary foam insulation sheet is available from McMaster-Carr, 600 N County Line Rd., Elmhurst. IL 60126-2034 under catalog part number 9158T22. This exemplary foam is ⅛ inch (3.17 mm) in thickness, has a nominal operating temperature range of −65 to 390 degrees F. (−18 to 199 degrees C.), a density of 13 lbs/cubic foot (208 kg/cubic meter), and R-value of 0.3. It is further foreseeable that a wide range of other flexible, semi-flexible, semi-rigid, and rigid insulating foams and materials are available for use from this source and other distributors and manufacturers which are comprised of various different materials, each having their own specific design specifications and criteria as may be needed for specific or special thermal insulating applications.

Figure 95A:
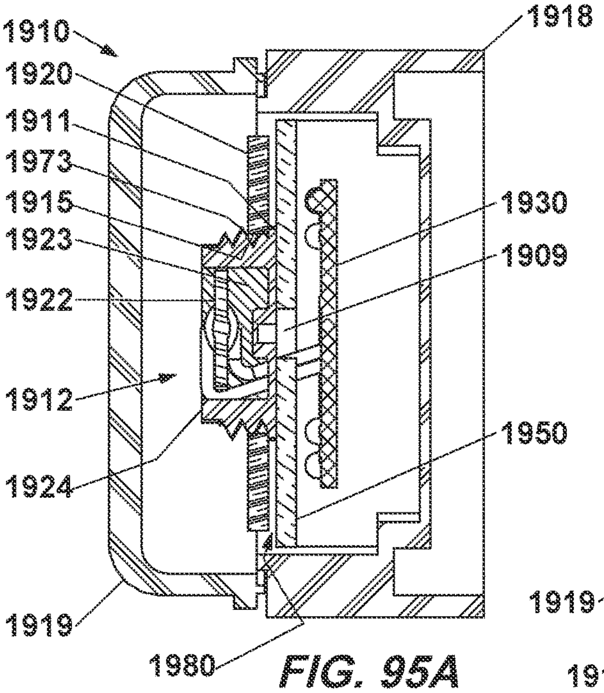
FIG. 95A is a cross sectional view of the tail light assembly taken along line 95A-95A of FIG. 95.
Figure 95B:
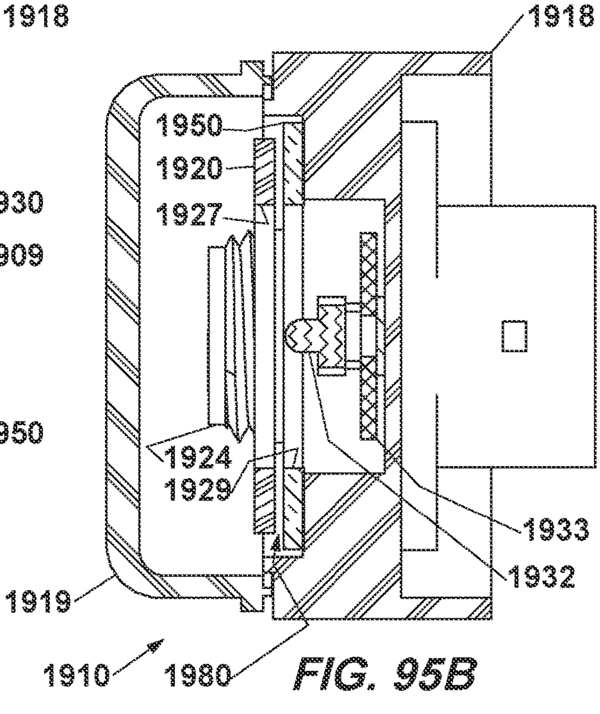
FIG. 95B is a cross sectional view of the tail light assembly taken along line 95B-95B of FIG. 95.

FIG. 95B depicts the orientation of LED light source 1932 on PC board 1930 centrally within and housing 1918 on an LED board 1931 for transmission of light through apertures 1927 and 1929 and a light transmissible portion of lens 1919 on tail light 1910. Heat dissipating body 1920 transfers heat via conduction from heat sources, or plug bodies 1924 to lens 1919 via radiation, conduction, and/or convection. Insulating plate 1950 serves to protect LED light 1932 and PC board 1930 from exposure from excessive heat from heat dissipating body 1920 that might otherwise reduce life expectancy.

Figures 97, 98, 99, 99A:
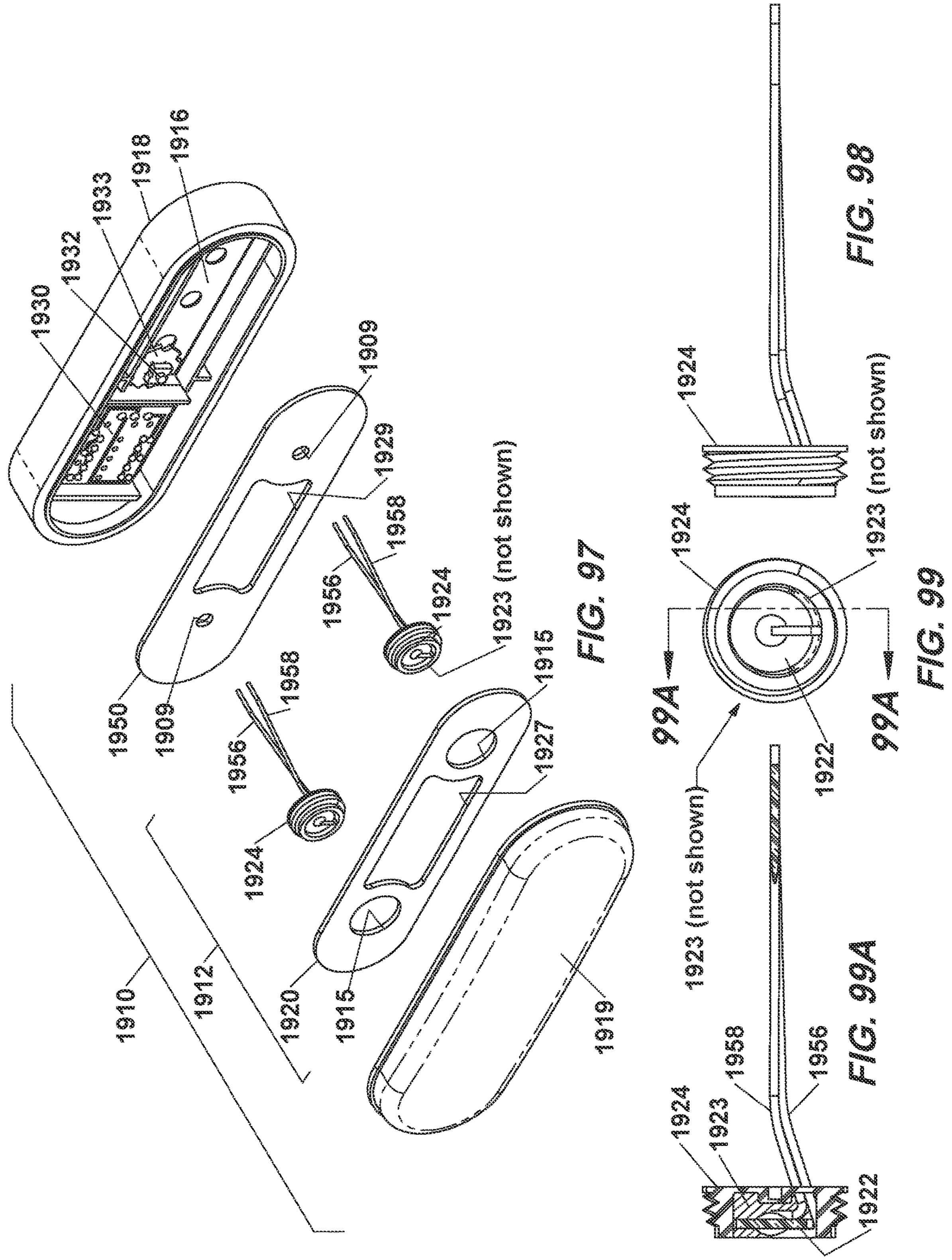
FIG. 97 is an exploded perspective view of the vehicle tail light assembly of FIG. 94.
FIG. 98 is a right-side view of one of two threaded plug heat source assemblies of FIG. 97 each including an electric PTC heater and conductor wires.
FIG. 99 is a front-end view of the threaded plug heat source assembly of FIG. 98.
FIG. 99A is a cross-sectional view of the threaded plug heat source assembly of FIG. 99 taken through line 99A-99A.

FIG. 97 is an exploded perspective view of the vehicle tail light assembly of FIGS. 94-96 further illustrating construction and assembly details of tail light 1910. More particularly, plug bodies 1924, insulated conductive wire leads 1956 and 1958, and heat dissipating body 1920 cooperate to provide a heat source 1912 affixed within a housing formed between housing member 1918 and lens 1919. Thermal insulating plate 1950 includes a pair of cylindrical apertures, or bores 1909 configured to enable through passage of pairs of wire leads 1956 and 1958. Each plug body 1924 is concentrically inserted into a complementary bore 1915 provided on either side of a light aperture 1927 in plate 1920. Optionally, the bore 1915 may be smooth (as shown), or threads may be produced by self-tapping by a specially-designed and configured threaded plug 1924, or threads (not shown) may be otherwise optionally provided in bore 1915 by a separate machining or tapping process or operation. A corresponding light aperture 1929 is provided between bores 1909 in insulating plate 1950. Printed circuit board 1930 is mounted in housing member 1918 with fasteners (not shown) or adhesive. LED light 1932 is mounted centrally of housing member 1918 within a central region of apertures 1927 and 1929. LED light source 1932 is mounted to and in thermal communication with LED printed circuit (PC) board 1933 and metal LED heat sink 1916 for the purpose of dissipating any excess heat produced by LED light source 1932. It may be noted that heat sink 1916 is a component of the original design for dissipating excess heat from LED 1932 to improve reliability.

Additionally, with reference to FIGS. 94-97 circuit board 1930, LED circuit board 1933, LED heat sink 1916, and the inside base portion of housing 1918, a layer of clear potting, coating or otherwise clear weatherproofing circuit board coating material is provided to generally encases and seals these components from the effects of possible environmental contaminants and water (not shown). One exemplary potting and encapsulating compound is a general purpose, water-clear, hard, two-part epoxy product number 832WC commercially available from MG Chemicals, Burlington, Ontario, Canada.

FIGS. 98, 99, and 99A illustrate in greater detail plug body 1924 and wire leads 1956 and 1958 of heat source 1912 (of FIG. 97). FIGS. 99 and 99A show placement of cylindrical disk-shaped PTC heater 1922 within a cylindrical bore of plug body 1924 within heat transfer epoxy, or material 1923. FIG. 99 omits epoxy material 1923 to facilitate viewing of PTC heater 1922 approximately centrally oriented within plug body 1924.

As shown in FIGS. 97-99A, threaded plug heater assembly 1912 is very much like the threaded plug heater assembly 1812 shown in previous FIGS. 90, 91-91A-92 and 93. In this case, the two-pole electrical connector 1804 (From FIGS. 90, 91-91A, 92 and 93) is absent. Instead, electrical wire leads 1956 and 1958 are connected directly to positive and negative power connections at the circuit board 1930 (of FIG. 97) or a suitable alternate power connection is provided within the assembled light housing member 1918.

One exemplary LED vehicle tail light shown in FIGS. 94, 94A, 95, 95A, 95B, 96 and 97 is available for purchase from Truck-Lite Company, LLC, 310 East Elmwood Avenue, Falconer, NY 14733, USA. It is understood that such light is then modified to add the heat source. Such tail light (without the heat source) is generally described as a Model Super 66, red oval, 1 diode, stop, turn, or tail light sold under four catalog part numbers; 66050R, 66250R, 66085R, and 66885R depending upon the choice of polycarbonate or acrylic plastic lens material in combination with additional product specifications and characteristics. Each of these exemplary LED vehicle tail lights includes a red translucent plastic lens in accordance with DOT SAE standards S2, I6, P2 and T and further include a single LED lighting element rated for 12 volts DC with a minimum amperage of 0.03 amps and a maximum amperage of 0.47 amp. The nominal size of these light assemblies are 2 inches by 6 inches (50 mm×152 mm) with the actual overall size being 6.5 inches (165 mm) long by 2¼ inches (57 mm) wide by 1⅝ inches (41 mm) in height including the 3-conductor female electrical plug connection at the back of the light housing. Based upon the electrical input specifications provided, the Truck-Lite Model 66 LED tail light exhibits a minimum power rating of 0.36 watts (where I×V=P) and a maximum power rating of 5.64 watts. It worth noting that the maximum power rating of 5.65 watts may typically occurs only during intermittent instances where the brighter and therefore higher-power brake lights are activated during the slowing of a vehicle or when a vehicle is temporarily stopped on a roadway with the brake pedal depressed. Given this range of power dissipation and the intermittent duty cycle of the LED tail and brake light, it is highly unlikely and generally proven that sufficient heat is generated within the enclosed and sealed LED light assembly during its normal operation to effectively melt a significant accumulation of snow or ice from the outside surface of the lens. This is especially important and likely in conditions of ambient air temperatures at or below freezing during winter driving conditions with ambient air temperatures falling to extreme sub-zero levels in far-northern climates. The likelihood for continued snow and ice obstruction of the tail and brake light lens is very likely to create a vehicle, traffic and operator safety hazard unless an additional heat source is provided within the LED light housing to solve this problem.

Figure 100:
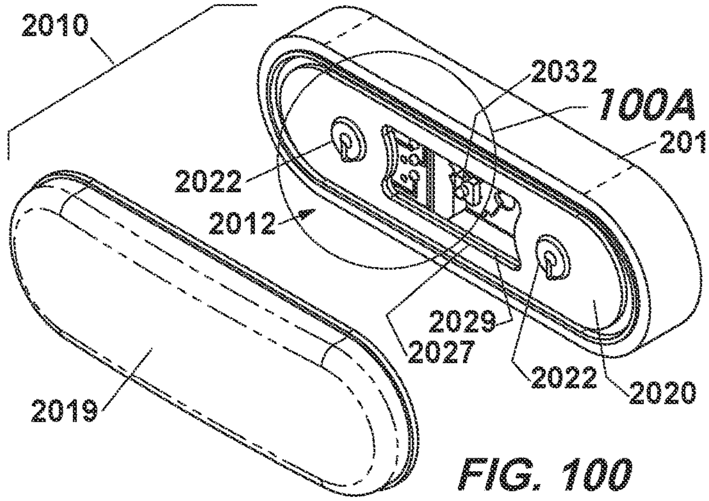
FIG. 100 is perspective view of yet another exemplary heated vehicle LED tail light assembly.
Figure 100A:
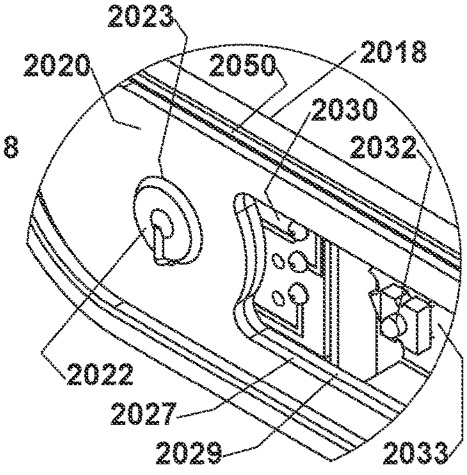
FIG. 100A is an enlarged partial perspective view of the heated vehicle tail light assembly of FIG. 100 taken from encircled region 100A.
Figure 102:
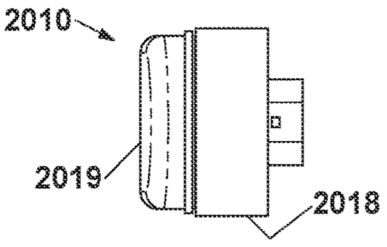

FIG. 100 is a perspective view of yet another exemplary LED heated vehicle tail light assembly (as shown in previous FIGS. 94 through 97 available for purchase as Model Super 66 from Truck-Lite Company, LLC, 310 East Elmwood Avenue, Falconer, NY 14733, USA), or tail light 2010. More particularly, a tail light lens 2019 is shown in exploded view removed from an oblong housing body 2018. In assembly, lens 2019 of tail light 2010 is affixed to housing member 2018 with ultrasonic welding, fasteners, or adhesive, as shown in FIG. 102. A heat sources 2012 includes a pair of PTC heaters 2022 provided in spaced apart relation about a central light source aperture 2027 and 2029 provided in a heat dissipating body, or thermal heat transfer plate 2020 and a thermal insulating body, or insulating plate 2050. A light emitting diode (LED) light source 2032 is supported in housing 2018 on an LED board 2033 that is separate from a PC board 2030 and is configured to emit a source of light through apertures 2027 and 2029 for transfer through a light transmissive portion of lens 2019. PTC heaters 2024 transfer heat to heat dissipating body 2020 for delivery to lens 2019, as well as directly to lens 2019 to remove light-occluding precipitation from lens 2019 in the form of ice, frost, condensate or water, as shown in FIG. 100A. A circumferential bead of thermally conductive adhesive, or epoxy 2023 affixed each PTC heater 2022 onto plate 2020, as shown in FIG. 100A. Optionally, a layer of thermally conductive grease or paste (not shown) can be provided between a cylindrical inner face of PTC heater 2022 and plate 2020 within bead 2023

Figure 101:
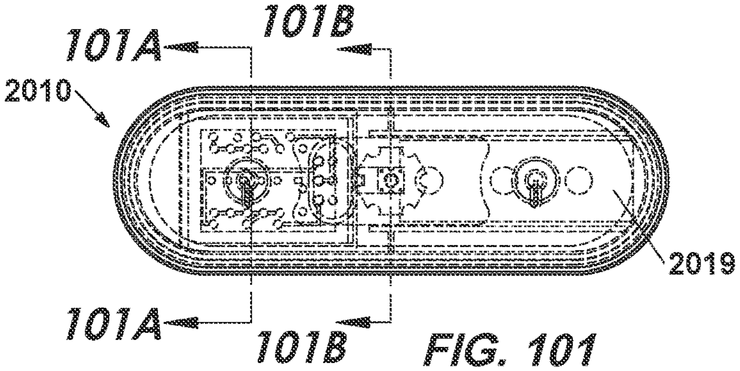
FIG. 101 is a front elevational view of the heated vehicle tail light assembly of FIG. 100.
Figure 101A:
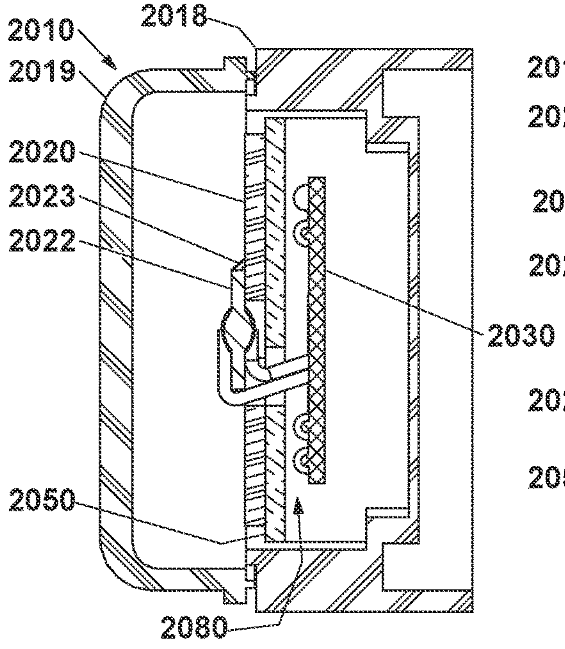
Figure 101B:
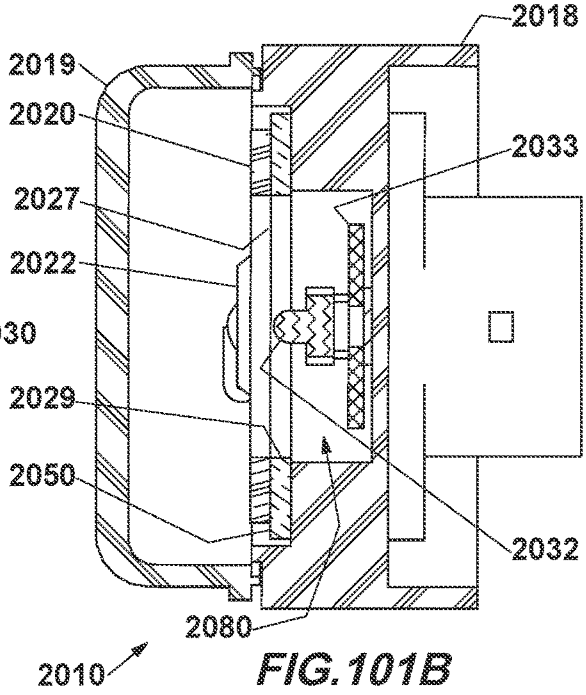

Heat transfer can occur as one or more of conduction, convection and/or radiation through lens 2019 of tail light 2010, as shown in FIGS. 101A and 101B. In one form, plate 2020 of FIGS. 100, 100A, 101A and 101B is a thermally conductive aluminum plate. In another form, plate 2020 is a thermally conductive aluminum plate having a first or outer surface having a high emissivity coating, such as a ceramic coating, or an anodized aluminum coating and the back side has a lower emissivity surface, such as a polished aluminum surface. In even another form, plate 2020 is a ceramic plate that is heated directly by PTC heaters 2022 and distributes the accumulated heat over time to a greater extent as radiant heat transfer, but with conduction and convection to a lesser extent that from an aluminum plate.

As illustrated in FIGS. 100A, 101A and 101B heat dissipating body, or plate 2020 is nested in direct contact with insulating plate 2050. More particularly, a thin layer of adhesive (not shown) is provided between plate 2020 and plate 2050. Each PTC heater 2022 is adhesively affixed via an outer circumferential ring 2023 of epoxy or other suitable adhesive material to an outer surface of plate 2020. In one case, a thermally conductive grease (or paste as previously described) is provided within ring 2023 and between a back surface of PTC heater 2022 and a front surface of plate 2020. Heat source 2012 is configured in spaced apart relation from an inner surface of lens 2019 with a circumferential ring 2023 of cured heat transfer material, or epoxy, that engages PTC heater 2022 in thermally conductive relation (via either physical contact or through thermally conductive grease or paste) to transfer heat to inner surface of lens 2019 via one or more of conduction, convection and/or radiation. PTC heater draws power from printed circuit (PC) board 2030. Insulating board, or plate 2050 can be formed of any suitable insulating material for resisting one or more of conduction, convection, and/or radiation. For example, an adhesive backed foam can be used to form insulated plate 2050 as previously described in FIGS. 94-97. Optionally, a fiberglass insulating plate that insulates against conductive/convective heat transfer can be used having a reflective top aluminum foil surface that also insulates against radiant heat transfer and provides reduced emissivity across insulating air gap 2080 as previously described in FIGS. 94-97.

FIG. 101B depicts the orientation of LED light source 2032 on PC board 2033 centrally within housing 2018 on an LED board 2033 for transmission of light through apertures 2027 and 2029 and a light transmissible portion of lens 2019 on tail light 2010. Heat dissipating body 2020 transfers heat via conduction from heat sources, or PTC heaters 2022 to lens 2019 via radiation, conduction, and/or convection. Insulating plate 2050 and air gap 2080 serves to protect LED light 2032 and PC board 2030 from exposure from excessive heat that might otherwise reduce life expectancy of LED light source 2032.

Figure 103:
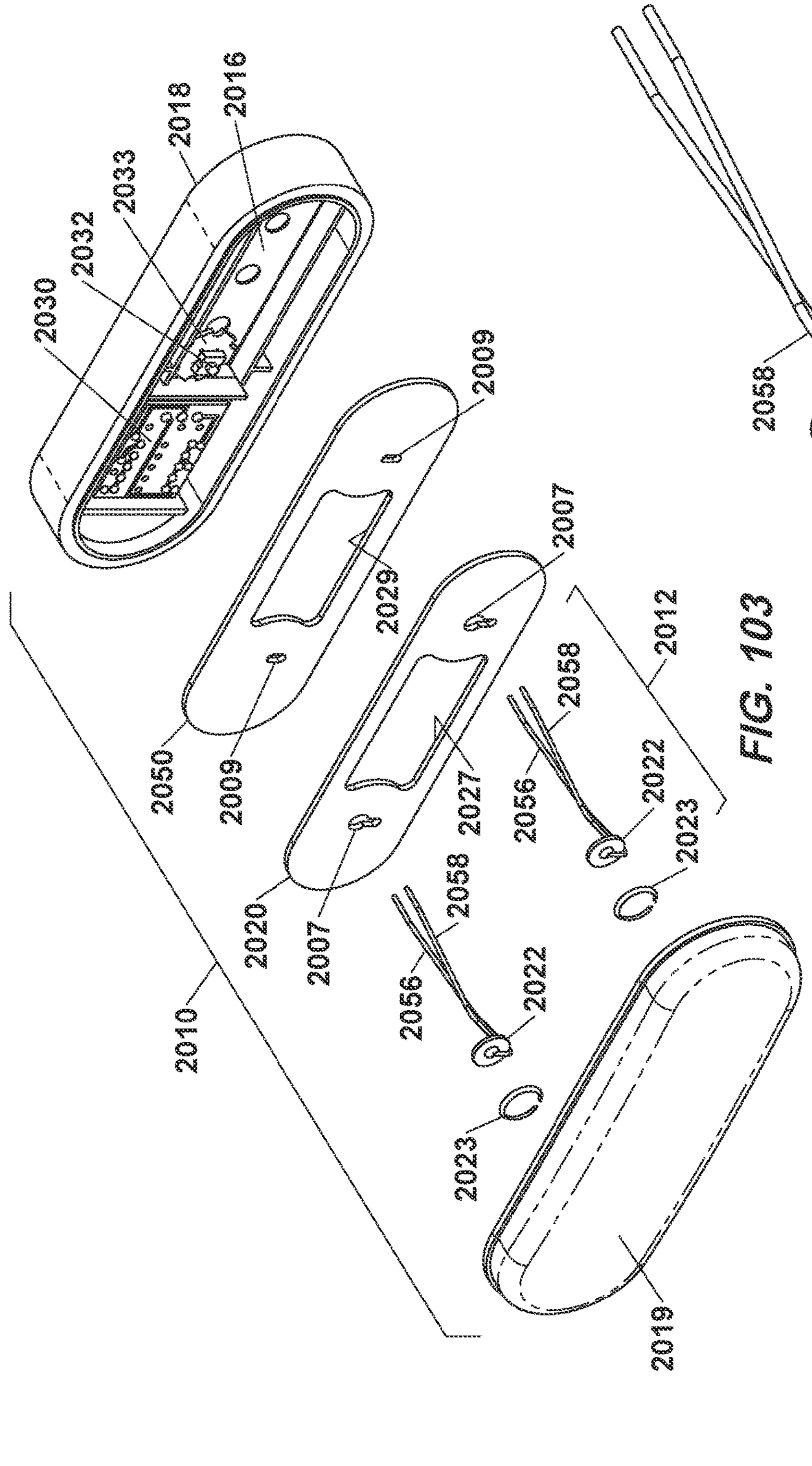

FIG. 103 is an exploded perspective view of the vehicle tail light assembly of FIGS. 100-102 further illustrating construction and assembly details of tail light 2010. More particularly, PTC heaters 2022, insulated conductive wire leads 2056 and 2058, and heat dissipating body 2020 cooperate to provide a heat source 2012 affixed within a housing formed between housing member 2018 and lens 2019. Thermal insulating plate 2050 includes a pair of cylindrical apertures, or bores 2009 configured to enable through passage of pairs of wire leads 2056 and 2058. Each PTC heater 2022 is affixed with a circumferential ring 2023 of conductive adhesive on either side of a light aperture 2027 in plate 2020. In one case, thermally conductive grease or paste is provided within ring 2023, between a back surface of PTC heater 2022 and a front surface of plate 2020. A pair of keyhole shaped bores 2007 are provided in plate 2020 to enable passage of insulated conductive wire leads 2056 and 2058. A corresponding light aperture 2029 is provided between bores 2009 in insulating plate 2050. Printed circuit board 2030 is mounted in housing member 2018 with fasteners (not shown) or adhesive. LED light 2032 is mounted centrally of housing member 2018 within a central region of apertures 2027 and 2029 on an LED PC board 2033. LED light source 2032 is mounted to an in thermal communication with LED PC board 2033 and LED heat sink 2016 for dissipating any excess heat produced by LED light source 2032. Again, it may be noted that heat sink 2016 is a component of the original design for dissipating excess heat from LED 2032 to improve reliability.

Additionally, with reference to FIGS. 94-97 circuit board 1930, LED circuit board 1933, LED heat sink 1916, and the inside base portion of housing 1918, a layer of clear potting, coating or otherwise clear weatherproofing circuit board coating material is provided to generally encases and seals these components from the effects of possible environmental contaminants and water (not shown). One exemplary potting and encapsulating compound is a general purpose, water-clear, hard, two-part epoxy product number 832WC commercially available from MG Chemicals, Burlington, Ontario, Canada.

Figure 104:
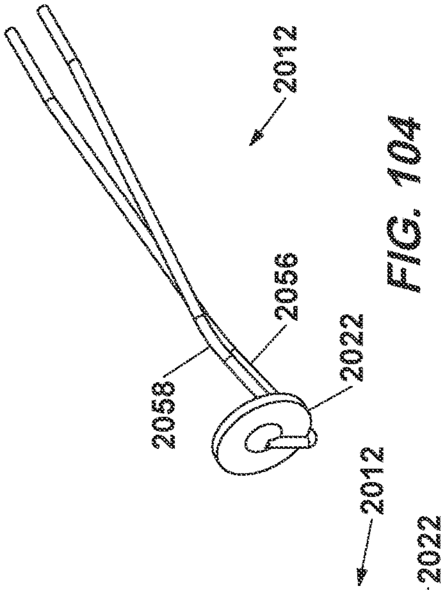
Figure 105:
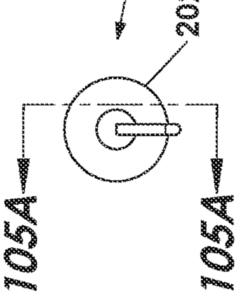
Figure 105A:
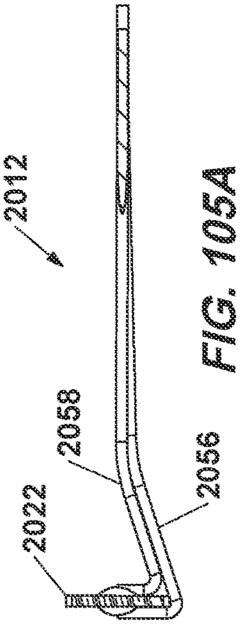

FIGS. 104, 105, and 105A illustrate in greater detail heat source 2012 and wire leads 2056 and 2058 of heat source 2012 (of FIG. 103).

As shown in FIGS. 103-105A, heat source 2012 is somewhat like the threaded plug heater assembly 1812 shown in previous FIGS. 91-91A-92 and 93. In this case, the two-pole electrical connector 1804 (From FIGS. 91-93) is absent from wire leads 2056 and 2058 leading from PTC heater 2022. Instead, electrical wire leads 2056 and 2058 are connected directly to positive and negative power connections at the circuit board 2030 (of FIG. 103) or a suitable alternate power connection is provided within the assembled light housing member 2018. Also absent is the plug-shaped heat source body 1824 and 1924 of FIGS. 90 through 99A.

Tail light 2010 of FIGS. 100-103 is constructed using the same Truck-Lite tail light as the Model Super 66 shown and describes with reference to previous FIGS. 94-97.

Figure 106:
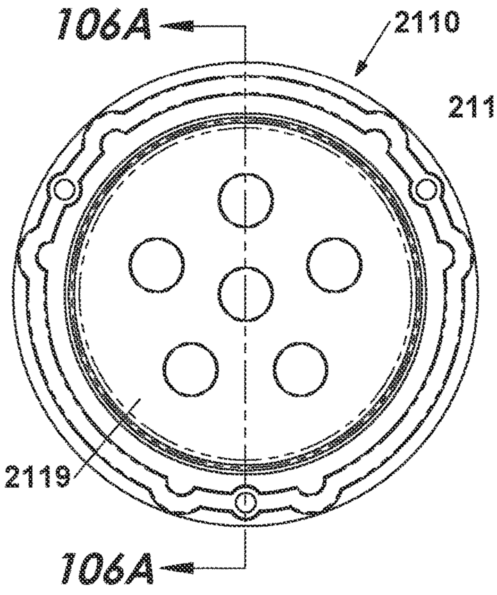
Figure 107:
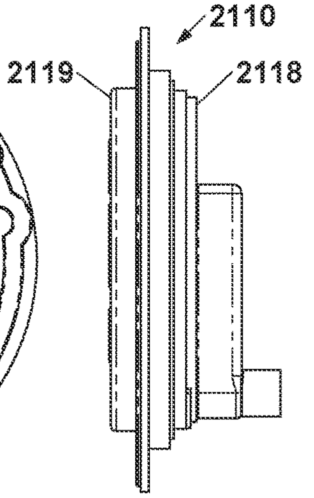

FIG. 106 is front view of even another exemplary heated vehicle LED shown as a round tail light 2110 having a light transmissible lens 2119. As shown in FIG. 107, tail light 2110 includes a housing formed by joining together lens 2119 with housing member 2118 about an entire outer periphery using either fasteners (not shown), ultrasonic welding, or adhesive. FIG. 106A illustrates in vertical centerline cross section internal components of tail light 2110. Housing member 2118 cooperates in assembly with light transmissible lens 2119 to form a housing that contains an array of LED light sources 2132 and a heat source 2112 configured to transfer heat to remove/prevent moisture-based condensate from otherwise accumulating on inner or outer surfaces of lens 2119 and occluding the lens. It is understood that such construction can also include vents and moisture permeable membranes for the housing (penetrating the housing envelope not shown) that help evacuate moisture from within the housing. It also helps equalize air or gas pressure between the interior portion of the light housing and atmospheric pressure outside the light housing as pressures will vary due to changes in weather barometric pressure, temperature, ground elevation or altitude when combined with a heat source, such as the present heat sources detailed within this disclosure. Heat source 2112 includes a disc-shaped PTC heater 2122 affixed with thermally conductive adhesive, or epoxy to an outer surface of a heat dissipating body, or plate 2120. In one case, plate 2120 is a thermally conductive aluminum plate. In another case, plate 2120 is a ceramic plate. In yet another case, plate 2120 is a thermally conductive aluminum plate 2120 having a ceramic coating on an outer, or first surface and a lower emissivity inner, or second surface such as a polished aluminum surface. A ceramic coating has a higher emissivity than a polished aluminum surface, therefore the ceramic coating increases radiative heat transfer. Radiative heat transfer does not heat up air molecules within the light housing, and excess heat buildup can have a negative effect on LED performance and reliability over time. An insulating layer, or panel 2150 is affixed via adhesive to a back surface of plate 2120, and both are adhesively affixed onto a weatherproof clear coating 2160 atop a PC board 2130 as previously described with FIGS. 94 through 103. One suitable insulating layer is an adhesive backed foam material such as an adhesive backed polyethylene foam as previously described.

Figure 106B:
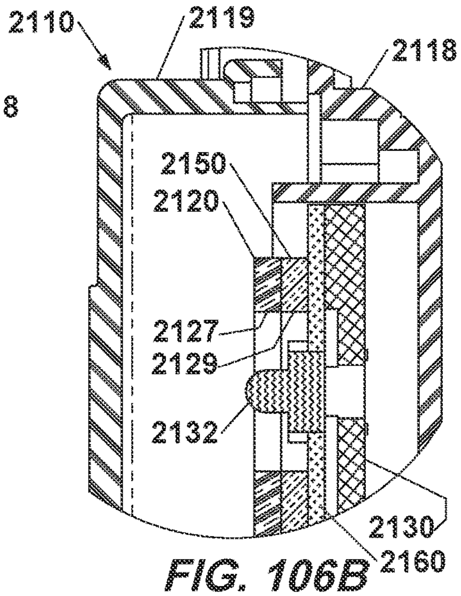
Figure 106A:
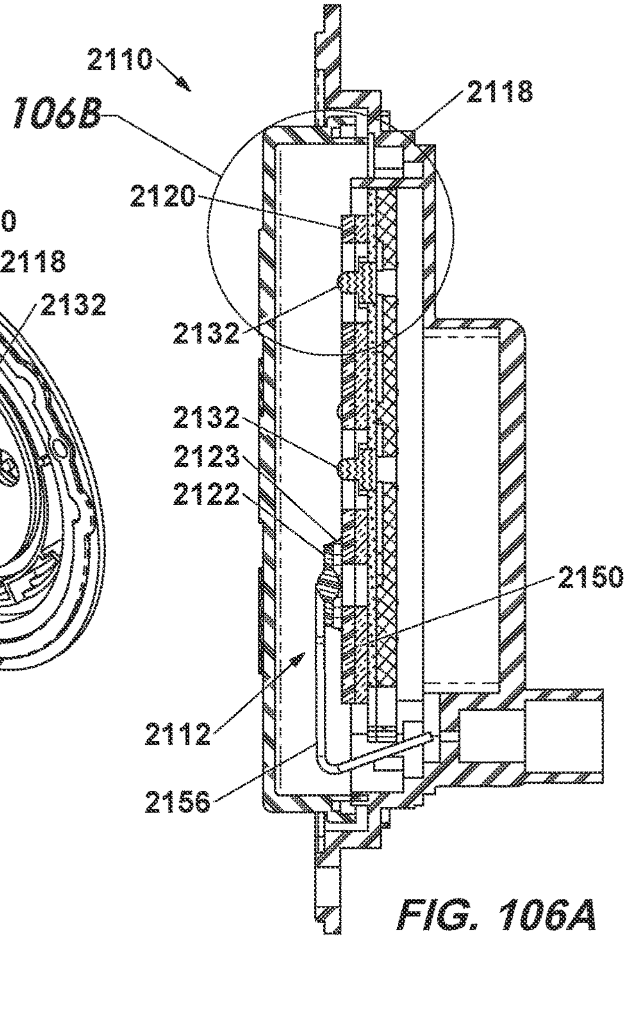

FIG. 106B shows the spacing and orientation between heat dissipating body 2120 relative to lens 2110 and one selected LED light source 2132. Lens 2110 is shown affixed to housing member 2118. Heat dissipating body 2120 and insulating layer 2150 each have a respective light clearance aperture 2127 and 2129 that mitigates heat transfer to LED light source 2132 and PC board 2130, while also allowing for light transmission from LED light source 2132 through light transmissible lens 2119. Insulating layer, or foam piece 2150 has an adhesive layer on opposed surfaces to enable affixation onto both weatherproof coating 2160 and plate 2120. Optionally, insulating layer, or foam piece 2150 may be selectively formed from one or more of various types of materials having the desired thermal insulating properties and mechanical characteristics as previously described in FIGS. 94 through 103.

FIG. 108 further illustrates heat source 2112 adhesively mounted onto or in proximity to weatherproof coating 2160 on PC board 2130 between housing member 2218 and lens 2110 of tail light 2110. Optionally, heat source 2112 can be affixed with clips and/or fasteners or other suitable mechanical support structures to PC board 2130 or housing member 2118. Heat dissipating body 2120 is shown encompassing an array of LED lights 2132. PTC heater 2122 is adhesively affixed onto an outer surface of body 2120, optionally with a surface application of thin thermally conductive adhesive (not shown) between PTC heater 2022 and heat dissipating body 2120 and/or a circumferential bead of thermally-conductive potting material 2132.

Further optionally, thermally conductive grease or paste may be used in place of the thermally conductive adhesive or in combination with any foreseeable mechanical fastener or adhesive attachment to support PTC heater 2022 to heat dissipating body 2120. One exemplary thermally conductive paste is available as Omegatherm™ 201, High Temperature and High Thermally Conductive Paste, available from Omega Engineering, Inc., 800 Connecticut Ave., Suite 5N01, Norwalk, CT, USA 06854. This material is a thick, grey, smooth paste that wets most surfaces and will not harden during long exposure to elevated temperatures. It is rated for continuous use between −40 and 200 degrees C. (−104 and 392 degrees F.).

Tail light 2110 is shown in exploded perspective view in FIG. 109. Lens 2119 cooperates with housing member 2118 to encase heat source 2112, insulating layer 2150, weatherproofing layer 2160, and printed circuit (PC) board 2130. Heat source 2112 include PTC heater 2122 which is affixed with a circumferential arrangement of thermally conductive adhesive, or epoxy 2123 to an outer surface of heat dissipating body 2120. A clearance bore 2107 is provided in body 2120 and a similar clearance bore 2109 is provided in insulating layer 2150 to optionally enable passage of insulated conductive lead 2158 on a backside of PTC heater 2122 through bodies 2120 and 2150. Leads 2156 and 2158 then extend radially outwardly (see FIG. 109A) for passage through aperture 2163 and 2165 in layer 2160 and PC board 2130, respectively. Apertures 2127, 2129 and 2161 in layers 2120, 2150 and 2160, respectively provide clearance for LED light sources 2132 on PC board 2130.

FIGS. 106-130 shows several exemplary heat source embodiments implemented on a commercially available LED vehicle tail light available for purchase from Truck-Lite Company, LLC, 310 East Elmwood Avenue, Falconer, NY 14733, USA generally described as a 6 LED Super 44 stop, turn and tail light assembly under two catalog part numbers; 44302R and 44982R having either a polycarbonate or acrylic lens housing and mounting flange. These are designed to operate at 12 to 14 volts DC at 0.03 amps and 0.3 amps for two modes of illumination; tail light illumination and brake light illumination respectively. Anticipated power consumption at 12 volts is 0.36 watts and 3.6 watts respectively.

FIG. 110 is front view of even another exemplary heated vehicle LED shown as a round tail light 2210 having a light transmissible lens 2219. As shown in FIG. 111, tail light 2210 includes a housing formed by joining together lens 2219 with housing member 2218 about an entire outer periphery using either fasteners (not shown), ultrasonic welding, or adhesive. FIG. 110A illustrates in vertical centerline cross section internal components of tail light 2210. Housing member 2218 cooperates in assembly with light transmissible lens 2219 to form a housing that contains an array of LED light sources 2232 and a heat source 2212 configured to transfer heat to remove/prevent moisture-based condensate from otherwise accumulating on inner or outer surfaces of lens 2219 and occluding the lens. It is understood that such construction can also include vents and moisture permeable membranes for the housing (penetrating the housing envelope not shown) that help evacuate moisture from within the housing and equalize air or gas pressure between the interior portion of the light housing and atmospheric pressure outside the light housing as pressures will vary arising due to changes in weather barometric pressure, temperature, ground elevation or altitude when combined with a heat source, such as the present heat sources detailed within this disclosure. Heat source 2212 includes a disc-shaped PTC heater 2222 affixed with thermally conductive adhesive, or epoxy to an outer surface of a heat dissipating body, or plate 2220. An array of discrete square ceramic plates 2226 and 2228 (tile-shaped ceramic heart source body, or plate 2226 includes a clearance hole 2206 for an insulated conductor PTC wire lead) are each affixed in a circumferential array to an outer surface of plate 2220 using thermally conductive adhesive, or epoxy. In one case, plate 2220 is a thermally conductive aluminum plate. In another case, plate 2220 is a ceramic plate. In yet another case, plate 2220 is a thermally conductive aluminum plate 2220 having a ceramic coating on an outer, or first surface and a lower emissivity inner, or second surface such as a polished aluminum surface. A ceramic coating has a higher emissivity than a polished aluminum surface, therefore the ceramic coating increases radiative heat transfer. The particular advantage of radiative heat is that radiative heat transfer does not directly heat up air molecules within the light housing, and excess heat buildup inside a light housing can have a negative effect on LED performance and reliability over time. An insulating layer, or panel 2250 is affixed via adhesive to a back surface or in proximity of plate 2220, and both are adhesively affixed onto a weatherproof clear coating 2260 atop or in proximity to PC board 2230. One suitable insulating layer is an adhesive backed foam material as previously described.

FIG. 1108 illustrates in enlarged cross sectional view placement of PTC heater 2222 atop ceramic plate 2226 via a circumferential array of thermally conductive adhesive, or epoxy 2223 to heat lens 2219. Tile-shaped heat source body 2226 is a ceramic plate that is affixed with thermally conductive adhesive, or epoxy onto an outer surface of heat dissipating body 2220. An insulating layer of adhesive backed foam 2250 is then affixed to a back side of plate 2220. A back side of insulating layer 2250 is adhesively affixed onto a front surface of weatherproofing layer 2260 atop PC board 2230.

FIG. 110C shows the spacing and orientation between heat dissipating body 2220 relative to lens 2219 and one selected LED light source 2232. Lens 2219 is affixed to housing member 2218. Heat dissipating body 2220 and insulating layer 2250 each have a respective light clearance aperture 2227 and 2229 that mitigates heat transfer to LED light source 2232 and PC board 2230, while also allowing for light transmission from LED light source 2232 through light transmissible lens 2219. Insulating layer, or foam piece 2250 has an adhesive layer on opposed surfaces to enable affixation onto both weatherproof coating 2260 and plate 2220. Ceramic plates 2226 and 2228 are affixed to an outer surface of plate 2220 using thermally conductive adhesive, or epoxy.

FIG. 112 further illustrates heat source 2212 adhesively mounted onto weatherproof coating 2260 on PC board 2230 between housing member 2218 and lens 2219 of tail light 2210. Optionally, heat source 2212 can be affixed with clips and/or fasteners or other suitable mechanical support structures to PC board 2230 or housing member 2218. Heat dissipating body 2220 is shown encompassing an array of LED lights 2232 and PTC heater 2222 is adhesively affixed onto an outer surface of a square ceramic plate 2223 that is adhesively affixed with thermally conductive adhesive, or epoxy to an outer surface of body 2220 also with a thermally conductive adhesive (not shown). Furthermore, a circumferential array of additional square ceramic plates 2228 are adhesively affixed with thermally conductive adhesive, or epoxy to an outer surface of body 2220.

Tail light 2210 is shown in exploded perspective view in FIG. 112. Lens 2219 cooperates with housing member 2218 to encase heat source 2212, insulating layer 2250, weatherproofing layer 2260, and printed circuit (PC) board 2230. Heat source 2212 includes PTC heater 2222 which is affixed with a circumferential arrangement of thermally conductive adhesive, or epoxy 2223 to an outer surface on a square ceramic tile heat source body 2226 that is adhesively affixed with thermally conductive adhesive, or epoxy to an outer surface of heat dissipating body 2220. A further circumferential array of square ceramic tiles 2228 are affixed to an outer surface of plate 2220 with thermally conductive adhesive, or epoxy. An insulated conductor clearance bore 2206 is provided in tile-shaped heat source body 2226 for passage of insulated conductor lead 2258. An insulating conductor clearance bore 2207 is also optionally provided in heat dissipating body 2220 and a similar clearance bore 2209 is provided in insulating layer 2250 to enable passage of insulated conductive lead 2258 on a backside of PTC heater 2222 through bodies 2220 and 2250. Leads 2256 and 2258 then extend radially outwardly (see FIG. 29A) for passage through aperture 2263 and 2265 in layer 2260 and PC board 2230, respectively. Apertures 2227, 2229 and 2261 in layers 2220, 2250 and 2260, respectively provide clearance for LED light sources 2232 on PC board 2230. FIG. 29B illustrates provision of insulating ferrules, or cylindrical bore apertures 2229 on insulating layer 2250 which serve to thermally protect individual LED light sources 2232 from heat being transmitting from body 2220 and plates 2226 and 2228 so as to increase usable life and increase reliability and longevity of LED lamps 2232 otherwise being degraded by exposure to the long-term effects of elevated temperatures from heat dissipating body 2220.

FIG. 114 is front view of even another exemplary heated vehicle LED shown as a round tail light 2310 having a light transmissible lens 2319. As shown in FIG. 115, tail light 2310 includes a housing formed by joining together lens 2319 with housing member 2318 about an entire outer periphery using either fasteners (not shown), ultrasonic welding, or adhesive. A heat source 2312 shown in FIG. 116 is configured to transfer heat to remove/prevent moisture-based condensate from otherwise accumulating on inner or outer surfaces of lens 2319 and occluding the lens. It is understood that such construction can also include vents and moisture permeable membranes for the housing (penetrating the housing envelope not shown) that help evacuate moisture from within the housing. This also helps equalize air or gas pressure between the interior portion of the light housing and atmospheric pressure outside the light housing as pressures will vary due to changes in weather barometric pressure, temperature, ground elevation or altitude when combined with a heat source, such as the present heat sources detailed within this disclosure. Heat source 2312 includes a disc-shaped PTC heater 2322 affixed with thermally conductive adhesive, or epoxy to an outer surface of square tile-shaped ceramic plate, or heat source body 2326 that is further affixed with thermally conductive adhesive, or epoxy to a heat dissipating body, or plate 2320. An array of discrete square ceramic plates 2326 and 2328 (plate 2326 includes a clearance hole, or bore 2306 for an insulated conductor PTC wire lead) are each affixed in a circumferential array to an outer surface of plate 2320 using thermally conductive adhesive, or epoxy. Furthermore, individual louvered ceramic bodies 2335 are affixed with thermally conductive adhesive atop each plate 2326 and 2328 (see FIG. 32A). In one case, plate 2320 is a thermally conductive aluminum plate. In another case, plate 2320 is a ceramic plate. In yet another case, plate 2320 is a thermally conductive aluminum plate 2320 having a ceramic coating on an outer, or first surface and a lower emissivity inner, or second surface such as a polished aluminum surface. A ceramic coating has a higher emissivity than a polished aluminum surface, therefore the ceramic coating increases radiative heat transfer. Radiative heat transfer does not heat up air molecules within the light housing, and excess heat buildup can have a negative effect on LED performance and reliability over time. An insulating layer, or panel 2350 is affixed via adhesive to a back surface of plate 2320, and both are adhesively affixed onto a weatherproof clear coating 2360 atop a PC board 2330. One suitable insulating layer is an adhesive backed foam material such as adhesive backed polyethylene foam as previously described.

FIG. 116A illustrates in enlarged partial perspective view placement of PTC heater 2322 atop ceramic plate 2326 via a circumferential array of thermally conductive adhesive, or epoxy 2323 to heat lens 2319 (see FIG. 30). Ceramic plate 2326 is affixed with thermally conductive adhesive, or epoxy onto an outer surface of heat dissipating body 2320. An insulating layer of adhesive backed foam 2350 is then affixed to a back side of plate 2320. A back side of insulating layer 2350 is adhesively affixed onto a front surface of weatherproofing layer atop PC board (similar to the construction in FIG. 117).

FIG. 116 further illustrates heat source 2312 adhesively mounted onto weatherproof coating 2360 on PC board 2330 between housing member 2318 and lens 2319 of tail light 2210. Optionally, heat source 2312 can be affixed with clips and/or fasteners or other suitable mechanical support structures to PC board 2330 or housing member 2318. Heat dissipating body 2320 is shown encompassing an array of LED lights 2332 and PTC heater 2322 is adhesively affixed onto an outer surface of a square ceramic plate 2323 that is adhesively affixed with thermally conductive adhesive, or epoxy to a square ceramic plate 2326 which is further affixed with thermally conductive adhesive, or epoxy to an outer surface of body 2320. Furthermore, a circumferential array of additional square ceramic plates 2328 are adhesively affixed with thermally conductive adhesive, or epoxy to an outer surface of body 2320. Individual louvered ceramic bodies 2335 are even further affixed onto outer surfaces of each ceramic plate 2328, as shown in FIGS. 116 and 116A.

Tail light 2310 is shown in exploded perspective view in FIG. 117. Lens 2319 cooperates with housing member 2318 to encase heat source 2312, insulating layer 2350, weatherproofing layer 2360, and printed circuit (PC) board 2330. Heat source 2312 include PTC heater 2322 which is affixed with a circumferential arrangement of thermally conductive adhesive, or epoxy 2323 to an outer surface on a square ceramic tile 2326 that is adhesively affixed with thermally conductive adhesive, or epoxy to an outer surface of heat dissipating body 2320. A further circumferential array of square ceramic tiles 2328 are affixed to an outer surface of plate 2320 with thermally conductive adhesive, or epoxy. A louvered ceramic body 2335 is affixed with thermally conductive adhesive, or epoxy to an outer surface of each tile 2328. A clearance bore 2306 is provided in tile 2326 for passage of lead 2358. An insulated conductor clearance bore 2307 is also provided in body 2320 and a similar insulated conductor clearance bore 2309 is provided in insulating layer 2350 to enable passage of insulated conductive lead 2358 on a backside of PTC heater 2322 through bodies 2320 and 2350. Leads 2356 and 2358 then extend radially outwardly for passage through aperture 2363 and 2365 in layer 2360 and PC board 2330, respectively. Apertures 2327, 2329 and 2361 in layers 2320, 2350 and 2360, respectively provide clearance for LED light sources 2332 on PC board 2330. FIG. 117 illustrates provision of insulating ferrules, or cylindrical bore apertures 2329 on insulating layer 2350 which serve to thermally protect individual LED light sources from heat being transmitting from body 2320 and plates 2326 and 2328 so as to increase usable life and increase reliability and longevity of LED lamps otherwise being degraded by exposure to the long-term effects of elevated temperatures.

FIGS. 118-120 illustrate geometric details of louvered ceramic body 2335 having angled, or louvered outer surfaces that impart directional radiation heat transfer from a relatively high emissivity ceramic body capable to render direction tailoring of radiant heat delivery from a heat source to a light/optical transmissive lens or cover.

FIG. 121 is an alternative configuration component to be substituted for ceramic plates 2323 and 2328, and louvered ceramic bodies 2335. More particularly, a unitary ceramic plate 12328 has a star shaped configuration of radially outwardly extending arms on which individual louvered bodies 2335 are affixed with thermally conductive adhesive. A clearance bore 12306, analogous to clearance bore 2306 (in FIG. 117) is also provided.

The heat sources of the devices depicted in FIGS. 114-121 include a ceramic body, or heatsink (or heat spreader) 2335 having a part number TG-CJ-20-20-6-PF manufactured by T-Global Technology Limited, 1 & 2 Cosford Business Park, Central Park, Lutterworth, Leicestershire LE17 4UQQ U.K. and can be purchased from Digikey Electronics, 701 Brooks Ave South, Thief River Falls, MN 56701 USA. Heat spreader 2335 is made of a proprietary sintered ceramic material. Dimensions are 0.78 inches (20 mm) by 0.78 inches (20 mm) square by 0.23 inches (6 mm) in overall thickness and includes 6 louvers or convolutions that provide a significant increase of radiant heat dissipating and emitting surface area compared to a flat surface of the same overall square dimensions. Additionally, according to a "Table of Emissivity of Various Surfaces" published by Mikron Instrument Company, Inc., (Mikron Vertretung Schweiz, Transmetra haltec GmbH, Postfach 174 CH-8203 Schaffhausen), (www.transmetra.ch) aluminum maintains an emissivity within a range of between 0.022 to 0.095 for a temperature range of 25 to 100 degrees C. (77 to 212 deg. F) for generally unoxidized, polished, and highly polished commercially available sheet stock. While compared with ceramic, ceramic has a relatively high coefficient of emissivity in the range of 0.90 to 0.94 between a temperature range of approximately 20 to 93 degrees C. (68 to 199 deg. F). Since the emissivity of ceramic is considerably greater than that of unoxidized polished aluminum by a factor of approximately 9:1, the use of ceramic as a strategically-placed heat emitter, being oriented and directed toward the interior portion of a lens within light housing, provides a much greater benefit and maintains a distinct advantage over simply providing an aluminum radiant heat emitter alone.

Furthermore, another key aspect is the comparison of thermal conductivity (i.e. heat conduction within materials) between aluminum and ceramic. According to a publication entitled "The Thermal Conductivity of Ceramics", Sep. 1, 1999, by Clemens J. M. Lasance; Design, Materials, Compounds, Adhesives, Substrates, Number 3, Technical Data, Test & Measurement, Volume 5; "The problem with the thermal conductivity of ceramics is the dependence on the composition, grain size, and manufacturing process, which make it rather difficult to obtain a reliable value from literature only. Looking at the values quoted in various handbooks, papers and data sheets, two things are observed: 1) large variations exist; and 2) many authors seem to copy values from the same, but untraceable sources."

According to a listing entitled "Thermal Conductivity of Common Materials and Gases", published at Engineering ToolBox, (2003). [online] and available at: https://www.engineeringtoolbox.com/thermal-conductivity-d_429.html, the thermal conductivity of aluminum is in the range of 205-215 W/(Mk) while the thermal conductivity of heat sink or heat dissipater 2329 as previously described is published as being in the range of only 40 to 51 W/(Mk). Therefore, the ability to transfer or conduct heat is approximately 4 times greater for the aluminum heat body 2330 than it is for the ceramic heat sink or heat dissipater 2335. The distinct advantage of using the aluminum heat body 2330 is to readily and efficiently transfer and conduct heat from the heat source or PTC heater 2322 to the remote locations of the ceramic heat sink or heat dissipater 2329 that away from the single PTC heater 2322, where the heat energy can then enter the ceramic bodies 2329 and then be more efficiently radiated by the ceramic bodies toward the interior portion of the lens 2319. Optionally, other highly thermally conductive materials may be used for the thermal conduction body 2320 such as copper. Copper has an even higher thermal conductivity at approximately 401-400 W/(Mk). However, while this is effectively double the thermal conductivity of aluminum, a disadvantage is met with respect to the increased weight and cost of copper compared to cheaper and lighter aluminum being used as a thermal conduction body 2330. FIG. 37 shows an optional design and configuration of the thermal conduction body 12328 utilizing less material and a corresponding reduction in weight. This "cut-away design geometry" would be an advantage if heavier copper was used and a comparable further weight reduction advantage when aluminum is used.

As shown in FIG. 117, ceramic squares 2328 are attached to both the thermally conductive body 2330 and the corresponding array of heat sinks or heat dissipaters 2335 by thermally conductive adhesive (not specifically shown). FIG. 121 shows an alternate configuration with the array of heat sinks or heat dissipaters 2335 are understood to be securely attached with thermally conductive adhesive (not specifically shown) or a combination of conductive adhesive along the outside perimeter of heat dissipating device, or heat dissipaters 2335 and thermally conductive grease or paste previously described between the interior mating surfaces.

Further and optionally, thermally conductive adhesive tape may be used in place of thermal adhesive or high thermal transfer epoxy. One exemplary thermally conductive tape is provided by t-Global Technology Ltd. and can be purchased from Digikey as part number Li-98 and Li-98C. Different thicknesses of the thermally conductive tape are available as 0.15, 0.20 and 0.25 inch thickness (3.81, 5.08 and 6.35 mm respectively). Thermal conductivity ranges from 0.95 W/mK for part number Li-98 to 1.8 W/mK for part number Li-98C. Pre-cut shapes and geometric patterns are available through Digikey by special order for customized-shape manufacturing requirements. The working temperature range for this thermally conductive adhesive tape is −30 to 120 degrees C. (−86 to 248 degrees F.) including a tensile strength ranging from 200 to 400 psi (metric conversion here).

FIG. 122 is front view of even another exemplary heated vehicle LED shown as a round tail light 2410 having a light transmissible lens 2419. FIG. 38A shows tail light 2410 in vertical centerline-sectional view with lens 2419 affixed to housing member 2418 about an entire outer periphery using either fasteners (not shown), ultrasonic welding, or adhesive. A heat source 2412 is configured to transfer heat to remove/prevent moisture-based condensate from otherwise accumulating on inner or outer surfaces of lens 2419 and occluding the lens. It is understood that such construction can also include vents and moisture permeable membranes for the housing (penetrating the housing envelope not shown) that help evacuate moisture from within the housing. This construction also helps equalize air or gas pressure between the interior portion of the light housing and atmospheric pressure outside the light housing as pressures will vary arising due to changes in weather barometric pressure, temperature, ground elevation or altitude when combined with a heat source, such as the present heat sources detailed within this disclosure. Heat source 2412 includes a disc-shaped PTC heater 2422 affixed with thermally conductive adhesive, or epoxy to an outer surface of a heat dissipating body, or plate 2420. In one case, plate 2420 is a thermally conductive aluminum plate. In another case, plate 2420 is a ceramic plate. In yet another case, plate 2420 is a thermally conductive aluminum plate 2420 having a ceramic coating on an outer, or first surface and a lower emissivity inner, or second surface such as a polished aluminum surface. A ceramic coating has a higher emissivity than a polished aluminum surface, therefore the ceramic coating increases radiative heat transfer. Radiative heat transfer does not heat up air molecules within the light housing, and excess heat buildup can have a negative effect on LED performance and reliability over time. An insulating layer, or panel 2450 is affixed via adhesive to a back surface of plate 2420, and both are adhesively affixed onto a weatherproof clear coating 2460 atop a PC board 2430. One suitable insulating layer is an adhesive backed foam material such as an adhesive back polyethylene foam. PC board 2430 supports an array of LED light sources 2432.

FIG. 122B shows LED light source 2432 in a circumferential port, or ferrule 2451 defined by insulated grommet 2429. LED light source 2432 is affixed to PC board 2430, and a weatherproof coating 2460 is provided atop PC board 2430. PTC heater 2422 is affixed with thermally conductive adhesive, or epoxy 2423 to heat dissipating body 2420 within the light housing provided between lens 2419 and housing member 2418. Heat dissipating body 2420 comprises an aluminum plate 2484 (see FIG. 42) having a high emissivity outer surface coating 2486, such as a ceramic coating, and a lower emissivity radiant barrier coating, or finish 2482 such as a polished aluminum surface.

FIG. 124A illustrates in enlarged partial perspective view placement of PTC heater 2422 atop heat dissipating body, or plate 2420 via a circumferential bead of thermally conductive adhesive, or epoxy 2423 to heat lens 2419 (see FIG. 122A, 122B). An insulating layer of adhesive backed foam 2450 is then affixed to a back side of plate 2420. A back side of insulating layer 2450 is adhesively affixed onto a front surface of weatherproofing layer 2460 atop PC board 2430 (similar to the construction in FIGS. 110-117).

FIG. 124 further illustrates placement of heat source 2412 between housing member 2418 and lens 2419 of tail light 2410 so as to present a large surface area via heat dissipating body 2420 for removing any condensation from lens 2419. Heat source 2412 is affixed within housing member 2418 using adhesive. Optionally, heat source 2412 can be affixed with clips and/or fasteners or other suitable mechanical support structures to PC board 2430 (see FIG. 38A) or housing member 2418. As shown in FIG. 40A, heat dissipating body 2420 is shown encompassing an array of LED lights 2432 and PTC heater 2422 is adhesively affixed onto an outer surface body 2420 with thermally conductive adhesive, or epoxy. Individual insulated light wells, or ports 2429 to reduce heat transfer from plate 2420 to each LED light source 2432 in an effort to reduce temperatures at LED light source 2432. FIG. 122C illustrates in greater detail the orientation of LED light source 2432 centrally of insulated bore, or ferrule 2429 within bore 2427 (shown in FIG. 125) so as to insulate heat transfer from bore 2427 to LED light source 2432.

Tail light 2410 is shown in exploded perspective view in FIG. 125. Lens 2419 cooperates with housing member 2418 to encase heat source 2412, insulating layer 2450, weatherproofing layer 2460, and printed circuit (PC) board 2430. Heat source 2412 include PTC heater 2422 which is affixed with a circumferential arrangement of thermally conductive adhesive, or epoxy 2423 to an outer surface of heat dissipating body 2420. A cylindrical mounting surface port 2488 is provided in a front surface coating of body 2420 to expose a high thermally conductive core material 2484 of body 2420 that mates in thermally conductive relation with PTC heater 2422 via thermally conductive adhesive, or epoxy 2423. Insulated conductive wire leads 2456 and 2458 extend from PTC heater 2422 extend radially outwardly from 2422 with optional for passage of wire lead 2458 through apertures 2463 and 2465 in layer 2460 and PC board 2430, respectively. Apertures 2427, 2429 and 2461 in layers 2420, 2450 and 2460, respectively provide clearance for LED light sources 2432 on PC board 2430. FIG. 125 illustrates provision of insulating circumferential ports, ferrules, or cylindrical bore apertures 2451 on insulating layer 2450 that define bores 2429 which serve to thermally protect individual LED light sources from heat being transmitting from body 2420 and plates 2423 and 2428 so as to increase usable life and increase reliability and longevity of LED lamps otherwise being degraded by exposure to the long-term effects of elevated temperatures.

FIG. 126 illustrates details of heat dissipating body 2420 comprising a laminate having a central highly thermally conductive core 2484 with a front, or first surface 2486 and a back, or second surface 2482. Front surface 2486 has a higher emissivity than does back surface 2482. In one case, core 2484 is a thermally conductive plate of aluminum having a front surface 2486 with a coating or sheet of ceramic material. Rear surface 2482 is a low emissivity radiant barrier coating. Optionally, rear surface 2482 is a highly polished aluminum surface on the backside of core 2484 including the inner surfaces corresponding to apertures 2483. FIG. 126A illustrates how a circumferential ring, or ferrule is formed using the rear surface 2482 of low emissivity radiant barrier coating, or layer to concentrically line the bore 2427 (of FIG. 125). In this way, a low emissivity thermal coating would be applied directly to the central highly thermally conductive core material 2482 or optionally, a separately-formed component represented by layer 2483, could be adhesively bonded to core 2482 using thermally conductive adhesive, epoxy, grease, paste or by a technique of similar material bonding processes to achieve the preferred thermal control and performance properties of heat dissipating body 2420.

FIGS. 127-130 illustrate in greater detail the construction of insulation plate 2450. More particularly, plate 2450 is constructed from a structural insulation, such as a rigid structural foam insulating foam material. Plate 2450 includes an array of through bores 2429 that are defined by circumferential ports, or ferrules 2451 provided on a front face of plate 2450, as shown in FIGS. 128 and 129. An array of semi-arcuate stands 2453 and 2455 cooperate to form individual air vents, or passages 2454 on a back surface of plate 2450. Additionally, an array of integral posts, or fingers 2457 extend a same height as stands 2453 and 2455 to form an air gap 2480 between insulating panel 2450 and weatherproof clear coating, or layer 2460 on PC board 2430 to facilitate cooling air flow through ports 2427, 2429, and air passages 2454. These structural features related to promoting convection air-flow help to cool LED lights 2432 (see FIG. 125) when they are in operation.

FIG. 131 is an exploded perspective view of a yet even further exemplary heated vehicle LED clearance, or side marker light 2510 including a heat source 2512 that is affixed onto a PC board 2530 using a threaded fastener, or mounting screw 2570 and washers 2571 and 2573 into a threaded bore 2575 in PC board 2530 which supports LED light source 2532. Heat source 2512 includes a PTC heater 2522 that is affixed with a cylindrical ring of thermally conductive adhesive, or epoxy 2523 onto a square ceramic plate 2528. PC board 2530 is affixed with fasteners, clips and/or adhesive or other suitable mechanical support structures within housing member 2518, beneath light transmissible lens 2519.

FIG. 132 is a front plan view including hidden lines of the heated LED clearance, or side marker light 2510 of FIG. 131. More particularly, lens 2519 combines in assembly with housing member 2518 to encase an LED light source 2532 and a heat source 2512. FIG. 132A shows in vertical centerline-sectional view further internal details of heat source 2512 in clearance, or side marker light 2510. More particularly, lens 2519 and housing member 2518 encase heat source 2512 and LED light source 2532. Heat source 2512 is affixed with threaded fastener, or mounting screw 2570 to PC board 2530 and washers 2571 and 2578 entrap ceramic plate 2528, with washer 2578 providing for air gap 2525 from PC board 2530. PTC heater 2522 is affixed to a top surface of plate 2528 using thermally conductive adhesive, or epoxy 2523.

FIGS. 131-132A show a simplified concept design for a side marker or clearance light assembly with a single LED at the center of the housing assembly provided for illustration purposes showing a simple square ceramic component available for purchase from Digikey. A small hole 2589 has been machined through an upper corner of the square ceramic 2528 providing a mechanical mounting point for engagement with a small threaded mounting screw 2570 threaded into threaded hole 2575 at LED circuit board 2530. A spacer washer 2578 provides and air gap or air space 2580 to provide a conductive thermal break between heat source 2512 and LED circuit board 2530. Heat source 2512 includes a PTC heater 2522, a ceramic tile 2528 providing a heat dissipating body or mass, and a thermally conductive adhesive 2532 that mechanically secures PTC heater 2522 in thermal communication with ceramic tile 2528. An insulating air gap 2580 shown in FIG. 132A provides a thermal conduction break to promote non-overheating of the LED electronics at LED circuit board 2530.

FIG. 133 is an exploded perspective view of a yet even further exemplary heated vehicle LED side marker light 2610 including a heat source 2612 that is affixed onto housing member 2618 using three threaded fasteners, such as threaded fastener 2670 and washers 2671, 2678 and 2677, through bore 2672 in heat dissipating body 2620, through a bore 2674 in insulating plate 2650, a bore 2675 in PC board 2630, and into a threaded bore 2676 in housing member 2618 which supports LED board 2630 and LED light source 2632. Heat source 2612 includes a PTC heater 2622 that is affixed with a cylindrical ring of thermally conductive adhesive, or epoxy 2623 onto a square ceramic plate 2628. PC board 2630 is affixed with fasteners, clips and/or adhesive or other suitable mechanical support structures within housing member 2618, beneath light transmissible lens 2619. Heat source 2612 includes a PTC heater 2622 affixed with a cylindrical ring of thermally conductive adhesive, or epoxy 2623 to an outer surface of a heat dissipating body 2620. Body 2620 includes a central light aperture 2627 that has a frustoconical shape. This geometry helps to reflect any incident heat and light from the LED light source 2632 away from the LED light source 2632 and toward lens 2619, contributing toward maintaining reduced temperatures at the LED light source 2632.

Additionally, this geometry provides a wider path of projection of light from the LED 2632 to the lens 2619 for increased light output. Insulating piece 2650 includes a central light aperture 2629 configured to allow clearance of LED light source 2632 in assembly for light to pass through lens 2619. According to one construction, plate 2620 is formed from a ceramic plate having a large thermal mass. Three washers 2678 serve to form an air gap, or space between heat dissipating body 2620 and insulation plate 2650 in assembly, thus providing a conductive thermal break between heat dissipating body 2620 and insulation plate 2650.

FIG. 134 is a front plan view including hidden lines of the heated LED side marker light 2610 of FIG. 133. More particularly, lens 2619 combines in assembly with housing member 2618 to encase an LED light source 2632 and a heat source 2612. FIG. 134A shows in vertical centerline-sectional view further internal details of heat source 2612 in side marker light 2610. More particularly, lens 2619 and housing member 2618 encase heat source 2612 and LED light source 2632. Heat source 2612 is affixed with a thermally conductive adhesive 2623, or epoxy to an outer surface of ceramic plate or heat dissipating body 2620. Fasteners 2670 cooperate with washers 2671, 2678, and 2677 to affix ceramic plate 2620, insulating plate 2650 and PC board 2630 to boss 2676 of housing member 2618. Washers 2671, 2678, and 2677 provide air gaps 2680 and 2681 between respective components for cooling. Light apertures 2627 and 2629 in plates 2620 and 2650 enable clearance for LED light source 2632 to deliver light through heated lens 2619.

FIG. 134A shows a sectional view of a simplified concept design for a side marker or clearance light 2610 of FIG. 134 having a single LED 2632 with section view taken at line 134A-134A of FIG. 134. As previously described, air gaps 2680 and 2681 together provide a pair of thermal conduction breaks in series to promote non-overheating of the LED electronics at LED circuit board 2630. Optionally, it would be anticipated to provide additional corresponding insulation plates 2650 or thermal barriers (not shown), additional corresponding washers 2678 and 2677, (not shown) and additional corresponding air gaps to 2680 and 2681 (not shown) to increase the number of conductive thermal breaks and further reduce the likelihood of over-heating the LED 2632 and LED circuit board 2630.

FIG. 135 is a simplified centerline-sectional view of a first exemplary heated LED light 2710 including a housing formed by a housing member 2718 and a light transmissible lens 2719 having a light transmissible portion and a first heat source 2712. Heat source 2712 includes a PTC heater 2722 affixed with adhesive in thermally conductive relation with an outer, or front surface of a thermally conductive body 2720 in the form of a cylindrical aluminum plate or other thermally conductive material. An insulating air gap 2780 is provided between a back surface of plate 2720 and a printed circuit (PC) board 2730 to limit heat transfer to board 2730. A weatherproofing layer of clear plastic, or polymer 2760 protects a front surface of PC board 2730. LED light source 2732 is affixed to board 2730 and is located centrally of a round aperture 2727 in plate 2720.

FIG. 136 is another simplified centerline-sectional view of a second exemplary heated LED light 2810 including a housing formed by a housing member 2818 and a light transmissible lens 2819 having a light transmissible portion and a first heat source 2812. Heat source 2812 includes a PTC heater 2822 affixed with adhesive in thermally conductive relation with an inner, or rear surface of a thermally conductive body 2820 in the form of a cylindrical aluminum plate or other thermally conductive material. An insulating air gap 2880 is provided between a back surface of plate 2820 and a printed circuit (PC) board 2830 to limit heat transfer to board 2830. A weatherproofing layer of clear plastic, or polymer 2860 protects a front surface of PC board 2830. LED light source 2832 is affixed to board 2830 and is located centrally of a round aperture 2827 in plate 2820.

FIG. 137 is yet another simplified centerline-sectional view of a third exemplary heated LED light 2910 including a housing formed by a housing member 2918 and a light transmissible lens 2919 having a light transmissible portion and a first heat source 2912. Heat source 2912 includes a PTC heater 2922 affixed with adhesive in thermally conductive relation with an outer surface of a thermally conductive body, or plate 2920 in the form of a cylindrical aluminum plate or other thermally conductive material. A thermal insulation layer, or insulation plate 2950 is adhesively affixed to a back surface of plate 2920. An insulating air gap 2980 is provided between a back surface of insulation plate 2950 and a printed circuit (PC) board 2930 to limit heat transfer to board 2930. A weatherproofing layer of clear plastic, or polymer 2960 protects a front surface of PC board 2930. LED light source 2932 is affixed to board 2930 and is located centrally of a round aperture 2927 in plate 2920 and a round aperture 2929 in insulating layer 2950.

FIG. 138 is even another simplified centerline-sectional view of a fourth exemplary heated LED light 3010 including a housing formed by a housing member 3018 and a light transmissible lens 3019 having a light transmissible portion and a first heat source 3012. Heat source 3012 includes a PTC heater 3022 affixed with adhesive in thermally conductive relation with an inner surface of a thermally conductive body, or plate 3020 in the form of a cylindrical aluminum plate or other thermally conductive material. A thermal insulation layer, or plate 3050 is adhesively affixed to a top surface coating 3060 on a printed circuit board 3030. An insulating air gap 3080 is provided between a front surface of plate 3050 and a back surface of plate 3020 to limit heat transfer to board 3030. A weatherproofing layer of clear plastic, or polymer 3060 protects a front surface of PC board 3030. LED light source 3032 is affixed to board 3030 and is located centrally of a round aperture 3027 in plate 3020.

FIG. 139 is yet even another simplified centerline-sectional view of a fifth exemplary heated LED light 3110 including a housing formed by a housing member 3118 and a light transmissible lens 3119 having a light transmissible portion and a first heat source 3112. Heat source 3112 includes a PTC heater 3122 affixed with adhesive in thermally conductive relation with an outer surface of a thermally conductive body, or plate 3120 in the form of a cylindrical aluminum plate or other thermally conductive material. A thermal insulation layer, or plate 3150 is interposed in spaced-apart relation between a printed circuit board 3130 and plate 3120. An insulating air gap 3180 is provided between a front surface of plate 3150 and a back surface of plate 3120 to limit heat transfer to board 3130. Another insulating air gap 3181 is provided between a rear face of plate 3150 and a weatherproofing surface 3160 of clear plastic, or polymer on PC board 3130. LED light source 3132 is affixed to board 3130 and is located centrally of a round aperture 3127 in plate 3120 and a round aperture 3129 in plate 3150.

FIG. 140 is an even further simplified centerline-sectional view of a sixth exemplary heated LED light 3210 including a housing formed by a housing member 3218 and a light transmissible lens 3219 having a light transmissible portion and a first heat source 3212. Heat source 3212 includes a PTC heater 3222 affixed with adhesive in thermally conductive relation with an inner surface of a thermally conductive body, or plate 3220 in the form of a cylindrical aluminum plate or other thermally conductive material. A thermal insulation layer, or plate 3250 is interposed in spaced-apart relation between a printed circuit board 3230 and plate 3220. An insulating air gap 3280 is provided between a front surface of plate 3250 and a back surface of plate 3220 to limit heat transfer to board 3230. Another insulating air gap 3281 is provided between a rear face of plate 3250 and a weatherproofing surface 3260 of clear plastic, or polymer on PC board 3230. LED light source 3232 is affixed to board 3230 and is located centrally of a round aperture 3227 in plate 3220 and a round aperture 3229 in plate 3250.

FIG. 141 is yet even another simplified centerline-sectional view of a seventh exemplary heated LED light 3310 including a housing formed by a housing member 3318 and a light transmissible lens 3319 having a light transmissible portion and a first heat source 3312. Heat source 3312 includes a PTC heater 3322 affixed with adhesive in thermally conductive relation with an outer surface of a thermally conductive body, or plate 3320 in the form of a cylindrical aluminum plate or other thermally conductive material. A thermal reflective shielding foil layer, or radiation energy shield 3325 is interposed in spaced-apart relation between a printed circuit board 3330 and plate 3320. An insulating air gap 3380 is provided between a front surface of layer 3325 and a back surface of plate 3320 to limit heat transfer to board 3330. Another insulating air gap 3381 is provided between a rear face of layer 3325 and a weatherproofing surface 3360 of clear plastic, or polymer on PC board 3330. LED light source 3332 is affixed to board 3330 and is located centrally of a round aperture 3327 in plate 3320 and a round aperture 3331 in plate 3325.

FIG. 142 is a further simplified centerline-sectional view of an eighth exemplary heated LED light 3410 including a housing formed by a housing member 3418 and a light transmissible lens 3419 having a light transmissible portion and a first heat source 3412. Heat source 3412 includes a PTC heater 3422 affixed with adhesive in thermally conductive relation with an inner surface of a thermally conductive body, or plate 3420 in the form of a cylindrical aluminum plate or other thermally conductive material. A thermal reflective shielding aluminum foil layer, or radiation energy shield 3425 is interposed in spaced-apart relation between a printed circuit board 3430 and plate 3420. An insulating air gap 3480 is provided between a front surface of layer 3425 and a back surface of plate 3420 to limit heat transfer to board 3430. Another insulating air gap 3481 is provided between a rear surface of layer 3425 and a weatherproofing surface 3460 of clear plastic, or polymer on PC board 3430. LED light source 3432 is affixed to board 3430 and is located centrally of a round aperture 3427 in plate 3420 and a round aperture 3431 in plate 3425.

FIG. 143 is yet even another simplified centerline-sectional view of a ninth exemplary heated LED light 3510 including a housing formed by a housing member 3518 and a light transmissible lens 3519 having a light transmissible portion and a first heat source 3512. Heat source 3512 includes a PTC heater 3522 affixed with adhesive in thermally conductive relation with an outer surface of a thermally conductive body, or plate 3520 in the form of a cylindrical aluminum plate or other thermally conductive material. An insulating plate, or foam layer 3550 is adhesively affixed to a back surface of plate 3520. A thermal reflective shielding aluminum foil layer, or radiation energy shield 3525 is interposed in spaced-apart relation between a printed circuit board 3530 and layer 3550. An insulating air gap 3580 is provided between a front surface of layer 3525 and a back surface of layer 3550 to limit heat transfer to board 3530. Another insulating air gap 3581 is provided between a rear surface of layer 3525 and a weatherproofing surface 3560 of clear plastic, or polymer on PC board 3530. LED light source 3532 is affixed to board 3530 and is located centrally of a round aperture 3527 in plate 3520, a round aperture 3529 in plate 3550, and a round aperture 3531 in shield layer 3525.

FIG. 144 is even another simplified centerline-sectional view of a tenth exemplary heated LED light 3610 including a housing formed by a housing member 3618 and a light transmissible lens 3619 having a light transmissible portion and a first heat source 3612. Heat source 3612 includes a PTC heater 3622 affixed with adhesive in thermally conductive relation with an inner surface of a thermally conductive body, or plate 3620 in the form of a cylindrical aluminum plate or other thermally conductive material. An insulating plate, or foam layer 3650 is adhesively affixed to a front surface of weatherproofing surface 3660 of clear plastic, or polymer on PC board 3630. A thermal reflective shielding aluminum foil layer, or radiation energy shield 3625 is interposed in spaced-apart relation between a rear surface of body 3620 and layer 3650. An insulating air gap 3680 is provided between a rear surface of body 3620 and a front surface of shield 3625 to limit heat transfer to board 3630. Another insulating air gap 3681 is provided between a rear surface of layer 3625 and a weatherproofing surface 3660 of clear plastic, or polymer on PC board 3630. LED light source 3632 is affixed to board 3630 and is located centrally of a round aperture 3627 in plate 3620, a round aperture 3631 in layer 3625, and a round aperture 3629 in plate 3650.

FIG. 145 is yet another simplified centerline-sectional view of a eleventh exemplary heated LED light 3710 including a housing formed by a housing member 3718 and a light transmissible lens 3719 having a light transmissible portion and a first heat source 3712. Heat source 3712 includes a PTC heater 3722 affixed with adhesive in thermally conductive relation with an outer surface of a thermally conductive body, or plate 3720 in the form of a cylindrical aluminum plate or other thermally conductive material. An insulating plate, or foam layer 3750 is adhesively affixed to a back surface of plate 3720. A thermal reflective shielding aluminum foil layer, or radiation energy shield 3725 is adhesively affixed to a back surface of foam layer 3750. An insulating air gap 3780 is provided between a rear surface of layer 3725 and a front surface of a weatherproofing surface 3760 of clear plastic, or polymer on PC board 3530. LED light source 3732 is affixed to board 3730 and is located centrally of a round aperture 3727 in plate 3720 and a round aperture 3729 in plate 3750. Finally, an aperture 3731 is provided in layer 3725.

FIG. 146 is yet even another simplified centerline-sectional view of a twelfth exemplary heated LED light 3810 including a housing formed by a housing member 3818 and a light transmissible lens 3819 having a light transmissible portion and a first heat source 3612. Heat source 3812 includes a PTC heater 3822 affixed with adhesive in thermally conductive relation with an inner surface of a thermally conductive body, or plate 3820 in the form of a cylindrical aluminum plate or other thermally conductive material. An insulating plate, or foam layer 3850 is adhesively affixed to a front surface of weatherproofing surface 3860 of clear plastic, or polymer on PC board 3830. A thermal reflective shielding aluminum foil layer, or radiation energy shield 3825 is adhesively affixed on a front surface of layer 3850. An insulating air gap 3880 is provided between a rear surface of body 3820 and a front surface of shield 3825 to limit heat transfer to board 3830. A rear surface of layer 3825 is adhesively affixed to a front surface of layer 3850. LED light source 3832 is affixed to board 3830 and is located centrally of a round aperture 3827 in plate 3820, a round aperture 3831 in layer 3825, and a round aperture 3829 in plate 3850.

FIG. 147 is a further simplified centerline-sectional view of a thirteenth exemplary heated LED light 3910 including a housing formed by a housing member 3918 and a light transmissible lens 3919 having a light transmissible portion and a first heat source 3912. Heat source 3912 includes a PTC heater 3922 affixed with adhesive in thermally conductive relation with an outer, or front surface of a thermally conductive body 3920 including a highly conductive thermal core or plate 3984, in the form of a cylindrical aluminum central plate 3984 or other thermally conductive material having an outer, or first surface layer 3986 and an inner, or second surface layer 3982. First surface layer 3986 has a higher emissivity than second surface layer 3982. Optionally, the thermal conductivity of core or plate 3984 is greater than the thermal conductivity of the outer first surface 3986. The absence of layer 3986 between the mating surfaces of 3984 and PTC 3922 is provided to help maximize heat transfer between core or plate 3984 and PTC heater 3922, thus improving efficiency. An insulating air gap 3980 is provided between a back surface of plate 3920 and a front surface, or weatherproofing layer 3960 on printed circuit (PC) board 3930 to limit heat transfer to board 3930. Weatherproofing layer of clear plastic, or polymer 3960 protects a front surface of PC board 3930. LED light source 3932 is affixed to board 3930 and is located centrally of a round apertures 3927, 3929, and 3931 in layers 3984, 3986, and 3982 respectively, of plate 3920.

FIG. 148 is yet a further simplified centerline-sectional view of a fourteenth exemplary heated LED light 4010 including a housing formed by a housing member 4018 and a light transmissible lens 4019 having a light transmissible portion and a first heat source 4012. Heat source 4012 includes a PTC heater 4022 affixed with adhesive in thermally conductive relation with an inner, or rear surface of a thermally conductive body 4020 including a highly conductive thermal core plate 4084 in the form of a cylindrical aluminum central plate 4084, or other thermally conductive material, having an outer, or first surface layer 4086 and an inner, or second surface layer 4082. Optionally, the thermal conductivity of core or plate 4084 is greater than the thermal conductivity of the outer first surface 4086. The absence of layer 4082 between the mating surfaces of core plate 4084 and PTC heater 4022 is provided to help maximize heat transfer between core plate 4084 and PTC heater 4022, thus improving efficiency. An insulating air gap 4080 is provided between a back surface of plate 4020 and a weatherproofing layer 4060 on printed circuit (PC) board 4030 to limit heat transfer to board 4030. Weatherproofing layer of clear plastic, or polymer 4060 protects a front surface of PC board 4030. LED light source 4032 is affixed to board 4030 and is located centrally of a round aperture 4027, 4029, and 4031 in layers 4084, 4086, and 4082 respectively, of plate 4020.

FIG. 149 is yet even a further simplified centerline-sectional view of a fifteenth exemplary heated LED light 4110 including a housing formed by a housing member 4118 and having a lens 4110 with a light transmissible portion and a first heat source 4012. Heat source 4112 includes heat dissipating body 4120 having a radiative front concave surface 4191 configured to shape the distribution of radiant heat transfer from body 4120 to an inner surface of lens 4119. An inner surface 4182 of body 4120 is a low emissivity radiant barrier coating. Optionally, surface 4182 is a shiny aluminum layer that reflects radiant heat. A weatherproofing layer of clear plastic, or polymer 4160 protects a front surface of PC board 4030. An insulating air gap 4180 is provided between a back surface 4182 of plate 4120 and weatherproofing layer 4160 on printed circuit (PC) board 4130 to limit heat transfer to board 4030. LED light source 4132 is affixed to PC board 4130 and is located centrally of a round aperture 4127 and 4129 in plate 4120 and surface 4182, respectively.

FIG. 150 is even another simplified centerline-sectional view of a sixteenth exemplary heated LED light 4210 including a housing formed by a housing member 4218 and having a lens 4210 with a light transmissible portion and a first heat source 4212. Heat source 4212 includes heat dissipating body 4220 having a radiative front convex surface 4292 configured to shape the distribution of radiant heat transfer from body 4220 to an inner surface of lens 4219. An inner surface 4282 of body 4220 is a low emissivity radiant barrier coating. Optionally, surface 4282 is a shiny aluminum layer that reflects radiant heat. A weatherproofing layer of clear plastic, or polymer 4260 protects a front surface of PC board 4230. An insulating air gap 4280 is provided between a back surface 4282 of plate 4220 and weatherproofing layer 4260 on printed circuit (PC) board 4230 to limit heat transfer to board 4230. LED light source 4232 is affixed to PC board 4230 and is located centrally of a round aperture 4227 and 4229 in plate 4220 and surface 4282, respectively.

As shown in the heat dissipating bodies of FIGS. 149 and 150, it is understood that a combination of concave, convex, and flat configurations can be provided on a heat dissipating surface having emissivity characteristics such as an emissivity of at least 0.8 and preferably at least 0.9 in order to generate radiant heat transfer that is generally perpendicular to a heat dissipating surface so that radiant heat transfer can be shaped to best deliver heat to complex three-dimensional internal lens structures so as to more evenly dissipate condensate buildup within such lenses.

As shown herein in FIGS. 85-150, condensate mitigation is also understood to apply to mitigating condensate buildup on housed sensor arrangements having light or optical transmission portions of lenses. For example, sensors are being housed in light house assemblies for use in implementing intelligent driverless vehicles. Sensors in such lens housings are at risk from condensate buildup and the teachings of the present disclosure are also intended to mitigate condensate buildup on housings with lenses that include such sensors and also for those housings solely designed to house such sensors and devoid of any light source.

Furthermore, the subject matter of this application shown in FIGS. 85-150 is intended to apply to other forms of housings, encasements, dividers, and casings having either an optically transmissible portion or a light transmissible portion, such as weatherproof/waterproof housings for cameras, video cameras, masks and goggles, such as scuba masks and industrial masks, and other encasements having a need to clear condensate from an optical/light transmissible portion (inside or outside surface), such as housings and cover plates for sensors, such as sensors used to provide input for artificial intelligence systems used on autonomous and self-driving vehicles, or cars/trucks/buses or other vehicles and conveyors of animate and/or inanimate objects.

Even furthermore, it is understood that each of the housings, or light housings shown in FIGS. 85-150 can be implemented with the addition of an atmospheric vent, including atmospheric vents that include moisture permeable and water impermeable membranes and fabrics, such as TEMISH® vent waterproof and dustproof filters contained in light vent housings available form Nitto, Inc., 300 Frank W. Burr Blvd., Suite 66, Teaneck, NJ USA. The addition of the present heat sources disclosure with reference to FIGS. 85-150 provides a thermal driving gradient to facilitate moisture migration from within a light or sensor housing in order to remove moisture therein that might otherwise build up from cyclical barometric pressure changes resulting from weather pattern changes and/or elevational changes during operation that pump, or pressure feed moisture-laden air in an out of the housing through seams and/or a light housing vent.

Yet even furthermore, it is understood that each of the housings, or light housings shown in FIGS. 85-150 can be implemented with the addition of a heat source electrically connected with a thermal detector and a switch that only operates the heat source at or below a threshold temperature, for example, at or below 38 degrees Fahrenheit (3.3 degrees C.). Optionally, a sensor configuration can turn power off at or above such a threshold temperature. One suitable sensor is a thermistor.

While the subject matter of this application was motivated in addressing condensate (ice, snow, frost, vapor and water) mitigation within lenses on light generating structures, it is in no way so limited. The disclosure is only limited by the accompanying claims as literally worded, without interpretative or other limiting reference to the specification, and in accordance with the doctrine of equivalents.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. An electronics package, comprising:

a container having a wall forming an enclosure configured to encase an electronic component and an electromagnetic transmissible portion comprising an outer electromagnetic lens;

an inner electromagnetic lens forming a separate divider in the enclosure spaced from the outer electromagnetic lens providing an outer chamber between the outer lens and the inner lens and an inner chamber behind the inner lens and having a fluid passage vent extending between the outer chamber and the inner chamber; and a heat transfer body provided in the package between the outer electromagnetic lens and the inner electromagnetic lens.

2. The electronics package of claim 1, wherein the container is a light housing having an optical outer lens and an optical inner lens.

3. The electronics package of claim 1, wherein the electronic component is an LED light bulb.

4. The electronics package of claim 1, wherein the outer electromagnetic lens and the inner electromagnetic lens each comprise an optical light transmissible lens.

5. The electronics package of claim 1, wherein the heat transfer body is a heater.

6. The electronics package of claim 5, wherein the heater is an elongate tubular heater having a heat source.

7. The electronics package of claim 5, wherein the heater is affixed between the outer electromagnetic lens and the inner electromagnetic lens.

8. The electronics package of claim 1, wherein the divider comprises an optically transmissive inner lens having a flange configured to affix the divider to the wall of the container.

9. The electronics package of claim 8, wherein the divider encompasses a portion of the heat transfer body.

10. The electronics package of claim 8, wherein the inner electromagnetic lens and the outer electromagnetic lens are formed as separate structures affixed together to provide a heated double lens.

* * * * *